(12) United States Patent
Chang et al.

(10) Patent No.: US 8,749,496 B2
(45) Date of Patent: *Jun. 10, 2014

(54) INTEGRATED TOUCH PANEL FOR A TFT DISPLAY

(75) Inventors: Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 12/315,869

(22) Filed: Dec. 5, 2008

(65) Prior Publication Data

US 2010/0144391 A1    Jun. 10, 2010

(51) Int. Cl.
G06F 3/041 (2006.01)
G09G 3/36 (2006.01)

(52) U.S. Cl.
USPC .............................. 345/173; 345/104; 349/139

(58) Field of Classification Search
USPC .................. 345/104, 87–102, 204, 173–178; 178/18.01–18.09, 18.11; 349/12, 56, 349/84, 139, 143
See application file for complete search history.

(56) References Cited

U.S. PATENT DOCUMENTS

| | | |
|---|---|---|
| 4,542,960 A | 9/1985 | Yang |
| 4,916,308 A | 4/1990 | Meadows |
| 5,105,186 A | 4/1992 | May |
| 5,483,261 A | 1/1996 | Yasutake |
| 5,488,204 A | 1/1996 | Mead et al. |
| 5,550,659 A | 8/1996 | Fujieda et al. |
| 5,825,352 A | 10/1998 | Bisset et al. |
| 5,835,079 A | 11/1998 | Shieh |
| 5,838,308 A | 11/1998 | Knapp et al. |
| 5,844,644 A | 12/1998 | Oh et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |

(Continued)

FOREIGN PATENT DOCUMENTS

| | | |
|---|---|---|
| EP | 1 133 057 A2 | 9/2001 |
| EP | 1 133 057 A3 | 9/2001 |

(Continued)

OTHER PUBLICATIONS

Kanda, Eiji, et al., 55.2 Integrated Active Matrix Capacitive Sensors for Touch Panel LTPS-TFT LCDs, SID 08 Digest, 2008, pp. 834-837, Fujimi, Nagano, Japan.

(Continued)

*Primary Examiner* — Stephen Sherman
(74) *Attorney, Agent, or Firm* — Morrison & Foerster LLP

(57) ABSTRACT

This relates to displays for which the use of dual function capacitive elements does not result in any decreases of the aperture of the display. Thus, touch sensitive displays that have aperture ratios that are no worse than similar non-touch sensing displays can be manufactured. More specifically, this relates to placing touch sensing opaque elements so as to ensure that they are substantially overlapped by display related opaque elements, thus ensuring that the addition of the touch sensing elements does not substantially reduce the aperture ratio. The touch sensing display elements can be, for example, common lines that connect various capacitive elements that are configured to operate collectively as an element of the touch sensing system.

36 Claims, 65 Drawing Sheets

(56) References Cited

U.S. PATENT DOCUMENTS

| | | |
|---|---|---|
| 6,281,957 B1 | 8/2001 | Oh et al. |
| 6,310,610 B1 | 10/2001 | Beaton et al. |
| 6,323,846 B1 | 11/2001 | Westerman et al. |
| 6,483,498 B1 | 11/2002 | Colgan et al. |
| 6,501,529 B1 | 12/2002 | Kurihara et al. |
| 6,556,265 B1 | 4/2003 | Murade |
| 6,646,706 B2 | 11/2003 | Lim et al. |
| 6,646,707 B2 | 11/2003 | Noh et al. |
| 6,680,448 B2 | 1/2004 | Kawashima et al. |
| 6,690,387 B2 | 2/2004 | Zimmerman et al. |
| 6,762,815 B2 | 7/2004 | Lee |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee et al. |
| 7,663,607 B2 | 2/2010 | Hotelling et al. |
| 8,144,295 B2 | 3/2012 | Chang et al. |
| 8,294,865 B2 | 10/2012 | Chang et al. |
| 8,479,122 B2 | 7/2013 | Hotelling et al. |
| 8,497,967 B2 | 7/2013 | Chang et al. |
| 2001/0013915 A1 | 8/2001 | Song |
| 2001/0020578 A1 | 9/2001 | Baier |
| 2002/0084992 A1 | 7/2002 | Agnew |
| 2002/0159016 A1 | 10/2002 | Nishida et al. |
| 2004/0109097 A1 | 6/2004 | Mai |
| 2004/0114082 A1 | 6/2004 | Lee |
| 2004/0141096 A1 | 7/2004 | Mai |
| 2004/0189587 A1 | 9/2004 | Jung et al. |
| 2005/0052582 A1 | 3/2005 | Mai |
| 2005/0231487 A1 | 10/2005 | Ming |
| 2005/0243023 A1 | 11/2005 | Reddy et al. |
| 2005/0243228 A1 | 11/2005 | Lee et al. |
| 2005/0270435 A1* | 12/2005 | Shiau et al. ............ 349/54 |
| 2006/0007165 A1 | 1/2006 | Yang et al. |
| 2006/0026521 A1 | 2/2006 | Hotelling et al. |
| 2006/0097991 A1 | 5/2006 | Hotelling et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0203151 A1 | 9/2006 | Kim |
| 2006/0244736 A1 | 11/2006 | Tseng |
| 2007/0018969 A1 | 1/2007 | Chen et al. |
| 2007/0075977 A1 | 4/2007 | Chen et al. |
| 2007/0097278 A1 | 5/2007 | Rho et al. |
| 2007/0176905 A1 | 8/2007 | Shih et al. |
| 2007/0216657 A1 | 9/2007 | Konicek |
| 2007/0262967 A1 | 11/2007 | Rho |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0067528 A1 | 3/2008 | Choi et al. |
| 2008/0074401 A1 | 3/2008 | Chung et al. |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158172 A1 | 7/2008 | Hotelling et al. |
| 2008/0309627 A1 | 12/2008 | Hotelling et al. |
| 2009/0323007 A1 | 12/2009 | Shim |
| 2010/0001973 A1 | 1/2010 | Hotelling et al. |
| 2010/0123866 A1 | 5/2010 | Chang et al. |
| 2011/0222016 A1 | 9/2011 | Kaneko et al. |
| 2011/0248949 A1 | 10/2011 | Chang et al. |
| 2012/0154731 A1 | 6/2012 | Chang et al. |
| 2013/0045762 A1 | 2/2013 | Chang et al. |
| 2013/0329150 A1 | 12/2013 | Kim et al. |

FOREIGN PATENT DOCUMENTS

| | | |
|---|---|---|
| EP | 1 133 057 B1 | 9/2001 |
| EP | 1455264 | 9/2004 |
| EP | 1422601 | 5/2007 |
| EP | 1 939 673 A1 | 7/2008 |
| JP | 07-036017 A | 2/1995 |
| JP | 2000-163031 A | 6/2000 |
| JP | 2002-342033 A | 11/2002 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2010/065424 A3 | 6/2010 |
| WO | WO-2013/184597 | 12/2013 |

OTHER PUBLICATIONS

Lee, Seung, et al., Ultra-FFS TFT-LCD with Super Image Quality, Fast Response Time, and Strong Pressure-Resistant Characteristics, Journal of the SID, 2002, pp. 117-122.

Notice of Allowance mailed Jan. 17, 2012, for U.S. Appl. No. 12/340,567, filed Dec. 19, 2008, 10 pages.

International Search Report mailed Nov. 12, 2010, for PCT Application No. PCT/US2009/065978, filed Nov. 25, 2009, four pages.

Lee, S.K. et al. (Apr. 1985). "A Multi-Touch Three Dimensional Touch-Sensitive Tablet,"*Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Feb. 14, 2011, for U.S. Appl. No. 12/340,567, filed Dec. 19, 2008, nine pages.

Final Office Action mailed Jul. 14, 2011, for U.S. Appl. No. 12/340,567, filed Dec. 19, 2008, eight pages.

Notice of Allowance mailed Aug. 6, 2012, for U.S. Appl. No. 13/405,226, filed Feb. 24, 2012, seven pages.

Notice of Allowance mailed Apr. 30, 2013, for U.S. Appl. No. 13/656,580, filed Oct. 19, 2012, nine pages.

Non-Final Office Action mailed Dec. 3, 2012, for U.S. Appl. No. 13/656,580, filed Oct. 19, 2012, seven pages.

International Search Report mailed Sep. 17, 2013, for PCT Application No. PCT/US2013/043938, filed Jun. 3, 2013, five pages.

* cited by examiner

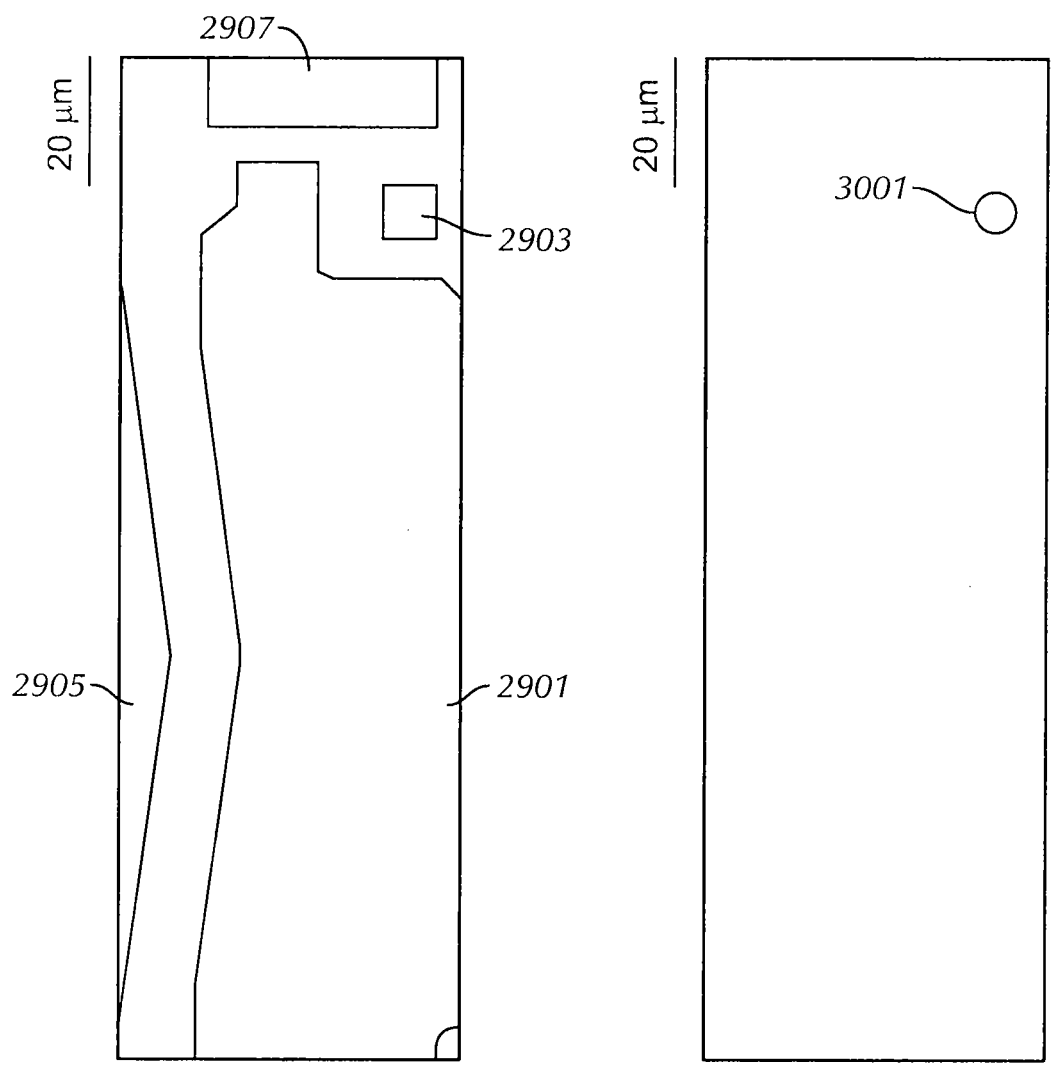
*FIG. 29*  *FIG. 30*

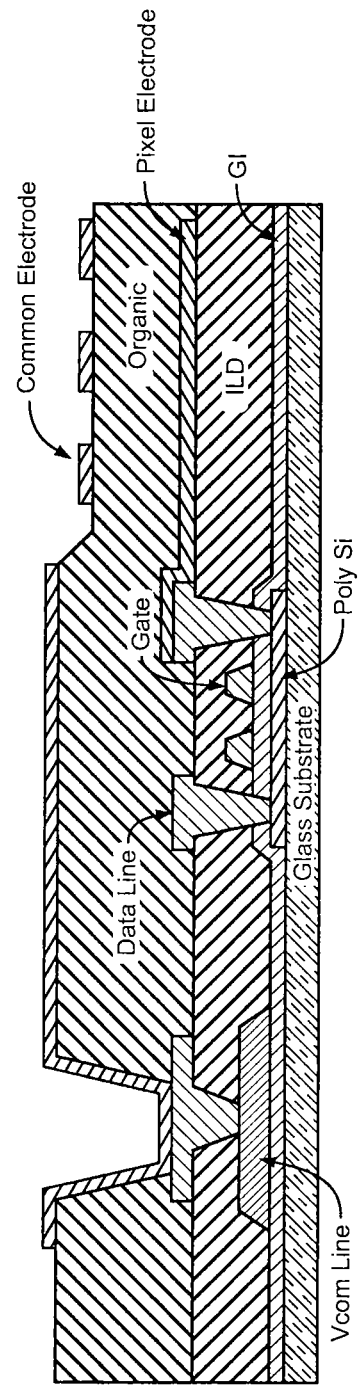
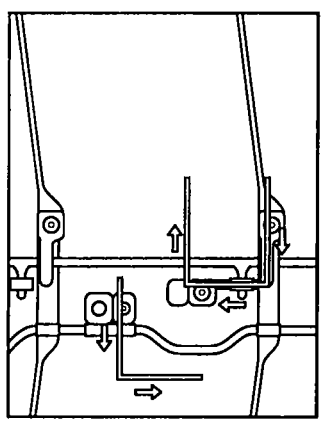
FIG. 33

| Layer | Material | Thickness | Sheet Resistance | Dielectric Constant |
|---|---|---|---|---|
| Poly | Poly-Si | 430A | - | - |
| GI | SiO2 | 750A | - | 4.0 |
| Gate | MoW | 3000A | 0.67 | - |
| ILD | SiNx/SiO2 | 3100A/3700A | - | 7.5/4.0 |
| Data | Ti/Al/Ti | 1750/2750/500 | 0.14 | - |
| Pixel Electrode | IZO | 500A | - | - |
| Organic | Organic | 0.6 um (on PE) 0.8 um (on Data) | - | 3.5 |
| Common Electrode | IZO | 500A | - | - |
| PS | Organic | 2.1 um | - | - |
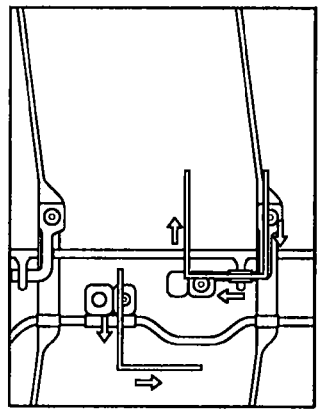
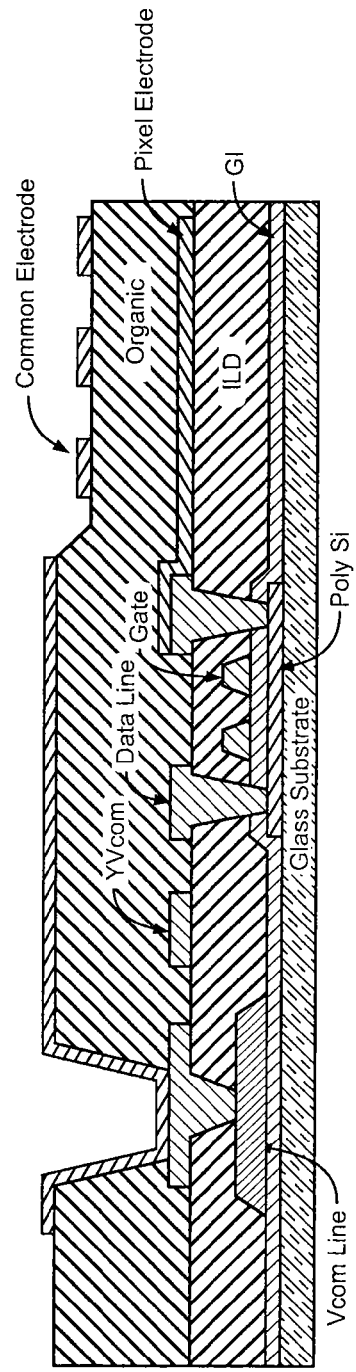
FIG. 43

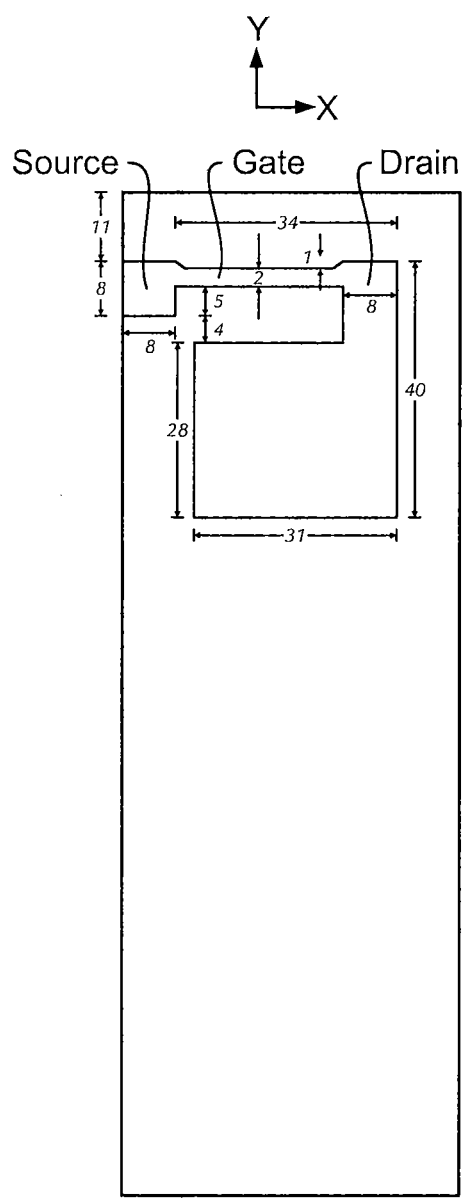
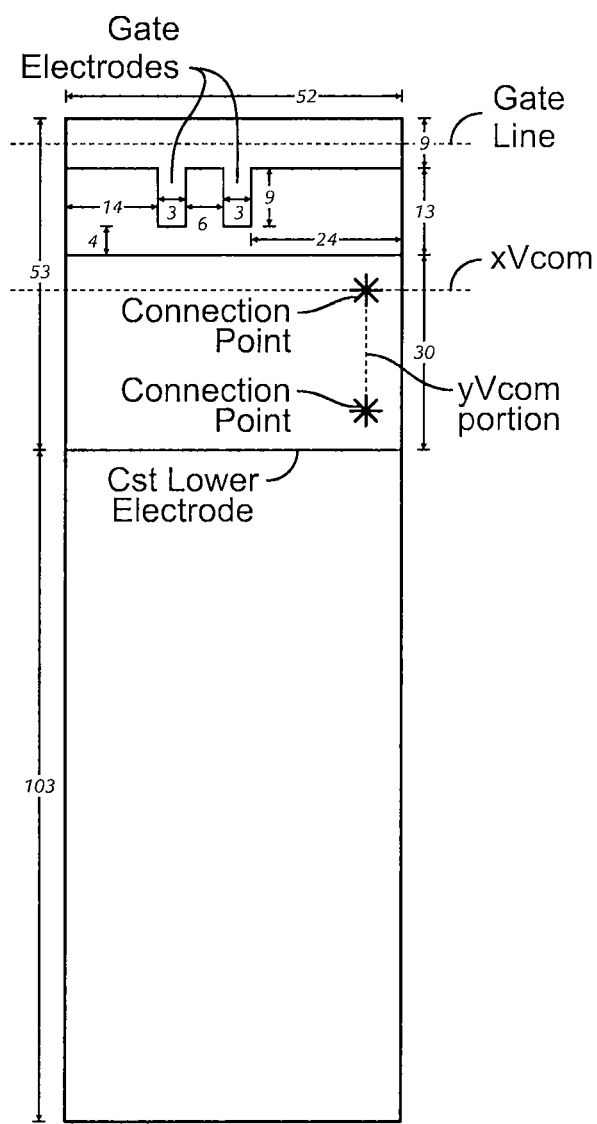
*FIG. 44*     *FIG. 45*

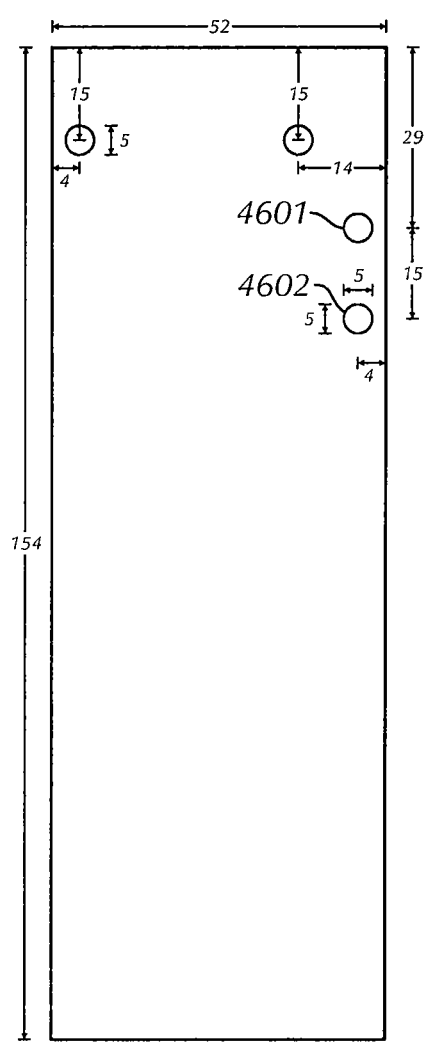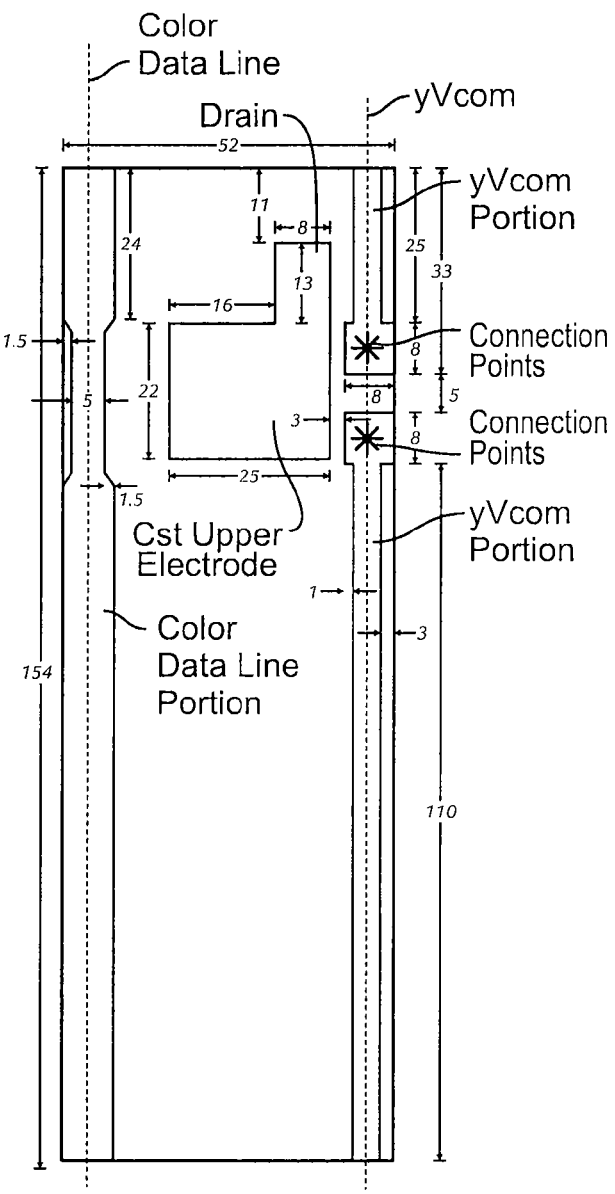
*FIG. 46*  *FIG. 47*

INTEGRATED TOUCH PANEL FOR A TFT DISPLAY

FIELD OF THE INVENTION

This relates generally to multi-touch sensing displays, and more specifically to combining multi-touch sensing functionality and LCD display functionality.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Multi-touch screens or multi-touch panels are a further development of touch screens. These allow for the device to sense multiple touch events at a time. More specifically, a multi-touch panel can allow a device to sense the outlines of all fingers or other objects that are touching the panel at a given time. Thus, while a single touch panel may only sense a single location that is being touched, a multi-touch panel can provided an entire "touch graphic" which indicates the status (touched or not touched) of a plurality of touch pixels at the panel.

An exemplary multi-touch enabled display is disclosed by U.S. patent application Ser. No. 11/649,998 filed on Jan. 3, 2007, entitled "PROXIMITY AND MULTI-TOUCH SENSOR DETECTION AND DEMODULATION", Pub. No. 2008/0158172 which is hereby incorporated by reference herein in its entirety for all purposes. Early multi-touch displays required manufacturing of a multi-touch sensing panel and a separate display panel. The two panels can later be laminated together to form a multi-touch display. Later generations of the technology provided for combining the display and multi-touch functionality in order to reduce power consumption, make the multi-touch display thinner, reduce costs of manufacturing, improve brightness, etc. Examples of such integrated multi-touch displays are disclosed by U.S. application Ser. No. 11/818,422 filed on Jun. 13, 2007 and entitled "INTEGRATED IN-PLANE SWITCHING", and U.S. application Ser. No. 12/240,964, filed on Jul. 3, 2008 and entitled "DISPLAY WITH DUAL-FUNCTION CAPACITIVE ELEMENTS," both of which are incorporate by reference herein in their entireties for all purposes.

However, some of the schemes for integration can require placing some additional non-transparent elements in the thin film transistor (TFT) layer of the display. Such additional non-transparent elements can reduce the aperture of the display (the aperture being the portion of the display that actually transmits light). Reduction of the aperture can cause reduction of the brightness of the display as well as a reduction in the viewable angle of the display.

SUMMARY OF THE INVENTION

This relates to displays including pixels with dual-function capacitive elements. Specifically, these dual-function capacitive elements form part of the display system that generates an image on the display, and also form part of a touch sensing system that senses touch events on or near the display. The capacitive elements can be, for example, capacitors in pixels of an LCD display that are configured to operate individually, each as a pixel storage capacitor, or electrode, of a pixel in the display system, and are also configured to operate collectively as elements of the touch sensing system. In this way, for example, a display with integrated touch sensing capability may be manufactured using fewer parts and/or processing steps, and the display itself may be thinner and brighter.

Furthermore, this relates to displays for which the use of dual function capacitive elements does not result in any decreases of the aperture of the display. Thus, touch sensitive displays that have aperture ratios that are no worse than similar non-touch sensing displays can be manufactured. More specifically, this relates to placing touch sensing opaque elements so as to ensure that they are substantially overlapped by display related opaque elements, thus ensuring that the addition of the touch sensing elements does not substantially reduce the aperture ratio. The touch sensing display elements can be, for example, common lines that connect various capacitive elements that are configured to operate collectively as an element of the touch sensing system.

BRIEF DESCRIPTION OF THE DRAWINGS

FIG. 29 illustrates a first layer of transparent conductive material, such as ITO, formed on pixels in the example IPS LCD display using LTPS according to embodiments of the invention.

FIG. 30 illustrates a connection in the example IPS LCD display using LTPS according to embodiments of the invention.

FIG. 33 illustrates a side view of a pixel in the example IPS LCD display using LTPS according to embodiments of the invention.

FIG. 43 illustrates a side view of a pixel in the example IPS LCD display using LTPS in which a yVcom line is formed in an M2 layer according to embodiments of the invention.

FIG. 44 illustrates a semiconductor layer of poly-Si in an example ECB LCD display using LTPS according to embodiments of the invention.

FIG. 45 illustrates a first layer of metal (M1) in the example ECB LCD display using LTPS according to embodiments of the invention.

FIG. 46 illustrates connections in the example ECB LCD display using LTPS according to embodiments of the invention.

FIG. 47 illustrates a second metal layer (M2) in the example ECB LCD display using LTPS according to embodiments of the invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to displays including pixels with dual-function capacitive elements. Specifically, these dual-function capacitive elements form part of the display system that generates an image on the display, and also form part of a touch sensing system that senses touch events on or near the display. The capacitive elements can be, for example, capacitors in pixels of an LCD display that are configured to operate individually, each as a pixel storage capacitor, or electrode, of a pixel in the display system, and are also configured to operate collectively as elements of the touch sensing system. In this way, for example, a display with integrated touch sensing capability may be manufactured using fewer parts and/or processing steps, and the display itself may be thinner and brighter.

Furthermore, this relates to dual function displays as discussed above, that further feature additional improvements of the aperture (and thus the brightness and the viewing angle) of the display. Said additional improvements can be realized by ensuring that touch sensing related common lines are positioned in such a manner that they do not significantly degrade the aperture ratio of the display from what it would have been had no touch sensing elements been present. For example, the touch sensing related common lines can be positioned in such a manner so that they are overlapped by various opaque display related elements.

While the present invention is described in relation to specific types of displays and specific schemes of capacitance based touch sensing, it is not so limited. A person of skill in the art would recognize that embodiments of the invention can be used in conjunction with other types of displays and touch sensing schemes, as long as the displays include pixels having capacitance causing electrodes, and the touch sensing schemes at least partially rely on sensing capacitance.

Figure 1:
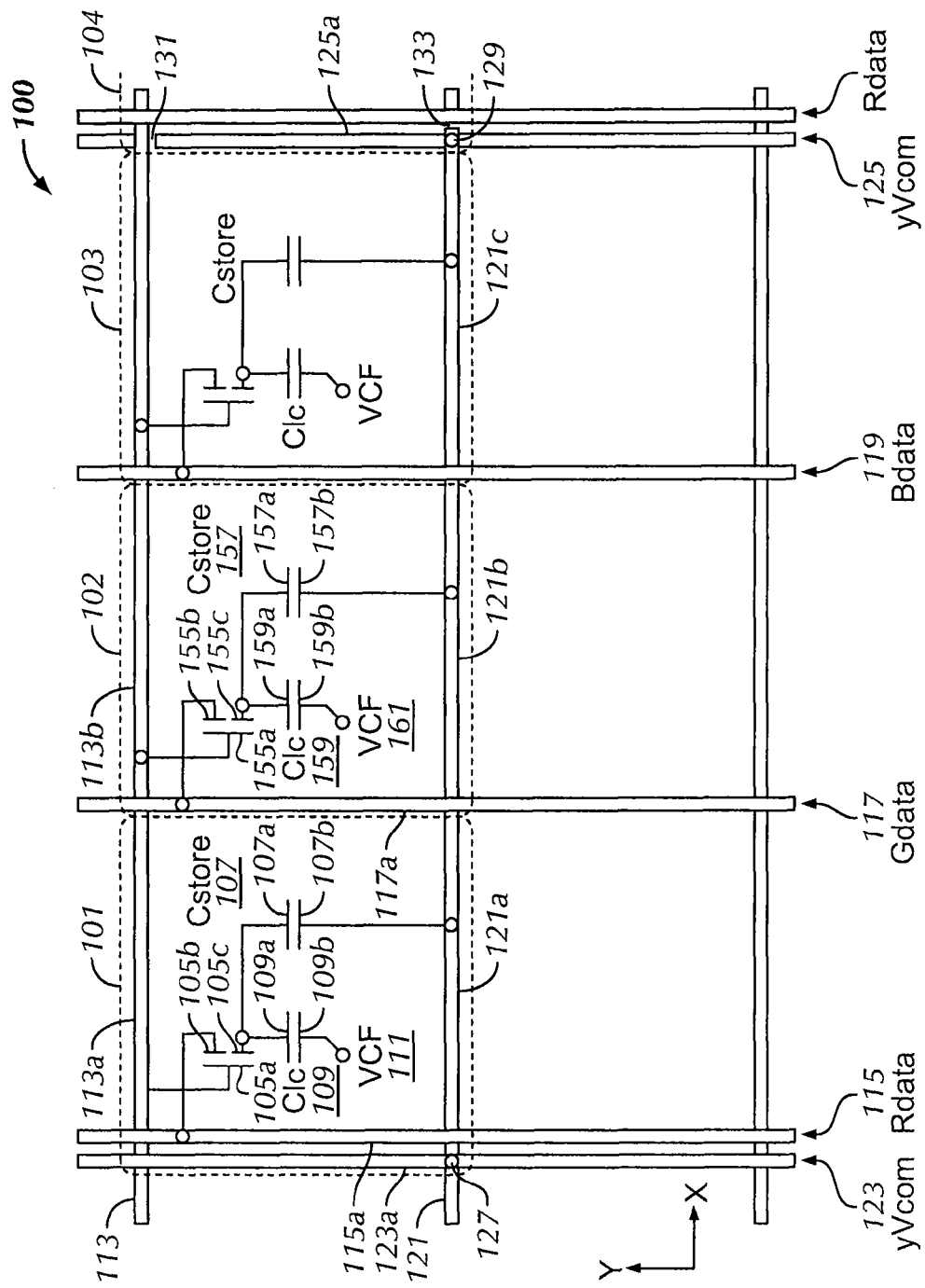
FIG. 1 illustrates a partial circuit diagram of an example LCD display including a plurality of LCD pixels according to embodiments of the present invention.

FIG. 1 is a partial circuit diagram of an example LCD display 100 including a plurality of LCD pixels according to embodiments of the present invention. The pixels of panel 100 are configured such that they are capable of dual-functionality as both LCD pixels and touch sensor elements. That is, the pixels include capacitive elements or electrodes, that can operate as part of the LCD display circuitry of the pixels and that can also operate as elements of touch sensing circuitry. In this way, panel 100 can operate as an LCD display with integrated touch sensing capability. FIG. 1 shows details of pixels 101, 102, 103, and 104 of display 100.

Pixel 102 includes a thin film transistor (TFT) 155 with a gate 155a, a source 155b, and a drain 155c. Pixel 102 also includes a storage capacitor, Cst 157, with an upper electrode 157a and a lower electrode 157b, a liquid crystal capacitor, Clc 159, with a pixel electrode 159a and a common electrode 159b, and a color filter voltage source, Vcf 161. If a pixel is an in-plane-switching (IPS) pixel, Vcf can be, for example, a fringe field electrode connected to a common voltage line in parallel with Cst 157. If a pixel does not utilize IPS, Vcf 151 can be, for example, an ITO layer on the color filter glass. Pixel 102 also includes a portion 117a of a data line for green (G) color data, Gdata line 117, and a portion 113b of a gate line 113. Gate 155a is connected to gate line portion 113b, and source 155b is connected to Gdata line portion 117a. Upper electrode 157a of Cst 157 is connected to drain 155c of TFT 155, and lower electrode 157b of Cst 157 is connected to a portion 121b of a common voltage line that runs in the x-direction, xVcom 121. Pixel electrode 159a of Clc 159 is connected to drain 155c of TFT 155, and common electrode 159b of Clc 159 is connected to Vcf 151.

The circuit diagram of pixel 103 is identical to that of pixel 102. However, color data line 119 running through pixel 103 carries blue (B) color data. Pixels 102 and 103 can be, for example, conventional LCD pixels.

Similar to pixels 102 and 103, pixel 101 includes a thin film transistor (TFT) 105 with a gate 105a, a source 105b, and a drain 105c. Pixel 101 also includes a storage capacitor, Cst 107, with an upper electrode 107a and a lower electrode 107b, a liquid crystal capacitor, Clc 109, with a pixel electrode 109a and a common electrode 109b, and a color filter voltage source, Vcf 111. Pixel 101 also includes a portion 115a of a data line for red (R) color data, Rdata line 115, and a portion 113a of gate line 113. Gate 105a is connected to gate line portion 113a, and source 105b is connected to Rdata line portion 115a. Upper electrode 107a of Cst 107 is connected to drain 105c of TFT 105, and lower electrode 107b of Cst 107 is connected to a portion 121a of xVcom 121. Pixel electrode 109a of Clc 109 is connected to drain 105c of TFT 105, and common electrode 109b of Clc 109 is connected to Vcf 111.

Unlike pixels 102 and 103, pixel 101 also includes a portion 123a of a common voltage line running in the y-direction, yVcom 123. In addition, pixel 101 includes a connection 127 that connects portion 121a to portion 123a. Thus, connection 127 connects xVcom 121 and yVcom 123.

Pixel 104 is similar to pixel 101, except that a portion 125a of a yVcom 125 has a break (open) 131, and a portion 121b of xVcom 121 has a break 133.

As can be seen in FIG. 1, the lower electrodes of storage capacitors of pixels 101, 102, and 103 are connected together by xVcom 121. This is a conventional type of connection in many LCD panels and, when used in conjunction with conventional gate lines, data lines, and transistors, allows pixels to be addressed. The addition of vertical common voltage lines along with connections to the horizontal common voltage lines allows grouping of pixels in both the x-direction and y-direction, as described in further detail below. For example, yVcom 123 and connection 127 to xVcom 121 can allow the storage capacitors of pixels 101, 102, and 103 to be connected to storage capacitors of pixels that are above and below pixels 101, 102, 103 (the pixels above and below are not shown). For example, the pixels immediately above pixels 101, 102, and 103 can have the same configurations as pixels 101, 102, and 103, respectively. In this case, the storage capacitors of the pixels immediately above pixels 101, 102, and 103 would be connected to the storage capacitors of pixels 101, 102, and 103.

In general, an LCD panel could be configured such that the storage capacitors of all pixels in the panel are connected together, for example, through at least one vertical common voltage line with connections to a plurality of horizontal common voltage lines. Another LCD panel could be configured such that different groups of pixels are connected together to form a plurality of separate regions of connected-together storage capacitors.

One way to create separate regions is by forming breaks (opens) in the horizontal and/or vertical common lines. For example, yVcom. 125 of panel 100 has a break 131, which can allow pixels above the break to be isolated from pixels below the break. Likewise, xVcom 121 has a break 133, which can allow pixels to the right of the break to be isolated from pixels to the left of the break.

Figure 2A:
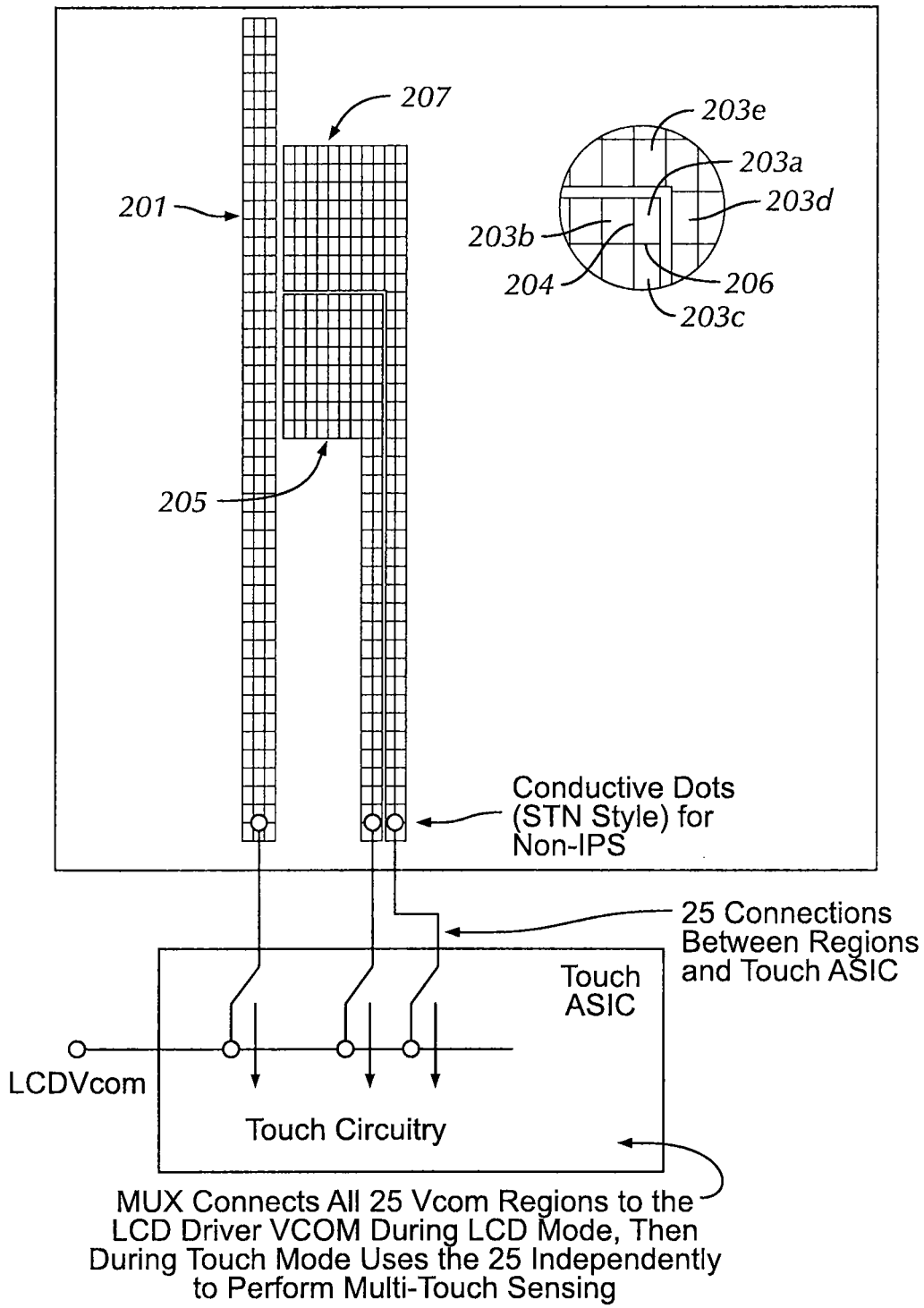
FIGS. 2A and 2B illustrate example regions formed by breaks in vertical and horizontal common voltage lines according to embodiments of the invention.
Figure 2B:
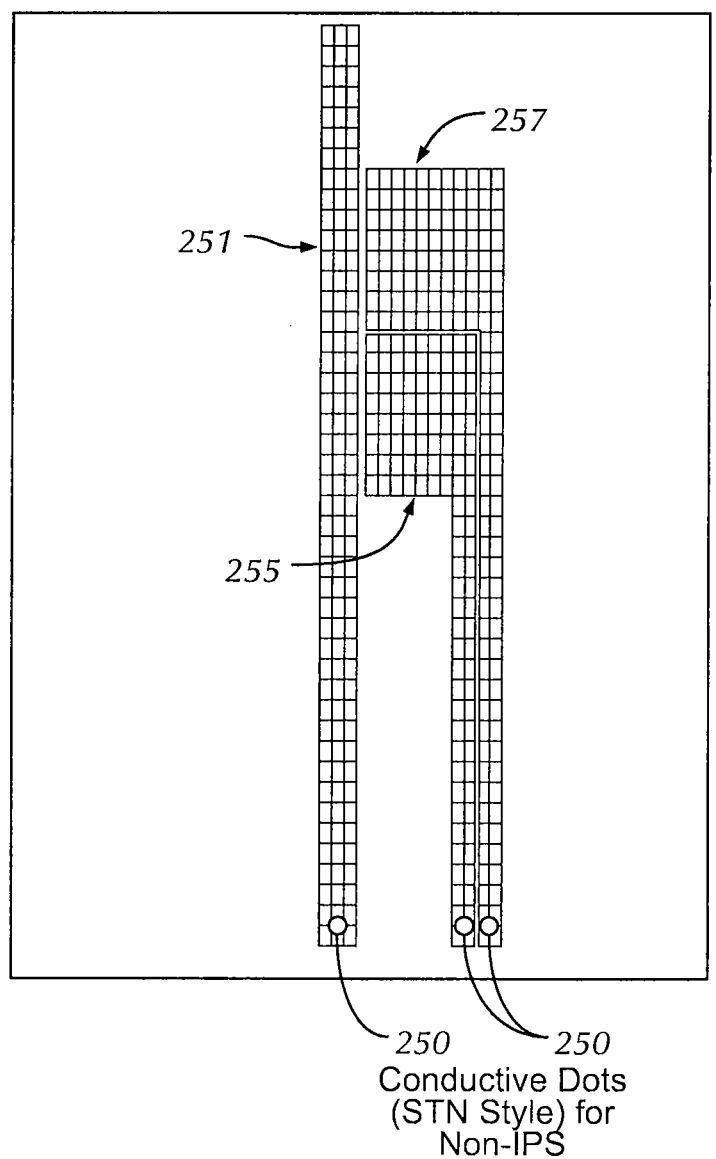

FIGS. 2A and 2B illustrate example regions formed by breaks in vertical and horizontal common voltage lines according to embodiments of the invention. FIG. 2A shows a TFT glass region layout. FIG. 2A shows a region 201, a region 205, and a region 207. Each region 201, 205, and 207 is formed by linking storage capacitors of a plurality of pixels (not shown in detail) through common voltage lines in the vertical direction (y-direction) and in the horizontal direction (x-direction). For example, the enlarged area of FIG. 2A shows pixel blocks 203a-e. A pixel block includes one or more pixels, in which at least one of the pixels includes a vertical common line, yVcom. FIG. 1, for example, illustrates a pixel block that includes pixels 101-103, in which pixel 101 includes yVcom 123. As seen in FIG. 2A, pixel block 203a is connected in the horizontal direction to pixel block 203b through a horizontal common line, xVcom 206. Likewise, pixel block 203a is connected in the vertical direction to pixel block 203c through a vertical common line, yVcom 204. A break in xVcom 206 prevents block 203a from being connected to block 203d, and a break in yVcom 204 prevents block 203a from being connected to block 203e. Regions 201 and 207 form a capacitive element that can provide touch sensing information when connected to suitable touch circuitry, such as touch circuitry 213 of touch ASIC 215. The connection is established by connecting the regions to switch circuitry 217, which is described in more detail below. (Note, for IPS-type displays there are no conductive dots required. In this case, the xVcom and yVcom regions may simply extended with metal traces that go to the Touch ASIC which is bonded to the glass in a similar way as the LCD driver chip (through anisotropic conductive adhesive). However, for non-IPS-type displays, the conductive dots may be needed to bring the VCOM regions on the color filter plate into contact with the corresponding regions on the TFT plate.) Likewise, region 201 and region 205 form a capacitive element that can provide touch information when connected to touch circuitry 213. Thus, region 201 serves as a common electrode to regions 205 and 207, which are called, for example, sense electrodes. The foregoing describes mutual capacitance mode of touch sensing. It is also possible to use each region independently to measure self-capacitance.

Some embodiments of the invention are directed to fringe field switching TFT liquid crystal displays (FFS TFT LCDs), which are considered to a be specific type of in plane switching (IPS) displays. An example of an FFS TFT LCD is described by Lee, Seung Hee et al., "Ultra-FFS TFT-LCD with Super Image Quality, Fast Response Time, and Strong Pressure-Resistant Characteristics," Journal of the Society for Information displays Oct. 2, 2002. The above publication is hereby incorporated by reference herein in its entirety for all purposes. Fringe field switching displays provide for a common electrode, which is an electrode that forms one plate of the storage capacitor for each pixel but is common for a number of pixels. In some displays the common electrode can be common for the entire display; in others, multiple common electrodes can be used for rows of pixels or the like.

In FFS TFT LCD embodiments of the present invention, the common electrodes can be cut or shaped along the touch regions. Thus, for example, touch regions 201, 205 and 207 may comprise different common electrodes that are separated from their neighboring common electrodes by empty space or by an insulator. Thus each common electrode may be an individual touch region. Since the common electrodes are conducting, VCOM lines are technically not required for the FFS TFT LCD embodiments. However, the common electrodes can be made out of transparent conductive material (such as ITO) as usually required for FFS TFT LCDs. Transparent conductors usually have relatively high resistances. This can reduce the sensitivity of touch regions 201, 205 and 207, especially at high frequencies. Therefore, some embodiments provide that even if a FFS TFT display is used, non transparent, low resistance common lines can be used to reduce the effective resistance of the touch regions. However, in these cases, the common lines can vary in density as needed and need not go through every pixel.

As described above, the regions connected-together storage capacitors of pixels can be formed using vias between common voltage lines, such as xVcom and yVcom in FIG. 1, and using selective breaks in the common voltage lines. Thus, FIG. 2A illustrates one way in which vias or other connections and selective breaks can be used to create capacitive regions that can span many pixels. Of course, in light of the present disclosure, one skilled in the art would readily understand that regions of other shapes and configurations can be created.

FIG. 2B shows a CF glass patterned ITO region layout, which may or may not be needed, depending on the type of LCD technology used by the pixel. For example, such CF ITO regions would not be needed in the case that the LCD pixel utilizes in-plane-switching (IPS). However, FIG. 2B is directed to non-IPS LCD displays in which a voltage is applied to liquid crystal between an upper and lower electrode. FIG. 2B shows upper regions 221, 223, and 225, which correspond to lower (in non-IPS displays) regions 201, 205, and 207, respectively, of FIG. 2A. FIG. 2B shows conductive dots 250 contacting regions 251, 255, and 257. Conductive dots 250 connect the corresponding upper and lower regions such that when to the upper electrodes of pixels in an upper region are driven, the corresponding lower electrodes of pixels in the lower region are also driven. As a result, the relative voltage between the upper and lower electrodes remains constant, even while the pixels are being driven by, for example, a modulated signal. Thus the voltage applied to the liquid crystal can remain constant during a touch phase, for example. In particular, the constant relative voltage can be the pixel voltage for operation of the LCD pixel. Therefore, the pixels can continue to operate (i.e., display an image) while touch input is being detected.

A touch sensing operation according to embodiments of the invention will be described with reference to FIGS. 3-5B. For the sake of clarity, the operation is described in terms of a single drive pixel and a single sense pixel. However, it is understood that the drive pixel is connected to other drive pixels in a drive region and the sense pixel is connected to other sense pixels in the sense region, as described above. Thus, in actual operation, the entire drive region is driven, and the entire sense region can contribute to the sensing of touch.

Figure 3:
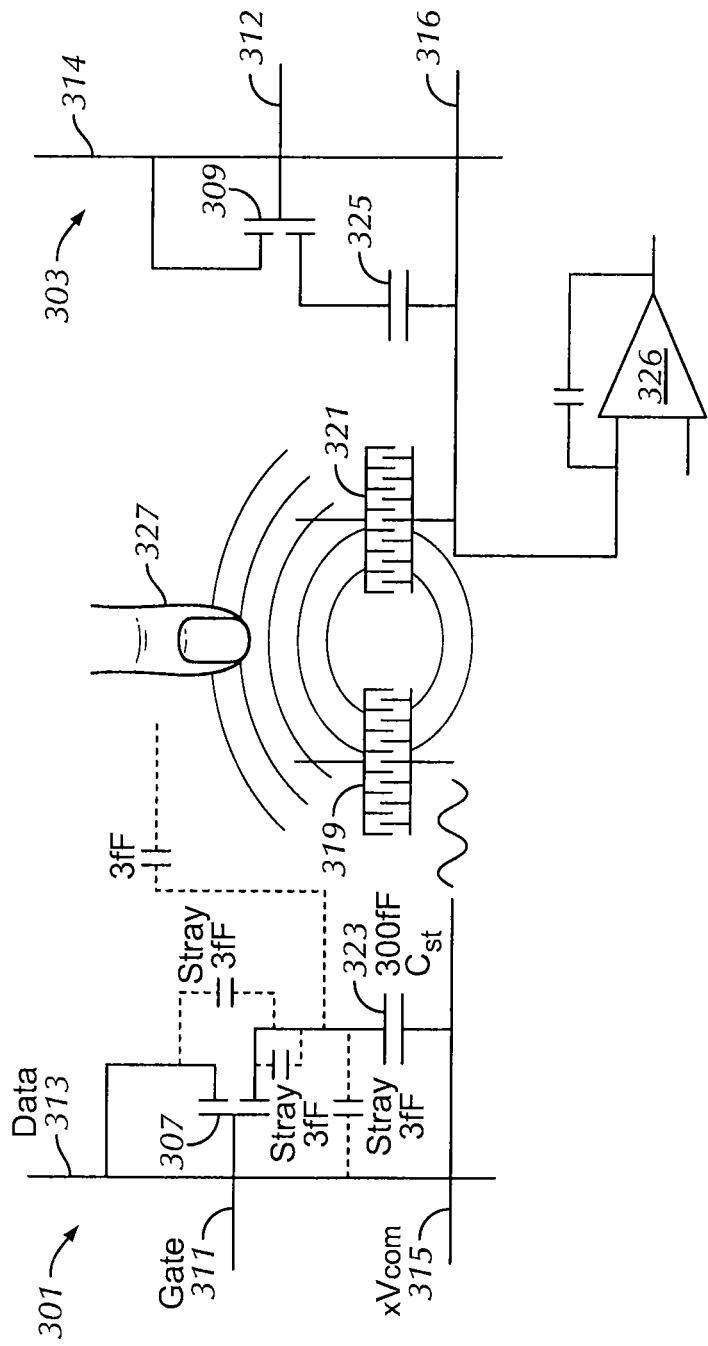
FIG. 3 illustrates partial circuit diagrams of a pixel 301 of a drive region and a pixel 303 of an example sense region.

FIG. 3 shows partial circuit diagrams of a pixel 301 of a drive region and a pixel 303 of an example sense region. Pixels 301 and 303 include TFTs 307 and 309, gate lines 311 and 312, data lines 313 and 314, xVcom lines 315 and 316, fringe field electrodes 319 and 321, and storage capacitors 323 and 325. Storage capacitors 323 and 325 each have a capacitance of about 300 fF (femto-Farads). A lower electrode of fringe field electrode 321 of pixel 303 can be connected, through xVcom 316, to a charge amplifier 326 in the sense circuitry. Charge amplifier 326 holds this line at a virtual ground such that any charge that gets injected from fringe field electrode 321 shows up as a voltage output of the amplifier. While the feedback element of the amplifier is shown as a capacitor; it may also function as a resistor or a combination of a resistor and capacitor. The feedback can also be, for example, a resistor and capacitor feedback for minimizing die-size of the touch sensing circuitry. FIG. 3 also shows a finger 327 that creates a stray capacitance of approximately 3 fF with a cover glass (not shown), and shows other stray capacitances in the pixels, each of which is approximately 3 fF.

Figure 4A:
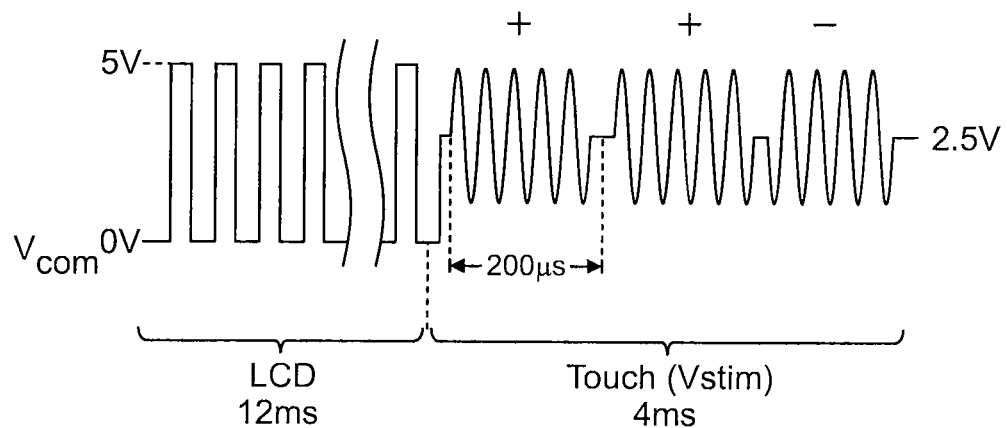
FIG. 4A illustrates example signals applied to the pixels of a drive region during an LCD phase and during a touch phase according to embodiments of the invention.

FIG. 4A shows example signals applied through xVcom 315 to the pixels of the drive region, including pixel 301, during an LCD phase and during a touch phase. During the LCD phase, xVcom 315 is driven with a square wave signal of 2.5V+/−2.5V, in order to perform LCD inversion. The LCD phase is 12 ms in duration. In the touch phase, xVcom 315 is driven with 15 to 20 consecutive stimulation phases lasting 200 microseconds each. The stimulation signals in this case are sinusoidal signals of 2.5V+/−2V each having the same frequency and a relative phase of either 0 degrees or 180 degrees (corresponding to "+" and "−" in FIG. 4A). The touch phase is 4 ms in duration.

Figure 5A:
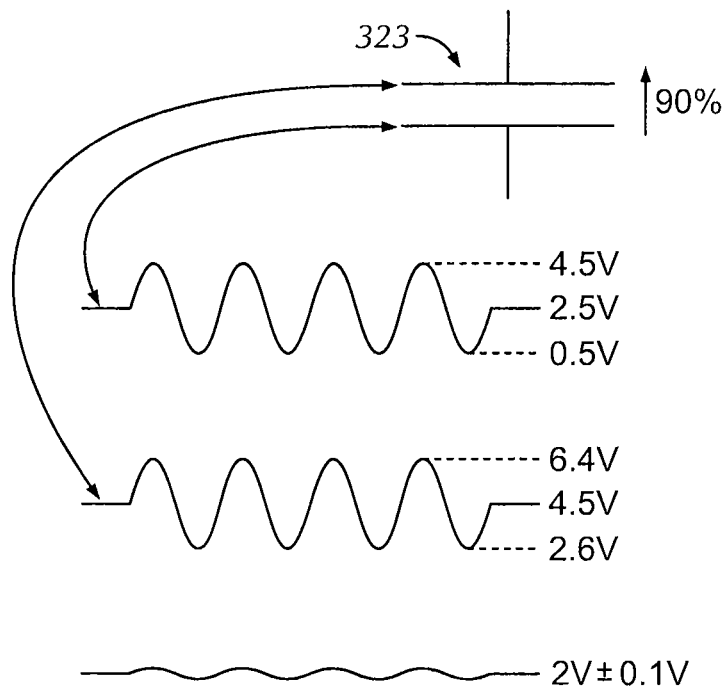
FIG. 5A illustrates details of an example operation of a storage capacitor of a drive region during a touch phase according to embodiments of the invention.

FIG. 5A shows details of the operation of storage capacitor 323 during the touch phase. In particular, because the capacitance of storage capacitor 323 is much higher than the other capacitances, i.e., stray capacitances shown in FIG. 3, almost all (approximately 90%) of the AC component of the 2.5V±2V sinusoidal stimulation signal that is applied at the lower electrode of the storage capacitor is transferred to the upper electrode. Therefore, the upper electrode, which is charged to 4.5 volts DC for the operation of the LCD, sees a sinusoidal signal of 4.5V+/−1.9V. These signals are passed to the corresponding left and right comb structures of fringe field electrode 319. In this way, both comb structures of fringe field electrode 319 can be modulated with a signal having an AC component of approximately +/−2V in amplitude (+/−2V on one, +/−1.9V on the other). Thus, fringe field electrode 319, together with the other fringe field electrodes of pixels in the drive region being similarly driven, can operate as a drive line for capacitive sensing.

It is important to note that at the same time fringe field electrode 319 is configured to operate as a drive element for the touch sensing system, the fringe field electrode continues to operate as a part of the LCD display system. As shown in FIG. 5A, while the voltages of the comb structures of fringe field electrode are each modulated at approximately +/−2V, the relative voltage between the comb structures remains approximately constant at 2V+/−0.1V. This relative voltage is the voltage that is seen by the liquid crystal of the pixel for the LCD operation. The 0.1V AC variance in the relative voltage during the touch phase should have an acceptably low effect on the LCD display, particularly since the AC variance would typically have a frequency that is higher than the response time for the liquid crystal. For example, the stimulation signal frequency, and hence the frequency of the AC variance, would typically be more than 100 kHz. However, the response time for liquid crystal is typically less than 100 Hz. Therefore, the fringe field electrode's function as a drive element in the touch system should not interfere with the fringe field electrode's LCD function.

Figure 4B:
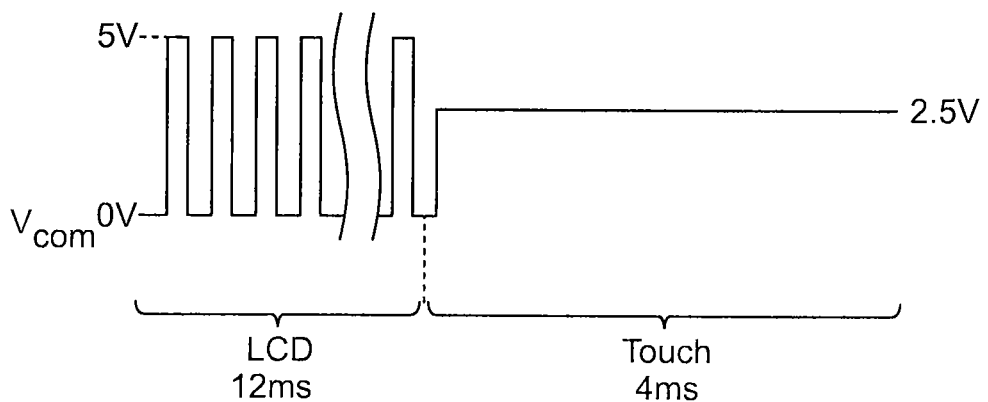
FIG. 4B illustrates example signals applied to the pixels of a sense region during an LCD phase and during a touch phase according to embodiments of the invention.
Figure 5B:
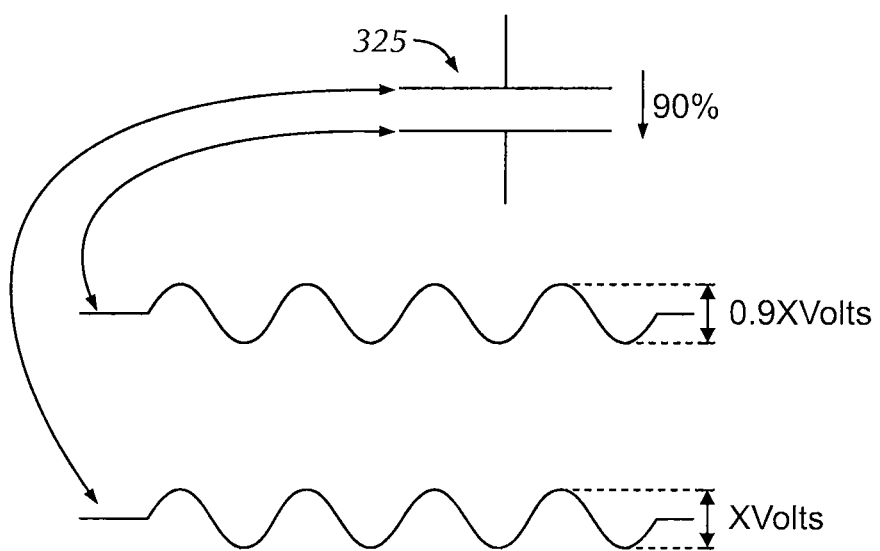
FIG. 5B illustrates details of an example operation of a storage capacitor of a sense region during a touch phase according to embodiments of the invention.

Referring now to FIGS. 3, 4B, and 5B, an example operation of the sense region will now be described. FIG. 4B shows signals applied through xVcom 316 to the pixels of the sense region, including pixel 303, during the LCD and touch phases described above. As with the drive region, xVcom 316 is driven with a square wave signal of 2.5V+/−2.5V in order to perform LCD inversion during the LCD phase. During the touch phase, xVcom 316 is connected to amplifier 326, which holds the voltage at or near a virtual ground of 2.5V. Consequently, fringe field electrode 321 is also held at 2.5V. As shown in FIG. 3, fringing electrical fields propagate from fringe field electrode 319 to fringe field electrode 321. As described above, the fringing electric fields are modulated at approximately +/−2V by the drive region. When these fields are received by the top electrode of fringing field electrode 321, most of the signal gets transferred to the lower electrode, because pixel 303 has the same or similar stray capacitances and storage capacitance as pixel 301. Because xVcom 316 is connected to charge amplifier 326, and is being held at virtual ground, any charge that gets injected will show up as an output voltage of the charge amplifier. This output voltage provides the touch sense information for the touch sensing system. For example, when finger 327 gets close to the fringing fields, it captures some fields and grounds them, which causes a disturbance in the fields. This disturbance can be detected by the touch system as a disturbance in the output voltage of charge amplifier 326. FIG. 5B shows that approximately 90% of a received fringing field at pixel 302 which impinges onto the electrode half of the capacitor which is also connected to the drain of the TFT 325 will be transferred to charge amplifier 326. 100% of the charge that impinges onto the electrode half of the capacitor which is connected directly to xVcom 316 will be transferred to charge amplifier 326. The ratio of charge impinging onto each electrode will depend on the LCD design. For non-IPS, near 100% of the finger affected charge will impinge on the VCOM electrode because the patterned CF plate is nearest the finger. For IPS type display the ratio will be closer to half and half because each part of the electrode has approximately equal area (or ¼ vs. ¾) facing the finger. For some sub-types of IPS displays, the fringing electrodes are not coplanar, and the majority of the upward facing area is devoted to the VCOM electrode.

The example driving and sensing operations of FIGS. 3, 4A-B, and 5A-B are described using single pixels for the sake of clarity. Some example layouts and operations of drive regions and sense regions according to embodiments of the invention will now be described with reference to FIGS. 6A-C, 7, 8A-C, 9A-C, and 10.

Figure 6A:
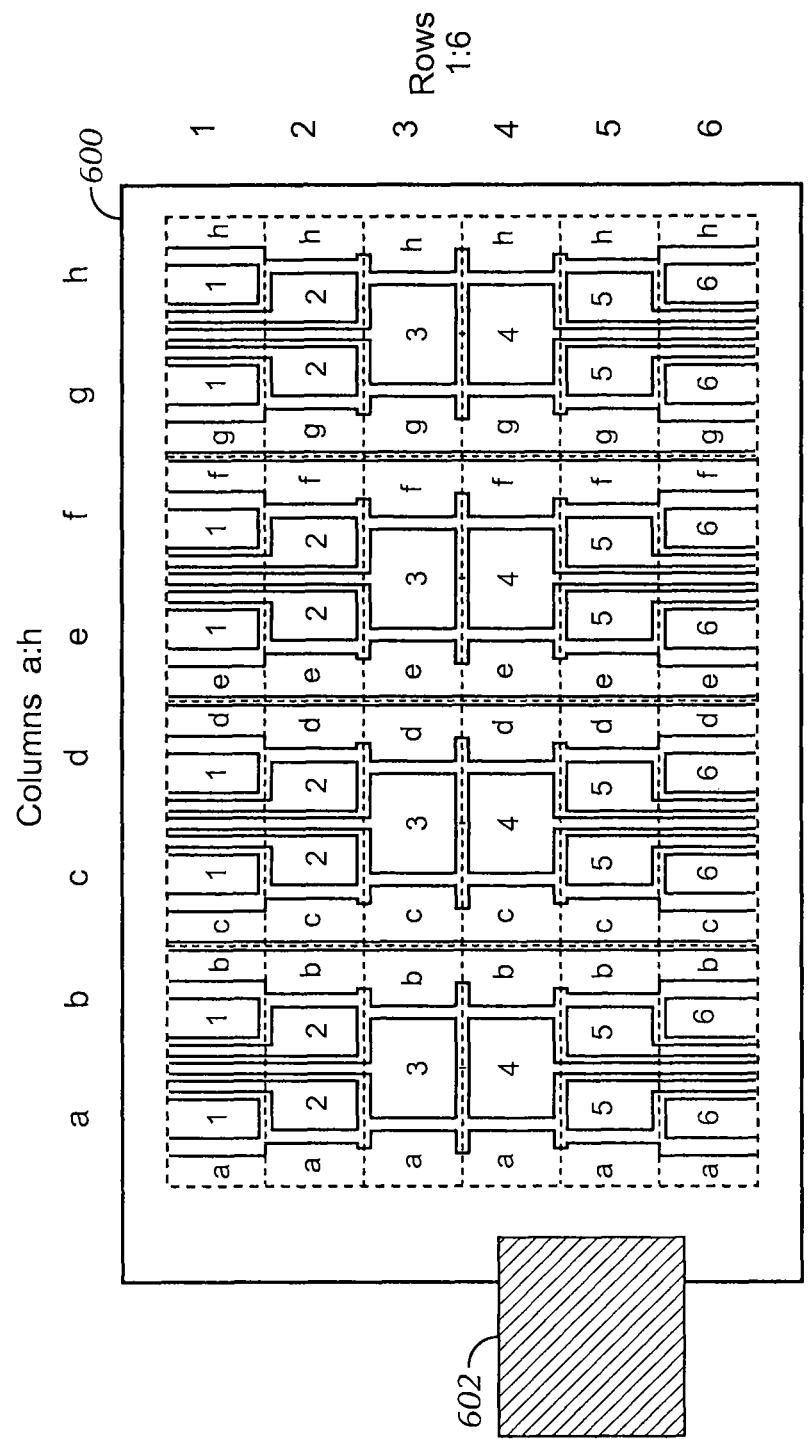
FIG. 6A illustrates a partial view of an example touch screen having regions of pixels with dual-function capacitive elements that operate as LCD elements and as touch sensors according to embodiments of the invention.

FIG. 6A illustrates a partial view of an example touch screen 600 having regions of pixels with dual-function capacitive elements that operate as LCD elements and as touch sensors according to embodiments of the invention. In the example of FIG. 6A, touch screen 600 having eight columns (labeled a through h) and six rows (labeled 1 through 6) is shown, although it should be understood that any number of columns and rows can be employed. Columns a through h can be formed from column-shaped regions, although in the example of FIG. 6A, one side of each column includes staggered edges and notches designed to create separate sections in each column. Each of rows 1 through 6 can be formed from a plurality of distinct patches or pads within the regions, each patch connected to a border area through one or more yVcom lines running to the border area of touch screen 600 for enabling all patches in a particular row to be connected together through metal traces (not shown in FIG. 6A) running in the border areas. These metal traces can be routed to a small area on one side of touch screen 600 and connected to a flex circuit 602. As shown in the example of FIG. 6A, the patches forming the rows can be formed, by selective placement of breaks in xVcom lines and yVcom lines, for example, in a generally pyramid-shaped configuration. In FIG. 6A, for example, the patches for rows 1-3 between columns a and b are arranged in an inverted pyramid configuration, while the patches for rows 4-6 between columns a and b are arranged in an upright pyramid configuration.

Figure 6B:
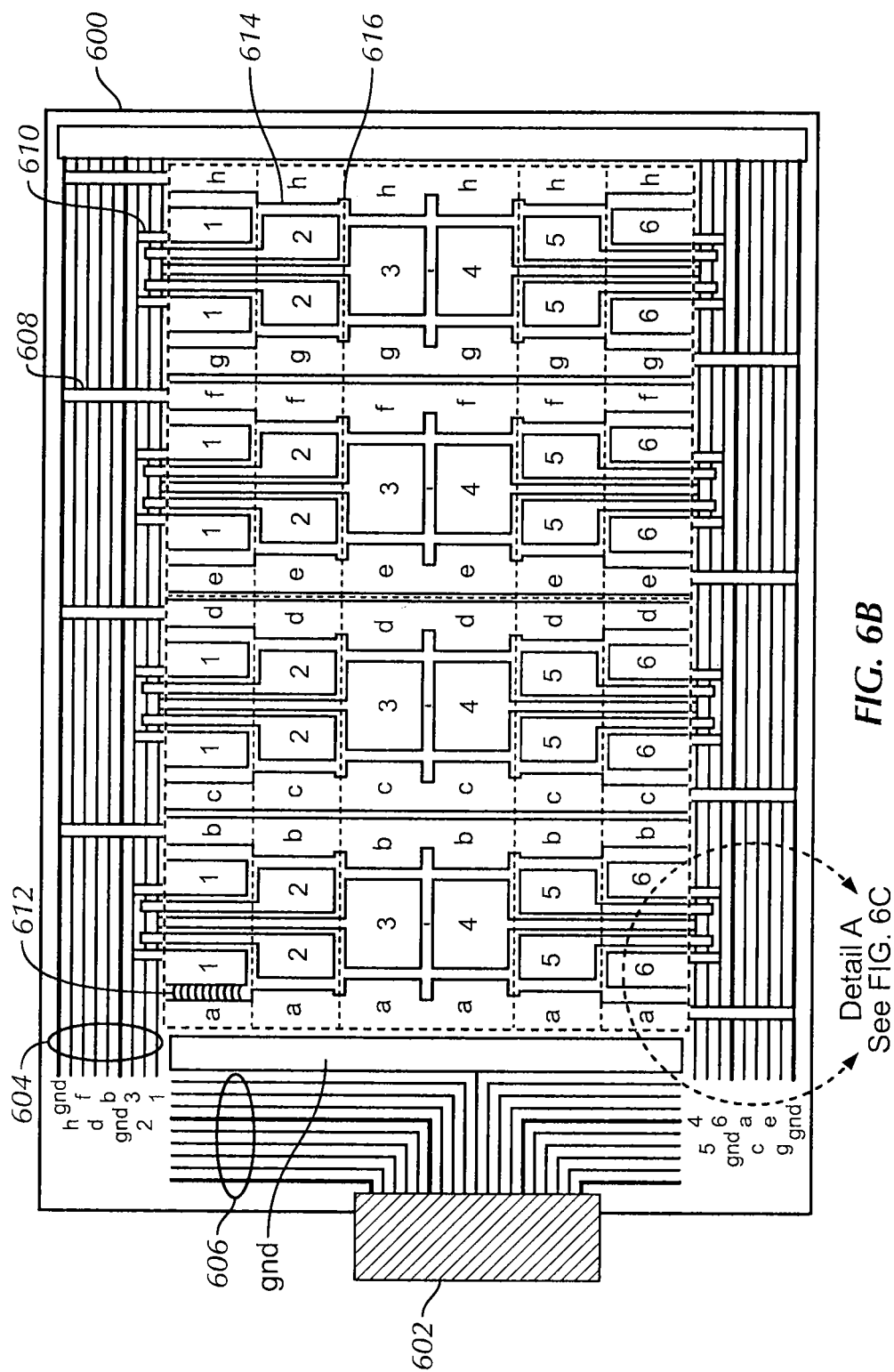
FIG. 6B illustrates a partial view of an example touch screen including metal traces running in the border areas of the touch screen according to embodiments of the invention.

FIG. 6B illustrates a partial view of example touch screen 600 including metal traces 604 and 606 running in the border areas of the touch screen according to embodiments of the invention. Note that the border areas in FIG. 6B are enlarged for clarity. Each column a-h can include extended yVcom line(s) 608 that allows the column to be connected to a metal trace through a via (not shown in FIG. 6B). One side of each column includes staggered edges 614 and notches 616 designed to create separate sections in each column. Each row patch 1-6 can include extended yVcom line(s) 610 that allows the patch to be connected to a metal trace through a via (not shown in FIG. 6B). yVcom lines 610 can allow each patch in a particular row to be self-connected to each other. Because all metal traces 604 and 606 are formed on the same layer, they can all be routed to the same flex circuit 602.

If touch screen 600 is operated as a mutual capacitance touch screen, either the columns a-h or the rows 1-6 can be driven with one or more stimulation signals, and fringing electric field lines can form between adjacent column areas and row patches. In FIG. 6B, it should be understood that although only electric field lines 612 between column a and row patch 1 (a-1) are shown for purposes of illustration, electric field lines can be formed between other adjacent column and row patches (e.g. a-2, b-4, g-5, etc.) depending on what columns or rows are being stimulated. Thus, it should be understood that each column-row patch pair (e.g. a-1, a-2, b-4, g-5, etc.) can represent a two-region touch pixel or sensor at which charge can be coupled onto the sense region from the drive region. When a finger touches down over one of these touch pixels, some of the fringing electric field lines that extend beyond the cover of the touch screen are blocked by the finger, reducing the amount of charge coupled onto the sense region. This reduction in the amount of coupled charge can be detected as part of determining a resultant "image" of touch. It should be noted that in mutual capacitance touch screen designs as shown in FIG. 6B, no separate reference ground is needed, so no second layer on the back side of the substrate, or on a separate substrate, is needed.

Touch screen 600 can also be operated as a self-capacitance touch screen. In such an embodiment, a reference ground plane can be formed on the back side of the substrate, on the same side as the patches and columns but separated from the patches and columns by a dielectric, or on a separate substrate. In a self-capacitance touch screen, each touch pixel or sensor has a self-capacitance to the reference ground that can be changed due to the presence of a finger. In self-capacitance embodiments, the self-capacitance of columns a-h can be sensed independently, and the self-capacitance of rows 1-6 can also be sensed independently.

Figure 6C:
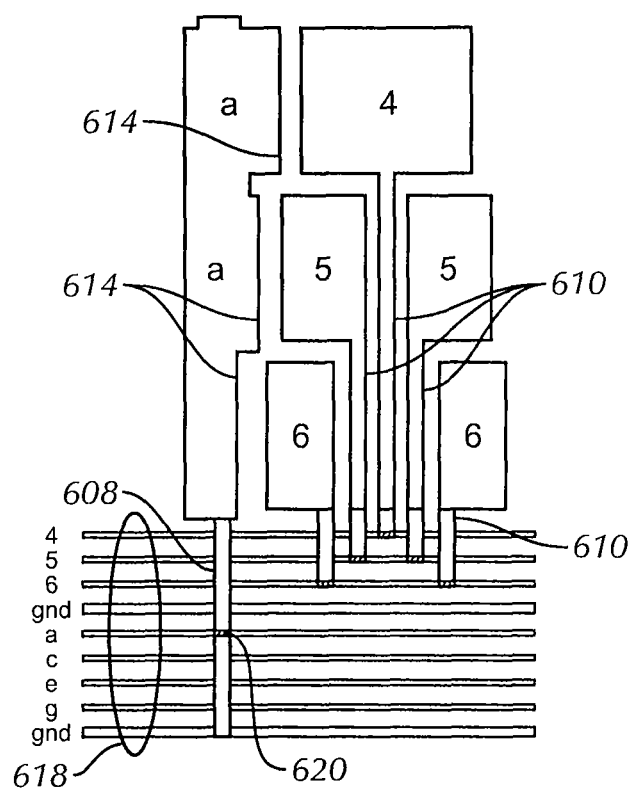
FIG. 6C illustrates an example connection of columns and row patches to the metal traces in the border area of the touch screen according to embodiments of the invention.

FIG. 6C illustrates an example connection of columns and row patches to the metal traces in the border area of the touch screen according to embodiments of the invention. FIG. 6C represents "Detail A" as shown in FIG. 6B, and shows column "a" and row patches 4-6 connected to metal traces 618 through yVcom lines 608 and 610. Because yVcom lines 608 and 610 are separated from metal traces 618 by a dielectric material, vias 620 formed in the dielectric material allow the yVcom lines to connect to the metal traces. The metal traces 618 can be formed in the same layer as the yVcom lines. In this case, there would be no additional process steps, and the touch traces can be routed in the same M1 and M2 layers that are conventional in LCD's, also sometimes referred to as "gate metal" and "source/drain metal". Also, the dielectric insulation layer can be referred to as a "inner layer dielectric" or "ILD".

As shown in FIG. 6C, column edges 614 and row patches 4-6 can be staggered in the x-dimension because space should be made for the touch pixels containing yVcom lines 610 connecting row patches 4 and 5. (It should be understood that row patch 4 in the example of FIG. 6C is really two patches stuck together.) To gain optimal touch sensitivity, it can be desirable to balance the area of the regions in touch pixels a-6, a-5 and a-4. However, if column "a" was kept linear, row patch 6 can be slimmer than row patch 5 or 6, and an imbalance would be created between the regions of touch pixel a-6.

Figure 7:
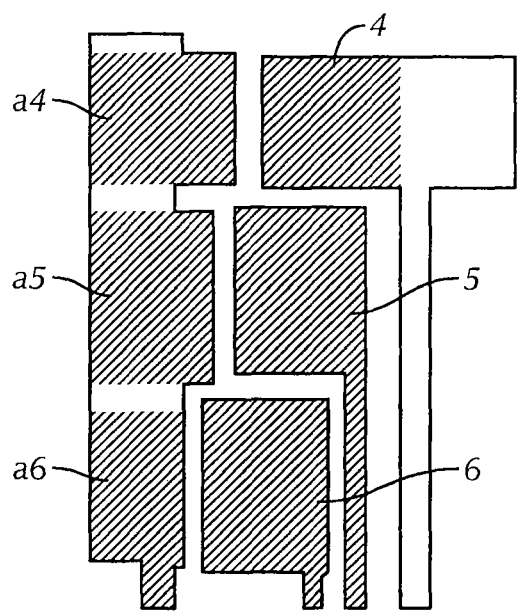
FIG. 7 illustrates a top view of an example column and adjacent row patches according to embodiments of the invention.

FIG. 7 illustrates a top view of an example column and adjacent row patches according to embodiments of the invention. It can be generally desirable to make the mutual capacitance characteristics of touch pixels a-4, a-5 and a-6 relatively constant to produce a relatively uniform z-direction touch sensitivity that stays within the range of touch sensing circuitry. Accordingly, the column areas $a_4$, $a_5$ and $a_6$ should be about the same as row patch areas 4, 5 and 6. To accomplish this, column section $a_4$ and $a_5$, and row patch 4 and 5 can be shrunk in the y-direction as compared to column section a6 and row patch 6 so that the area of column segment a4 matches the area of column segments $a_5$ and $a_6$. In other words, touch pixel $a_4$-4 will be wider but shorter than touch pixel $a_6$-6, which will be narrower but taller.

Because the touch pixels or sensors can be slightly skewed or misaligned in the x-direction, the x-coordinate of a maximized touch event on touch pixel a-6 (e.g. a finger placed down directly over touch pixel a-6) can be slightly different from the x-coordinate of a maximized touch event on touch pixel a-4, for example. Accordingly, in embodiments of the invention this misalignment can be de-warped in a software algorithm to re-map the touch pixels and remove the distortion.

Although a typical touch panel grid dimension can have touch pixels arranged on 5.0 mm centers, a more spread-out grid having about 6.0 mm centers, for example, can be desirable to reduce the overall number of electrical connections in the touch screen. However, spreading out the sensor pattern can cause erroneous touch readings.

Figure 8A:
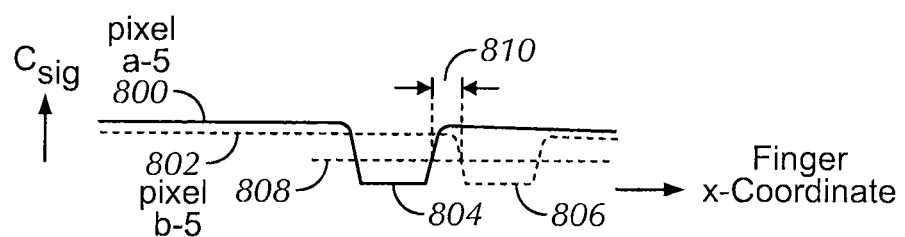
FIG. 8A is an example plot of an x-coordinate of a finger touch versus mutual capacitance seen at a touch pixel for a two adjacent touch pixels in a single row having wide spacings according to embodiments of the invention.

FIG. 8A is an example plot of an x-coordinate of a finger touch versus mutual capacitance seen at a touch pixel for a two adjacent touch pixels a-5 and b-5 in a single row having wide spacings. In FIG. 8A, plot 800 represents the mutual capacitance seen at touch pixel a-5 as the finger touch moves continuously from left to right, and plot 802 represents the mutual capacitance seen at touch pixel b-5 as the finger touch moves continuously from left to right. As expected, a drop in the mutual capacitance 804 is seen at touch pixel a-5 when the finger touch passes directly over touch pixel a-5, and a similar drop in the mutual capacitance 806 is seen at touch pixel b-5 when the finger touch passes directly over touch pixel b-5. If line 808 represents a threshold for detecting a touch event, FIG. 8A illustrates that even though the finger is never lifted from the surface of the touch screen, it can erroneously appear at 810 that the finger has momentarily lifted off the surface. This location 810 can represent a point about halfway between the two spread-out touch pixels.

Figure 8B:
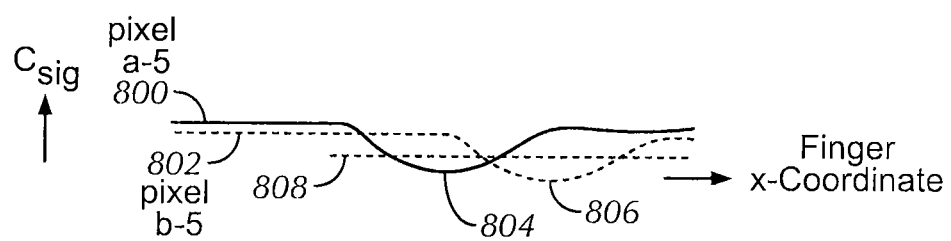
FIG. 8B is an example plot of an x-coordinate of a finger touch versus mutual capacitance seen at a touch pixel for two adjacent touch pixels in a single row having wide spacings where spatial interpolation has been provided according to embodiments of the invention.

FIG. 8B is an example plot of an x-coordinate of a finger touch versus mutual capacitance seen at a touch pixel for a two adjacent touch pixels a-5 and b-5 in a single row having wide spacings where spatial interpolation has been provided according to embodiments of the invention. As expected, a drop in the mutual capacitance 804 is seen at touch pixel a-5 when the finger touch passes directly over touch pixel a-5, and a similar drop in the mutual capacitance 806 is seen at touch pixel b-5 when the finger touch passes directly over touch pixel b-5. Note, however, that the rise and fall in the mutual capacitance value occurs more gradually than in FIG. 8A. If line 808 represents a threshold for detecting a touch event, FIG. 8B illustrates that as the finger moves from left to right over touch pixel a-5 and b-5, a touch event is always detected at either touch pixel a-5 or b-5. In other words, this "blurring" of touch events is helpful to prevent the appearance of false no-touch readings.

In one embodiment of the invention, the thickness of the coverglass for the touch screen can be increased to create part or all of the spatial blurring or filtering shown in FIG. 8B.

Figure 8C:
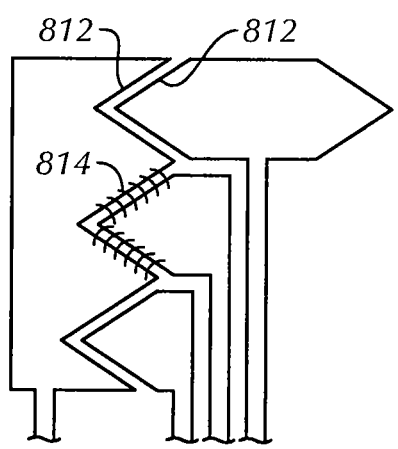
FIG. 8C illustrates a top view of an example column and adjacent row patch pattern useful for larger touch pixel spacings according to embodiments of the invention.

FIG. 8C illustrates a top view of an example column and adjacent row patch pattern useful for larger touch pixel spacings according to embodiments of the invention. FIG. 8C illustrates an example embodiment in which sawtooth region edges 812 are employed within a touch pixel elongated in the x-direction. The sawtooth region edges can allow fringing electric field lines 814 to be present over a larger area in the x-direction so that a touch event can be detected by the same touch pixel over a larger distance in the x-direction. It should be understood that the sawtooth configuration of FIG. 8C is only an example, and that other configurations such serpentine edges and the like can also be used. These configurations can further soften the touch patterns and create additional spatial filtering and interpolation between adjacent touch pixels as shown in FIG. 8B.

Figures 9A, 9B:
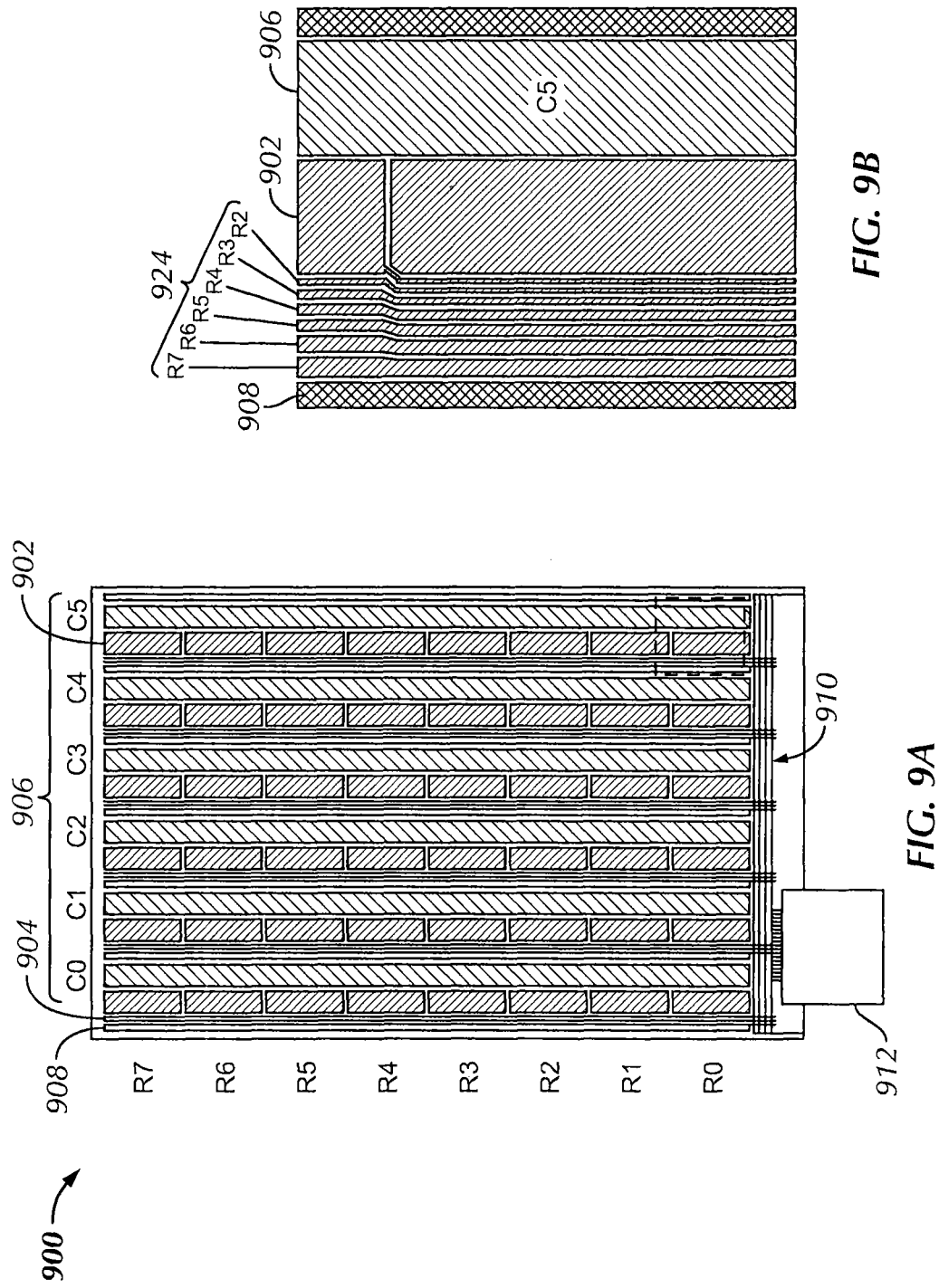
FIG. 9A illustrates an example touch screen including sense (or drive) regions formed as columns and rows of polygonal regions (bricks) according to embodiments of the invention.
FIG. 9B illustrates a close-up view of a portion of the example touch screen of FIG. 9A.

FIG. 9A illustrates example touch screen 900 including sense (or drive) regions (C0-C5) formed as columns 906 and rows of polygonal regions (bricks) 902, where each row of bricks forms a separate drive (or sense) region (R0-R7) according to embodiments of the invention. In the example of FIG. 9A, connecting yVcom lines 904 are routed along only one side of the bricks (a so-called "single escape" configuration). Although a touch screen 900 having six columns and eight rows is shown, it should be understood that any number of columns and rows can be employed.

To connect bricks 902 in a particular row together, connecting yVcom lines 904, can be routed from the bricks along one side of the bricks in a single escape configuration to a particular bus line 910. Ground isolation regions 908, can be formed between connecting yVcom lines 904 and adjacent columns 906 to reduce the capacitive coupling between the connecting yVcom lines and the columns. Connections for each bus line 910 and for columns 906 can be brought off touch screen 900 through flex circuit 912.

FIG. 9B illustrates a close-up view of a portion of the example touch screen 900 of FIG. 9A, showing how bricks 902 can be routed to bus lines 910 using connecting yVcom lines 904 in a single escape configuration according to embodiments of the invention. In FIG. 9B, the longer connections, more yVcom lines 904 (e.g. trace R7) can be used than the shorter connecting yVcom lines (e.g. trace R2) to equalize the overall resistivity of the traces and to minimize the overall capacitive loads seen by the drive circuitry.

Figure 9C:
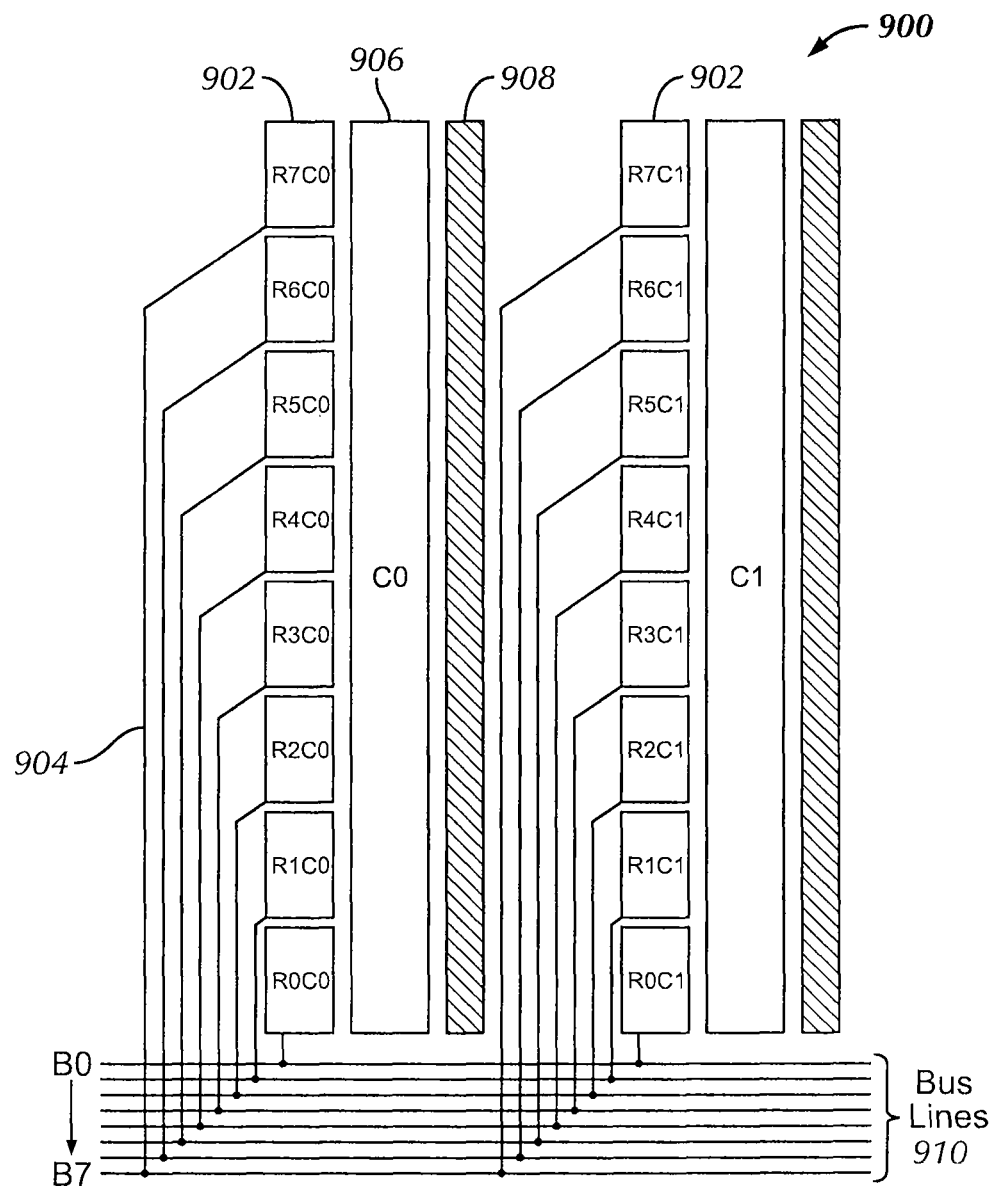
FIG. 9C illustrates a portion of example touch screen of FIG. 9A including bricks associated with columns C0 and C1 and connecting yVcom lines connecting the bricks to bus lines according to embodiments of the invention.

FIG. 9C illustrates a portion of example touch screen 900 of FIG. 9A including bricks 902 associated with columns C0 and C1 and connecting yVcom lines 904 (illustrated symbolically as thin lines) connecting the bricks to bus lines 9 10 according to embodiments of the invention. In the example of FIG. 9B, which is drawn in a symbolic manner and not to scale for purposes of illustration only, bus line B0 is connected to brick R0C0 (the closest brick to B0 adjacent to column C0) and R0C1 (the closest brick to B0 adjacent to column C1). Bus line B1 is connected to brick R1C0 (the next closest brick to B0 adjacent to column C0) and R who 1 (the next closest brick to B0 adjacent to column C1). The pattern repeats for the other bus lines such that bus line B7 is connected to brick R7C0 (the farthest brick from B0 adjacent to column C0) and R7C1 (the farthest brick from B0 adjacent to column C1).

Figure 10:
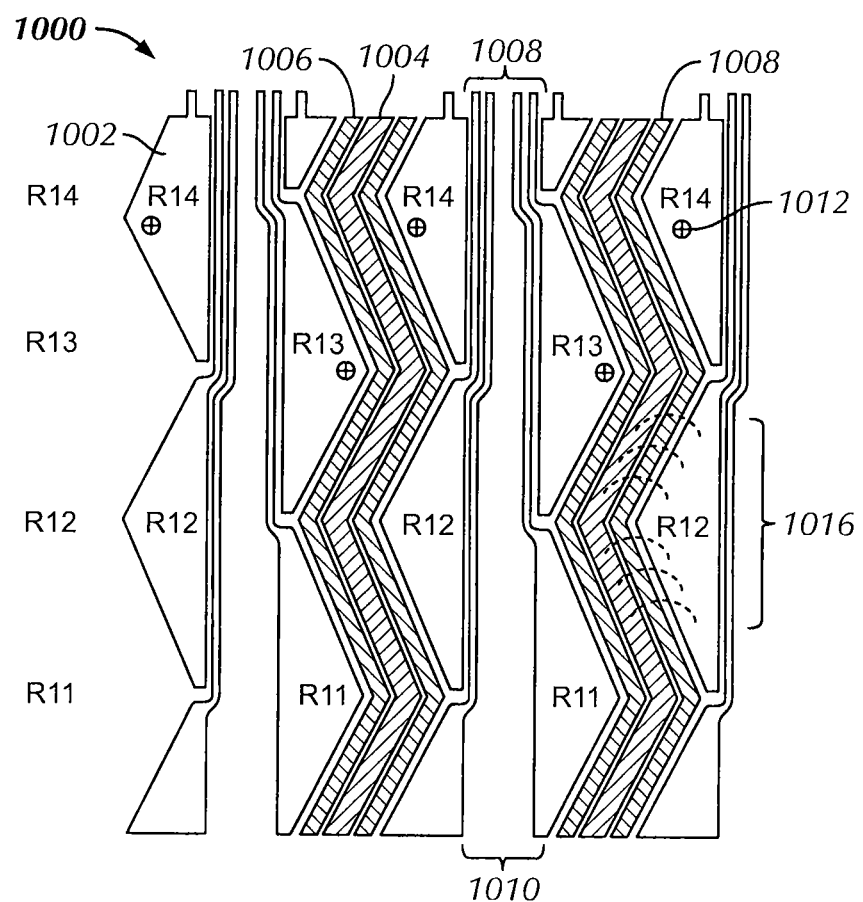
FIG. 10 illustrates a portion of example zig-zag double interpolated touch screen that can further reduce the stray capacitance between the connecting yVcom lines and the sense regions according to embodiments of the invention.

FIG. 10 illustrates a portion of example zig-zag double interpolated touch screen 1000 that can further reduce the stray capacitance between the connecting yVcom lines and the sense regions according to embodiments of the invention. In the example of FIG. 10, polygonal regions 1002 representing the drive (or sense) regions are generally pentagonal in shape and staggered in orientation, with some of the polygonal areas near the end of the panel being cut-off pentagons. Sense (or drive) regions 1004 are zig-zag shaped, with ground guards 1006 between the sense (or drive) regions and pentagons 1002. All connecting yVcom lines 1008 are routed in channels 1010 between pentagons 1002. In mutual capacitance embodiments, each touch pixel or sensor is characterized by electric field lines 1016 formed between a pentagon and an adjacent sense (or drive) region 1004. Because connecting yVcom lines 1008 do not run alongside any sense (or drive) regions 1004, but instead run between pentagons 1002, the stray capacitance between connecting yVcom lines 1008 and sense (or drive) regions 1004 is minimized, and spatial cross-coupling is also minimized. Previously, the distance between connecting yVcom lines 1008 and sense (or drive) regions 1004 was only the width of ground guard 1006, but in the embodiment of FIG. 10, the distance is the width of the ground guard plus the width of pentagon 1002 (which varies along the length of its shape).

As the example of FIG. 10 indicates, the pentagons for row R14 at an end of the touch screen can be truncated. Accordingly, the calculated centroids of touch 1012 for R14 can be offset in the y-direction from their true position. In addition, the calculated centroids of touch for any two adjacent rows will be staggered (offset from each other) in the x-direction by an offset distance. However, this misalignment can be de-warped in a software algorithm to re-map the touch pixels and remove the distortion.

Although the foregoing embodiments of the invention have been primarily described herein in terms of mutual capacitance touch screens, it should be understood that embodiments of the invention are also applicable to self-capacitance touch screens as discussed above. In some embodiments, a touch screen can use both mutual and self-capacitance measurements in a time-multiplexing fashion to gather additional information and each measurement type can compensate the weaknesses of the other.

Example displays including pixels with dual-function capacitive elements, and the processes of manufacturing the displays, according to embodiments of the invention will now be described with reference to FIGS. 11-46. FIGS. 11-24 are directed to an example electrically controlled birefringence (ECB) LCD display using amorphous silicon (a-Si). FIGS. 25-34 are directed to an example IPS LCD display using low temperature polycrystalline silicon (LTPS). FIGS. 35-43 are directed to another example IPS LCD display using LTPS. FIGS. 44-55 are directed to an example ECB LCD display using LTPS.

An example process of manufacturing an ECB LCD display according to embodiments of the invention will now be described with reference to FIGS. 11-18. The figures show various stages of processing of two pixels, a pixel 1101 and a pixel 1102, during the manufacture of the ECB LCD display. The resulting pixels 1101 and 1102 form electrical circuits equivalent to pixels 101 and 102, respectively, of FIG. 1.

Figure 11:
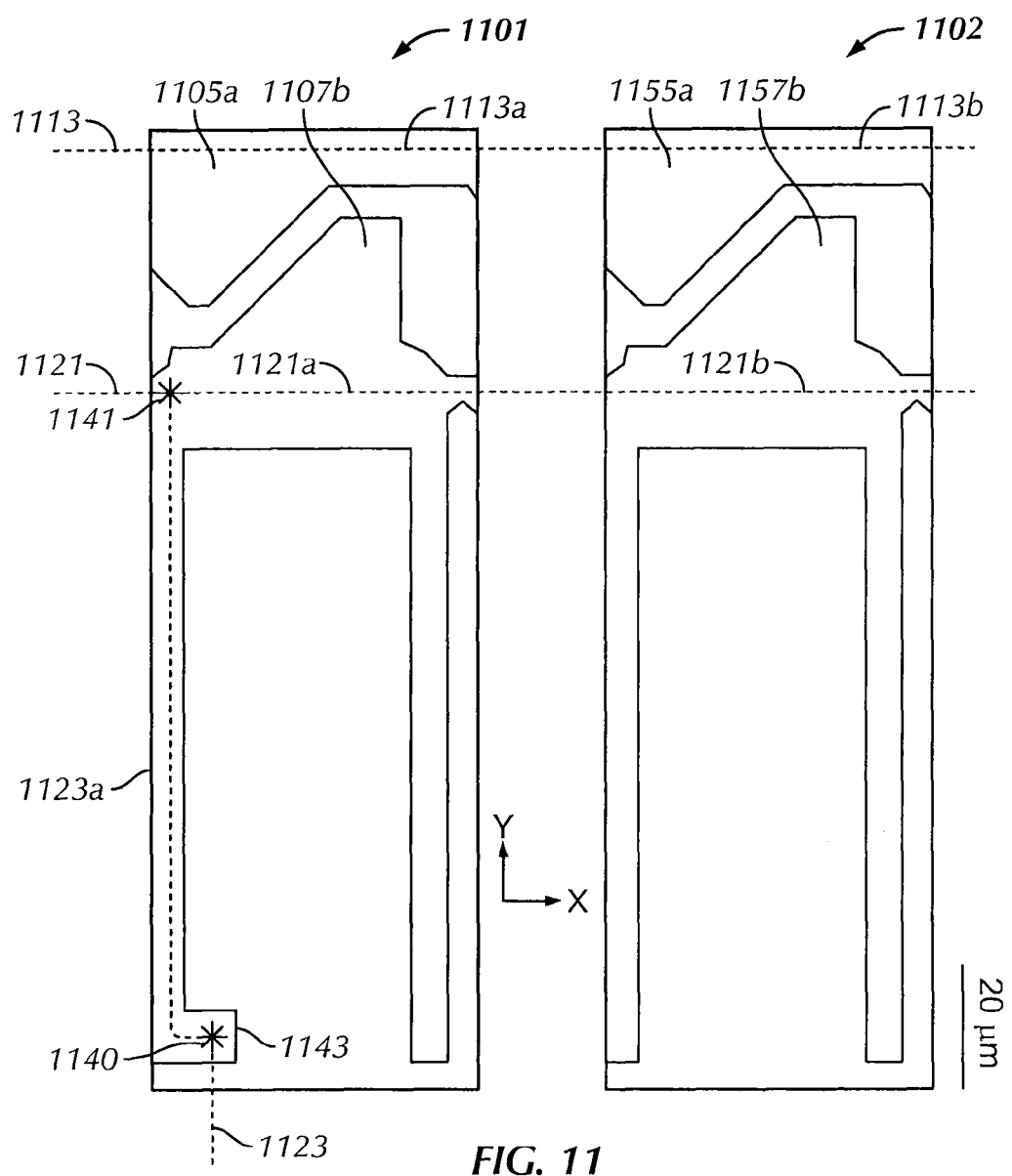
FIG. 11 illustrates a patterning of a first metal layer (M1) of pixels in an example electrically controlled birefringence (ECB) LCD display using amorphous silicon (a-Si) according to embodiments of the invention.

FIG. 11 shows the patterning of a first metal layer (M1) of pixels 1101 and 1102. As shown in FIG. 11, the M1 layer for pixel 1102 includes a gate 1155a, a portion 1113b of a gate line 1113, a lower electrode 1157b of a storage capacitor (not shown except for lower electrode 1157b), and a portion 1121 b of an xVcom 1121. Pixel 1101 includes a gate 1105a, a lower electrode 1107b of a storage capacitor (not shown except for lower electrode 1107b), a portion 1113a of gate line 1113, and a portion 1121a of xVcom 1121. Pixel 1101 also includes a portion 1123a of a yVcom 1123 (shown as dotted lines), which includes an additional portion 1140. Portion 1123a has a connection point 1141 and a connection point 1143. As shown in FIG. 11, a gate line 1113 and an xVcom 1121 run through both pixels 1101 and 1102 in an x-direction. Gate line 1113 connects to gates 1105a and 1155a, and xVcom 1121 connects lower electrode 1107b and 1157b. Portion 1123a of yVcom 1123 connects to xVcom 1121 in pixel 1101.

Figure 12:
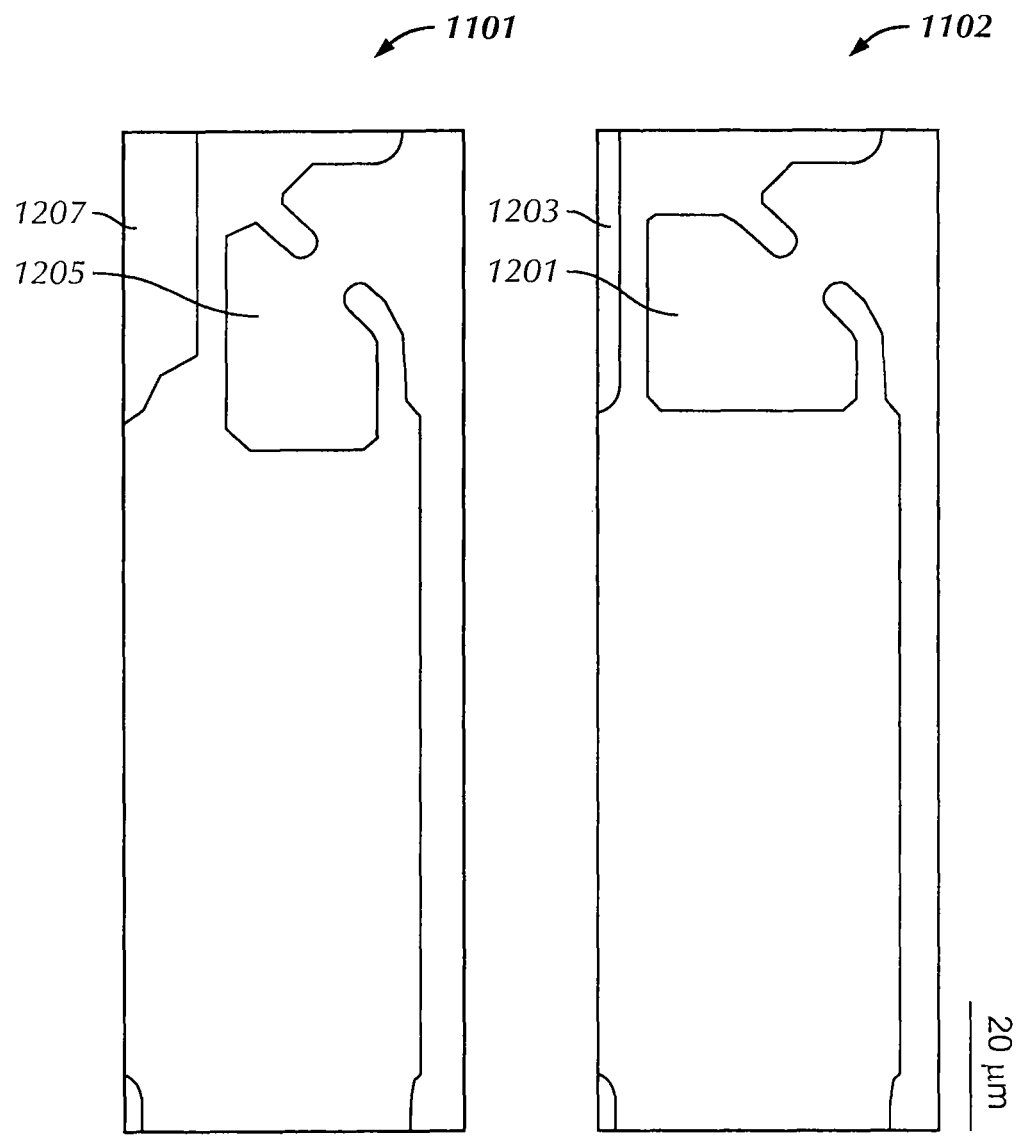
FIG. 12 illustrates a patterning step in which island patterns of a-Si are formed in the example ECB LCD display using a-Si according to embodiments of the invention.

FIG. 12 shows a subsequent patterning step in the process of manufacturing pixels 1101 and 1102, in which island patterns of amorphous silicon (a-Si) are formed. As can be seen FIG. 12, the island patterns for the pixels are similar, except that semiconductor portion 1201 and 1203 of pixel 1102 are slightly different that semiconductor portions 1205 and 1207 of pixel 1101. For example, portion 1205 is slightly smaller than portion 1201. This is due, in part, to allow xVcom 1121 to be connected in the vertical direction (y-direction) with other xVcom lines through yVcom 1123, as is described in greater detail below.

Figure 13:
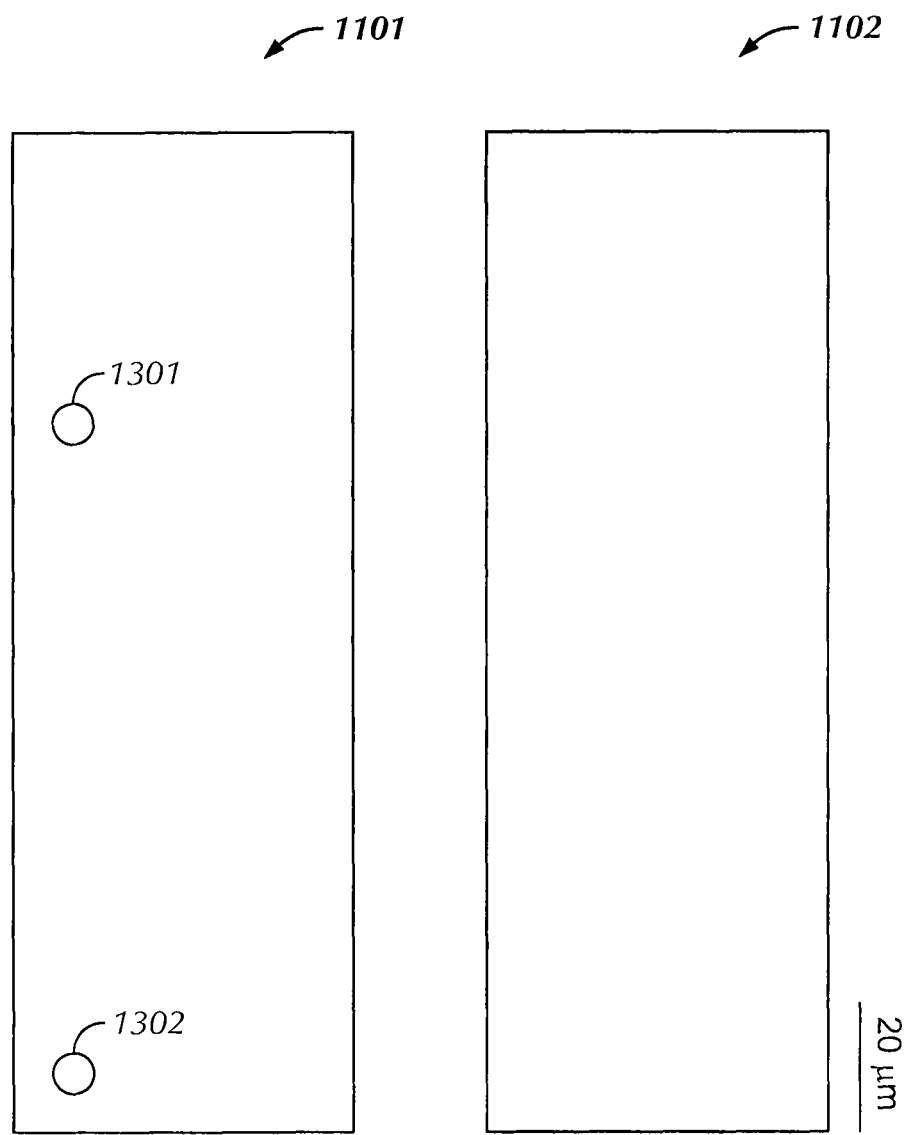
FIG. 13 illustrates connections formed in a pixel in the example ECB LCD display using a-Si according to embodiments of the invention.

FIG. 13 shows connections 1301 and 1302 formed in pixel 1101. Pixel 1102 does not include such connections. The operation of connections 1301 and 1302 is described in more detail below with reference to FIG. 14.

Figure 14:
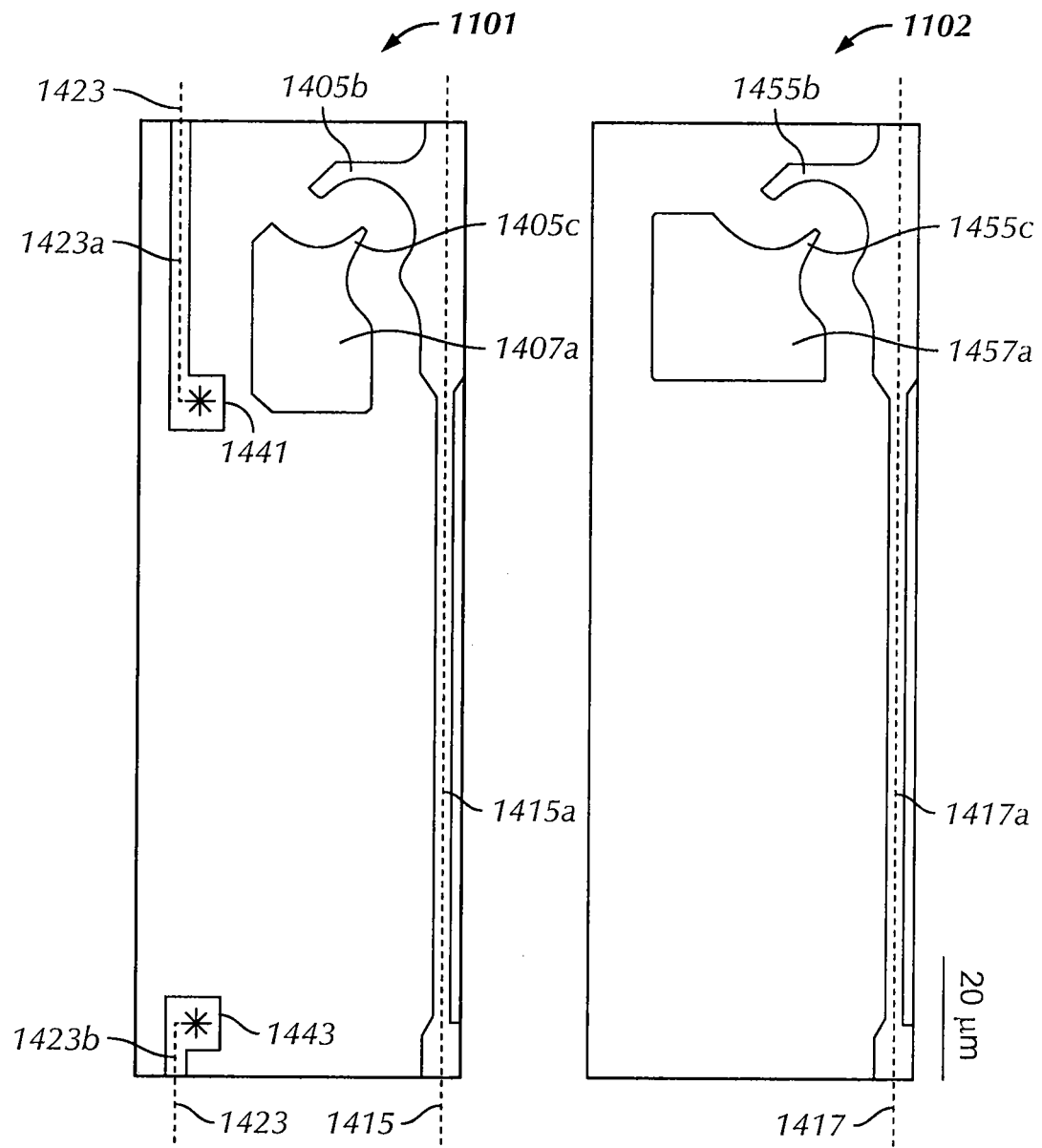
FIG. 14 illustrates patterning of a second metal layer (M2) of pixels in the example ECB LCD display using a-Si according to embodiments of the invention.

FIG. 14 shows patterning of a second metal layer (M2) of pixels 1101 and 1102. As shown in FIG. 14, the M2 layer of pixel 1102 forms a portion 1417a of a green color data line, Gdata 1417 (shown as a dotted line in FIG. 14), a source 1455b, a drain 1455c, and an upper electrode 1457a. Similar to pixel 1102, the M2 layer of pixel 1101 forms a portion 1415a of a red color data line, Rdata 1415 (shown as a dotted line in FIG. 14), a source 1405b, a drain 1405c, and upper electrode 1407a. The M2 layer of pixel 1101 also forms portions 1423a and 1423b of yVcom 1123 (shown a dotted line in FIG. 14). Upper electrode 1407a is smaller than upper electrode 1457a, which allows portion 1423a to be formed in the M2 layer of the pixel 1101. Portion 1423a has a connection point 1441, and portion 1423b has a connection point 1443.

FIGS. 11, 13 and 14 together illustrate that pixel 1101 includes a vertical common line (yVcom 1415) that allows connection of xVcom 1121 with other xVcom lines in the vertical direction (y-direction). In particular, the figures show portion 1423a is connected to portion 1123a through connection 1301 at connection points 1441 and 1141, respectively. Portion 1123a is connected to 1423b through connection 1302 at points 1143 and 1443, respectively. Thus, the figures show a continuous portion of yVcom 1123 is formed in pixel 1101 by the connection of multiple structures of the pixel. As shown FIG. 11, yVcom portion 1123a is connected to xVcom portion 1121a. Consequently, the structure of pixel 1101 shown in the figures allows connection in the vertical direction of multiple xVcom lines.

Figure 15:
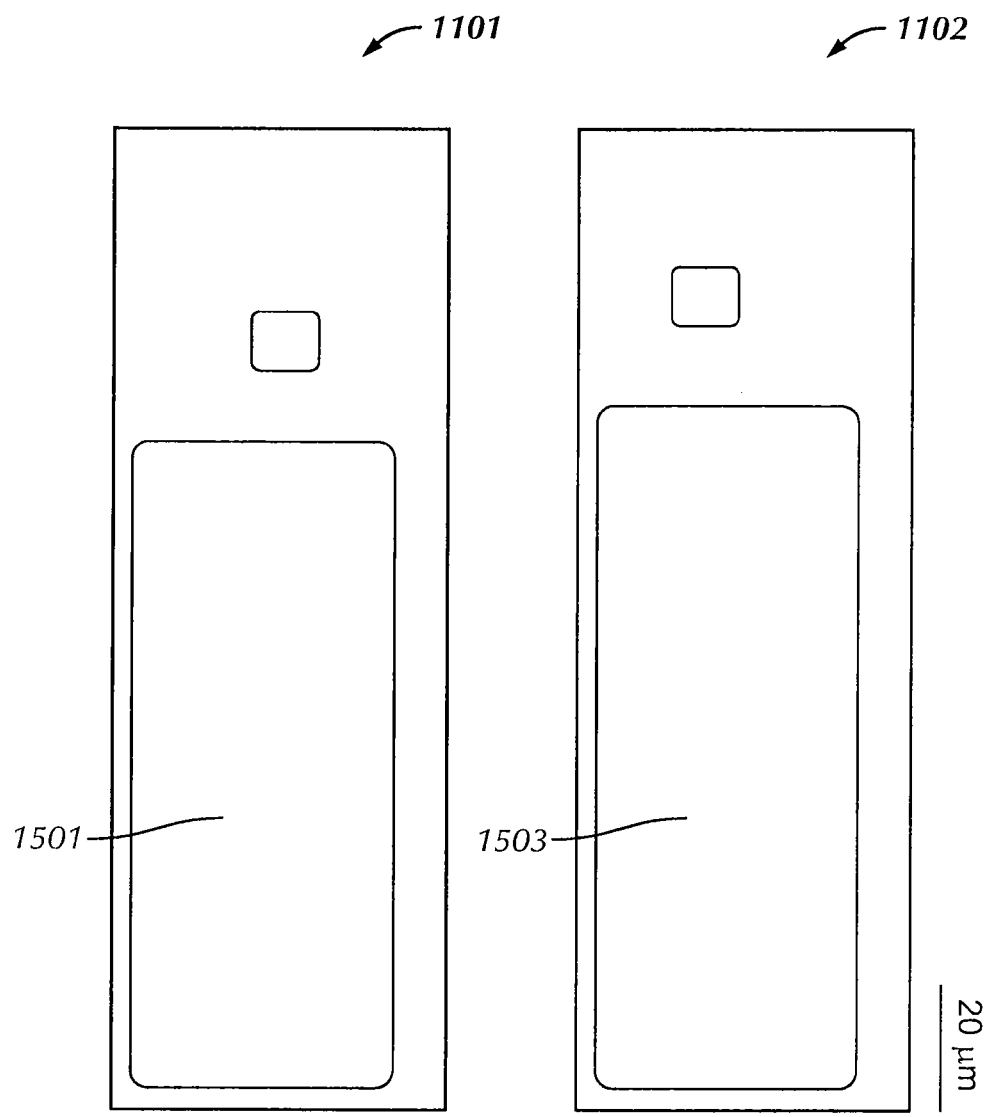
FIG. 15 illustrates planarization (PLN) contact layers in the example ECB LCD display using a-Si according to embodiments of the invention.
Figure 16:
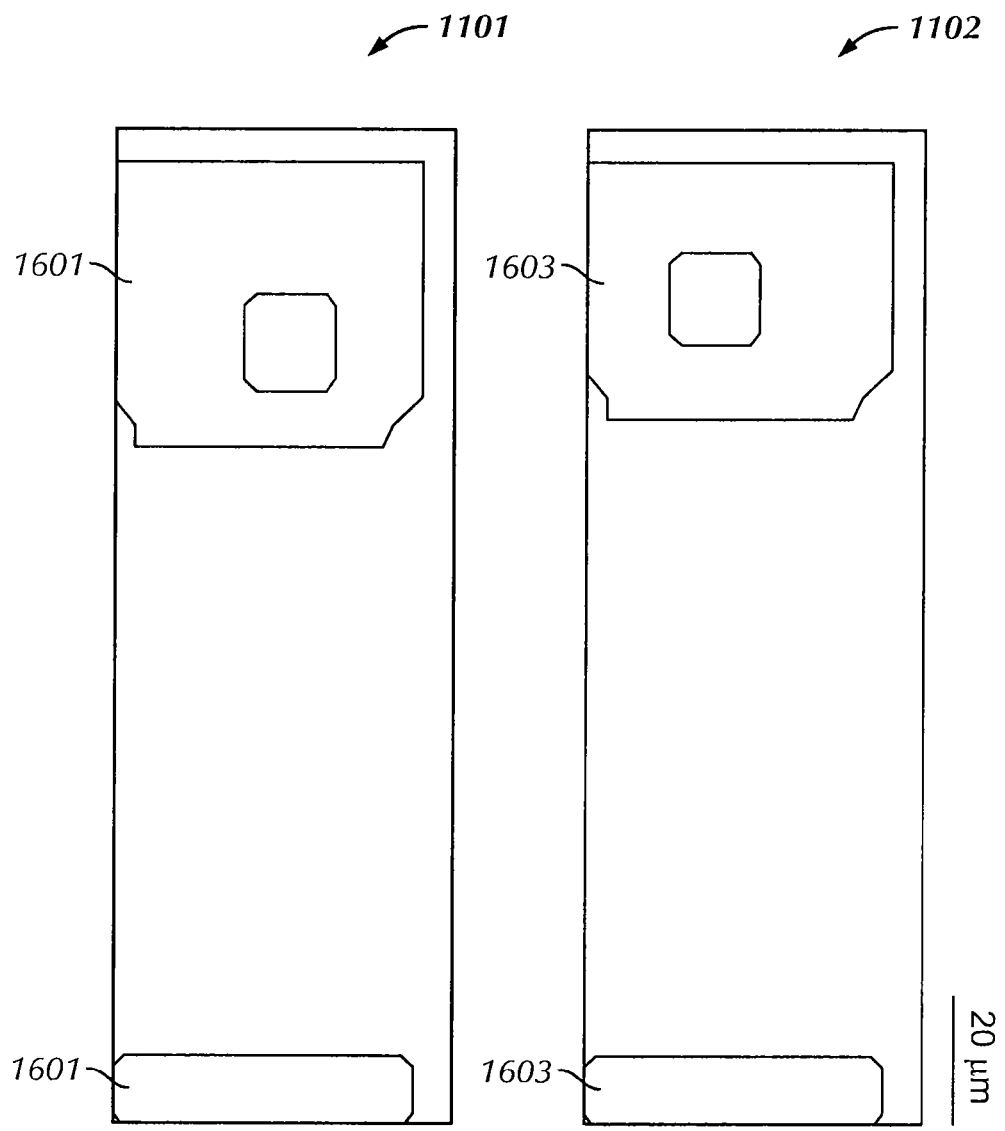
FIG. 16 illustrates reflector (REF) layers in the example ECB LCD display using a-Si according to embodiments of the invention.
Figure 17:
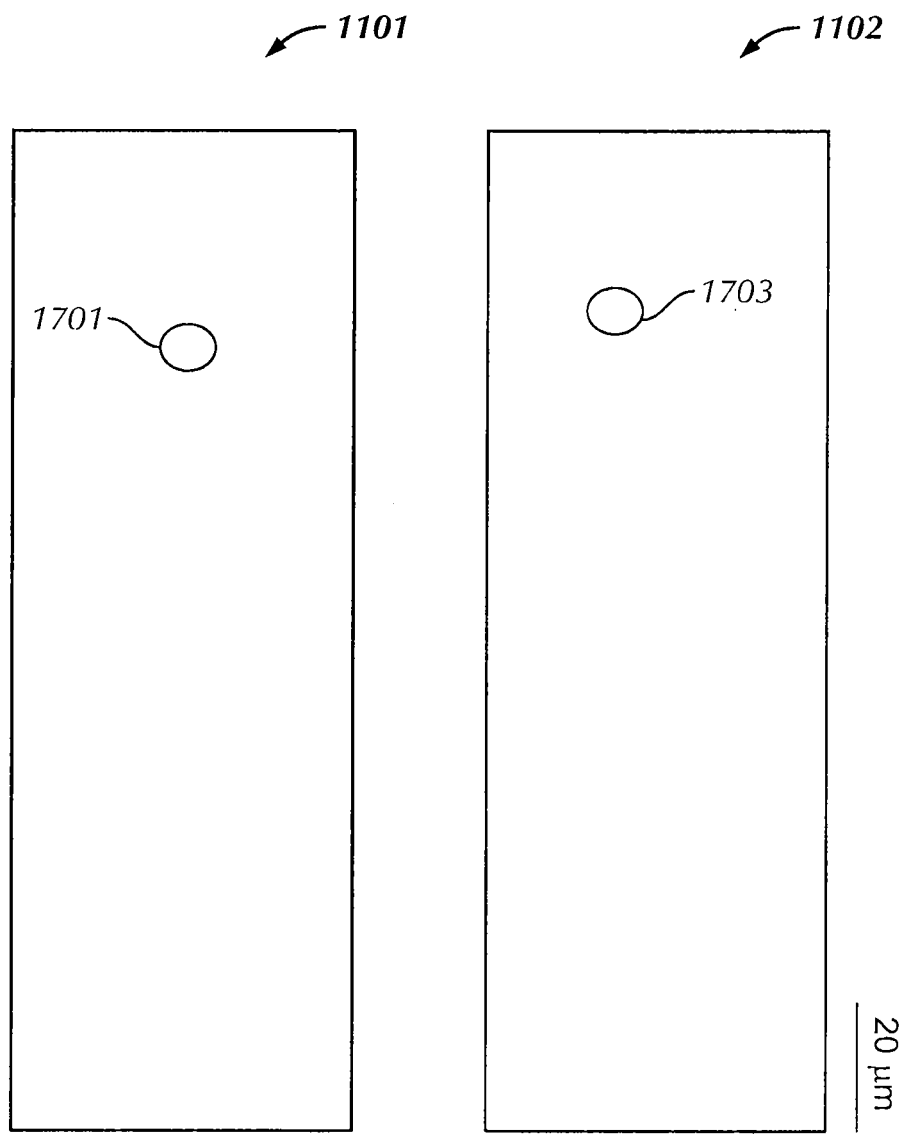
FIG. 17 illustrates passivation (PASS) contacts in the example ECB LCD display using a-Si according to embodiments of the invention.
Figure 18:
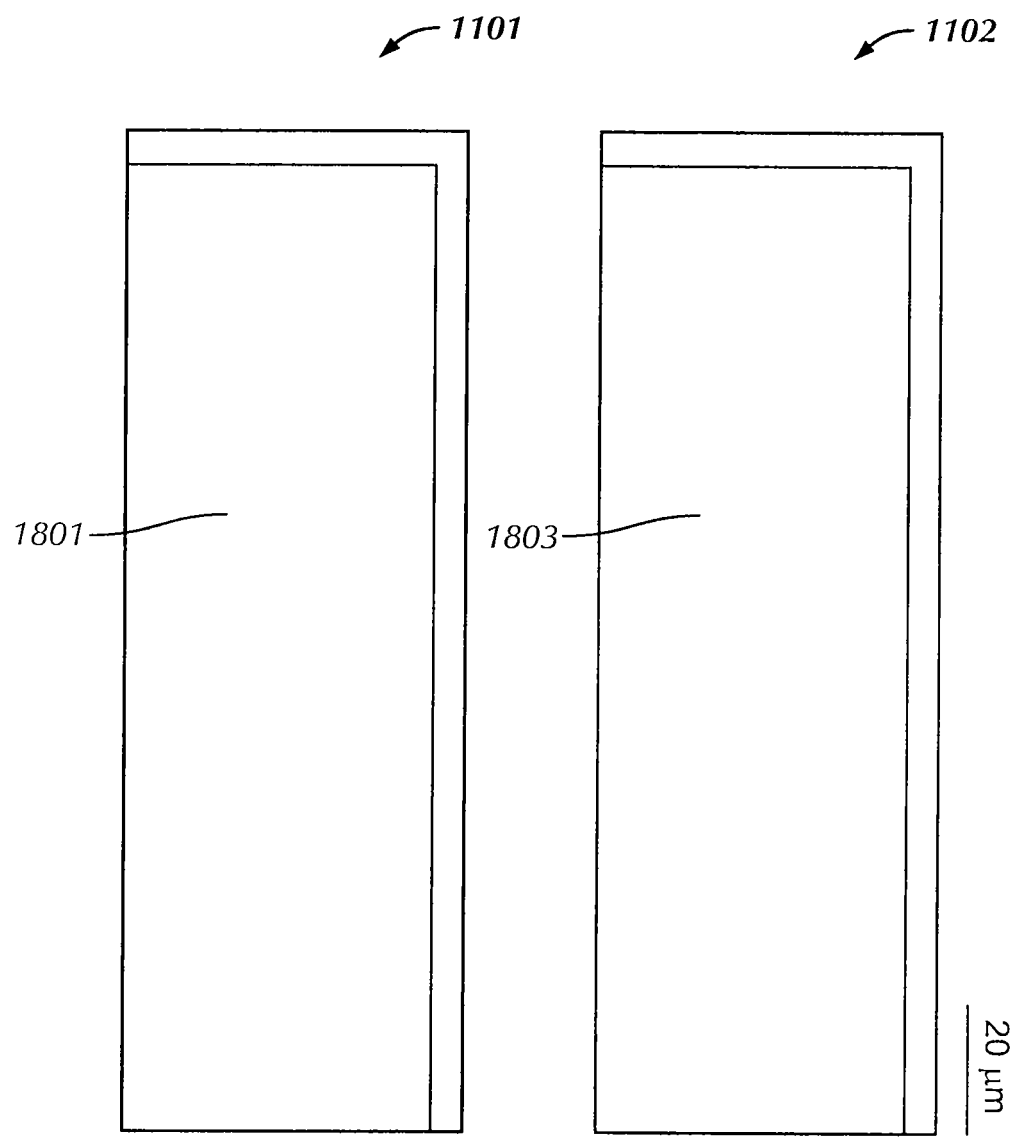
FIG. 18 illustrates semi-transparent conductive material (such as ITO1)) layers that form pixel electrodes in the example ECB LCD display using a-Si according to embodiments of the invention.

FIG. 15 shows planarization (PLN) contact layers 1501 and 1503 of pixels 1101 and 1102, respectively. FIG. 16 shows reflector (REF) layers 1601 and 1603 of pixels 1101 and 1102, respectively. FIG. 17 shows passivation (PASS) contacts 1701 and 1703 of pixels 1101 and 1102, respectively. FIG. 18 shows semi-transparent conductive material, such as IPO, layers that form pixel electrodes 1801 and 1803 of pixels 1101 and 1102, respectively.

Figure 19:
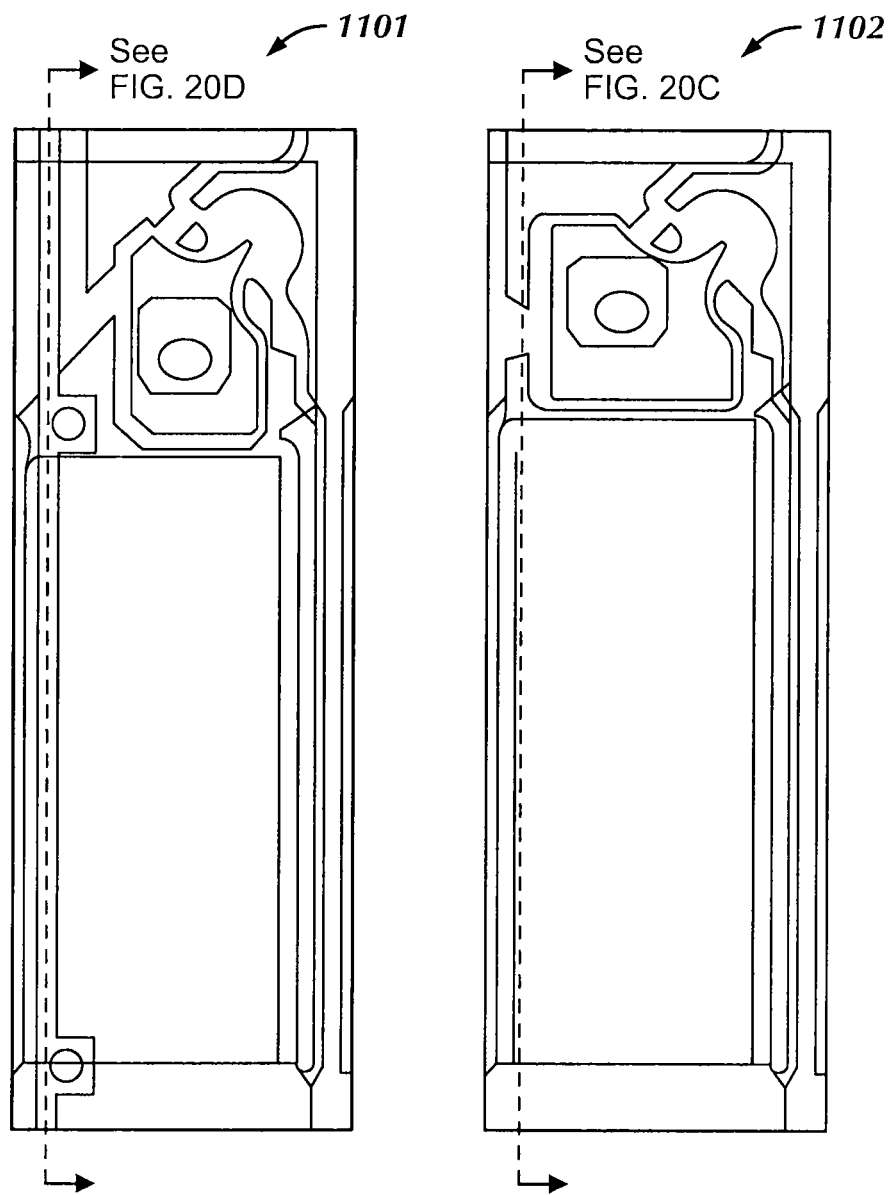
FIG. 19 illustrates a plan view of completed pixels in the example ECB LCD display using a-Si according to embodiments of the invention.
Figure 20A:
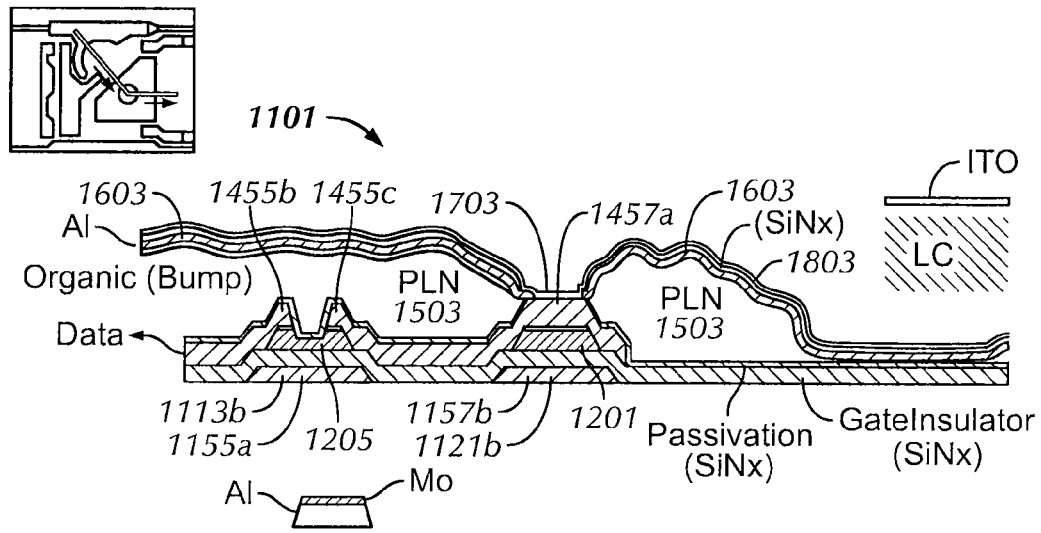
FIGS. 20A-D illustrate side views of completed pixels in the example ECB LCD display using a-Si according to embodiments of the invention.
Figure 20B:
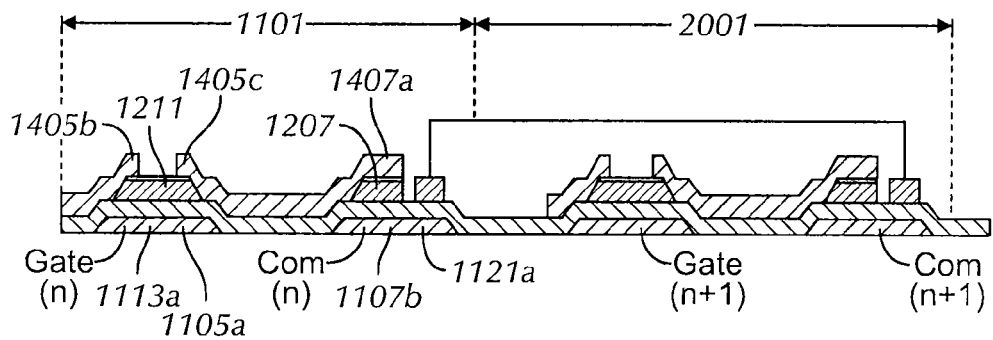
Figure 20C:
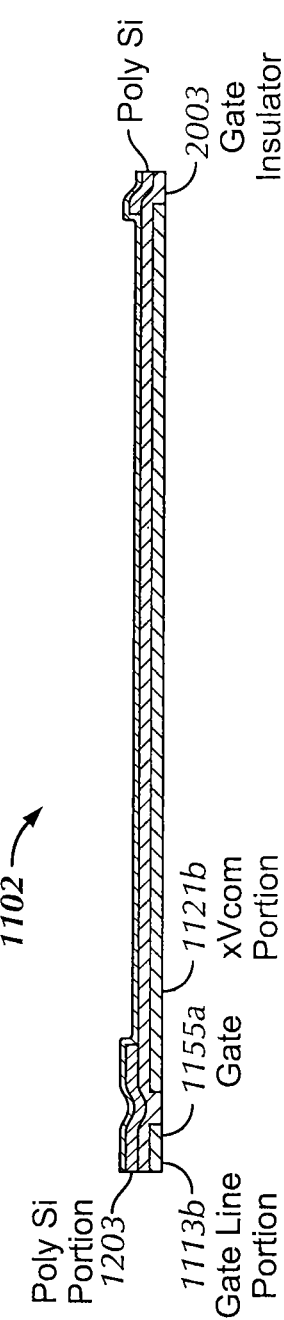
Figure 20D:
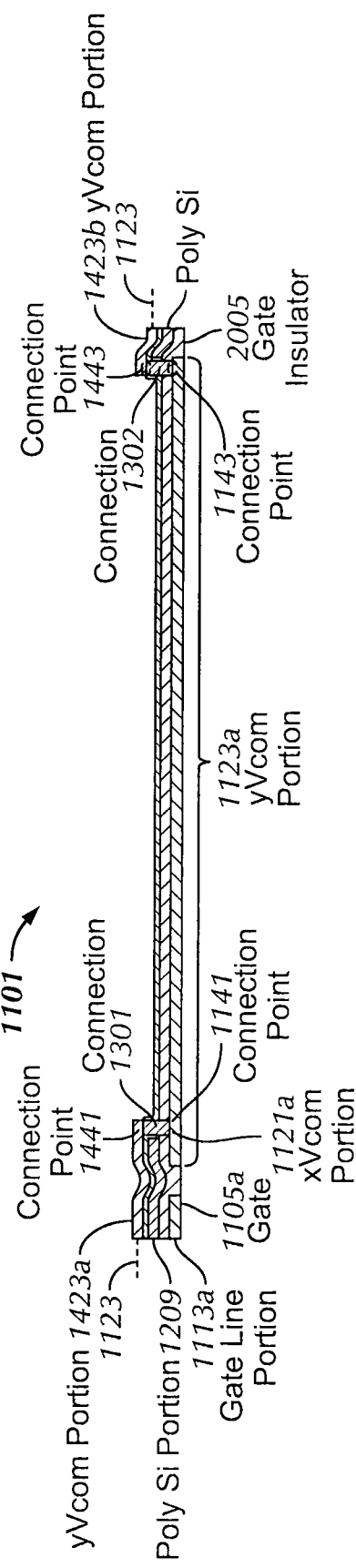

FIG. 19 shows a plan view of completed pixels 1101 and 1102. FIGS. 20A-B illustrate side views of completed pixel 1101 take along the paths shown in the top views shown in the figures. FIGS. 20C-D illustrate side views of pixels 1102 and 1101 along the lines shown in FIG. 19.

FIG. 20A shows a side view of pixel 1101. The portion of the M1 layer shown in FIG. 20A includes gate line portion 1113b, gate 1155a, lower electrode 1157b, and xVcom portion 1121b. The poly-Si layer shown in FIG. 20A includes poly-Si 1205 and poly-Si 1201. The M2 layer shown in FIG. 20A includes source 1455b, drain 1465c, and upper electrode 1457a. FIG. 20A also shows planarization layer 1503, reflector layer 1603, passivation contact 1703, and transparent conductor layer 1103.

FIG. 20B shows another side view of pixel 1101. For the sake of clarity, the planarization contact, reflector, passivation contact, and transparent conductor layers are not shown in the figure. The M1 layer shown in FIG. 20B includes gate line portion 1113a, gate 1105a, lower electrode 1107b, and xVcom portion 1121a. FIG. 20B also shows an adjacent pixel 2001, which has the same structure as pixel 1101. The poly-Si layer shown in FIG. 20B includes poly-Si portion 1211 and poly-Si portion 1207. The M2 layer shown in FIG. 20B includes source 1405b, drain 1405c, and upper electrode 1407a.

FIG. 20C shows a side view of pixel 1102 along the line shown in FIG. 19. The M1 layer shown in FIG. 20C includes gate line portion 1113b, gate 1155a, and xVcom portion 1121b. FIG. 20C also shows a gate insulator 2003 deposited on top of M1. Poly-Si portion 1203 and an additional poly-Si portion are also shown in FIG. 20C.

FIG. 20D shows a side view of pixel 1101 along the line shown in FIG. 19. The M1 layer shown in FIG. 20D includes gate line portion 1113a, gate 1105a, and yVcom portion 1123a, which includes an intersection with xVcom portion 1121a. Connections 1301 and 1302 contact connection points 1141 and 1143, respectively, of yVcom portion 1123a. FIG. 20D also shows a gate insulator layer 2005 and poly-Si portion 1209. The M2 layer shown in FIG. 20D includes yVcom portion 1423a, which connects with connection 1301 at connection point 1441, and yVcom portion 1423b, which connects with connection 1302 at connection point 1443. The vertical common line, yVcom 1123 (shown in FIG. 20D as dashed lines) runs through pixel 1181 as yVcom portion 1423a, connection 1301, yVcom portion 1123a, connection 1302, and yVcom portion 1423b. FIG. 20D also shows a portion of an adjacent pixel that includes structure identical to pixel 1101. In particular, the adjacent pixel includes a yVcom portion that is connected, via a connection, to an xVcom portion. Thus, FIG. 20D illustrates that a xVcom portion 1121a can be connected to an adjacent pixels xVcom portion with a yVcom line.

Figure 21:
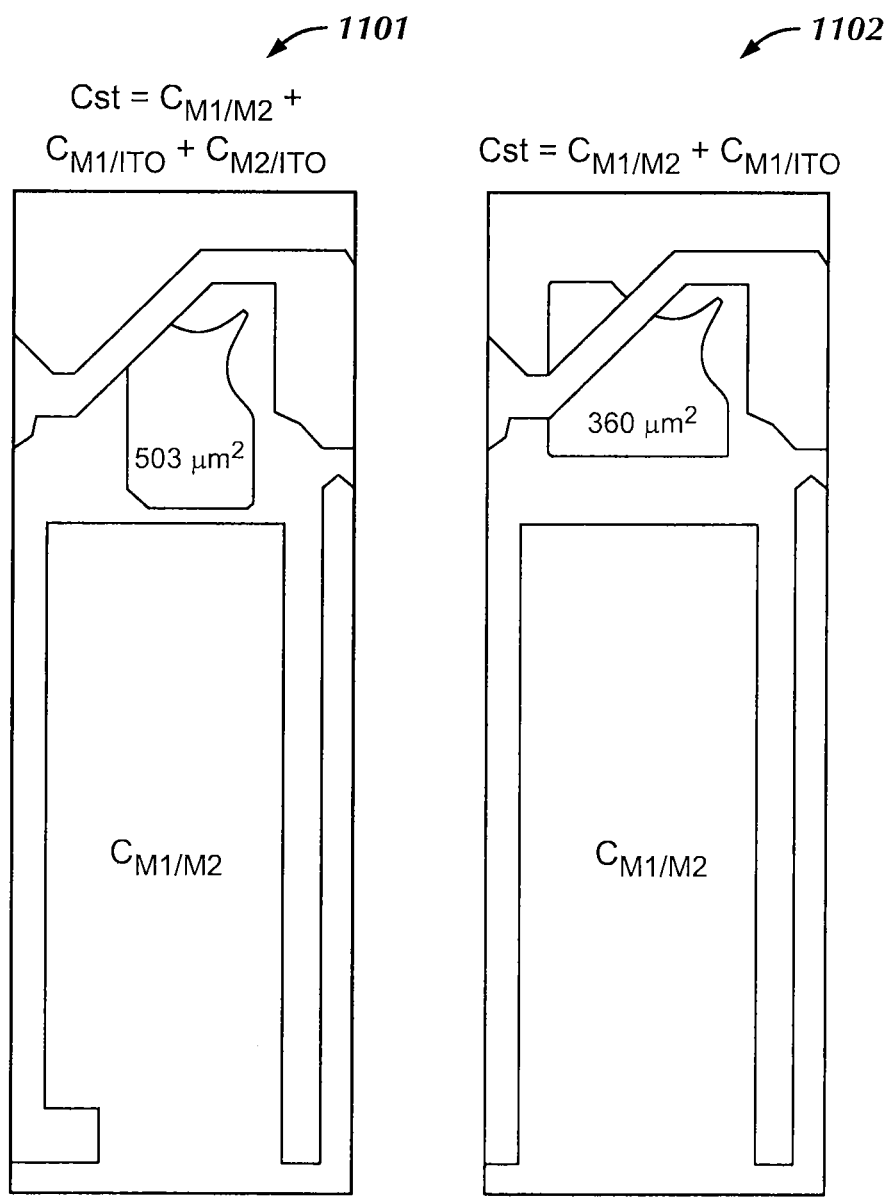
FIGS. 21 and 22 illustrate a comparative analysis of the storage capacitances of pixels in the example ECB LCD display using a-Si according to embodiments of the invention.
Figure 22:
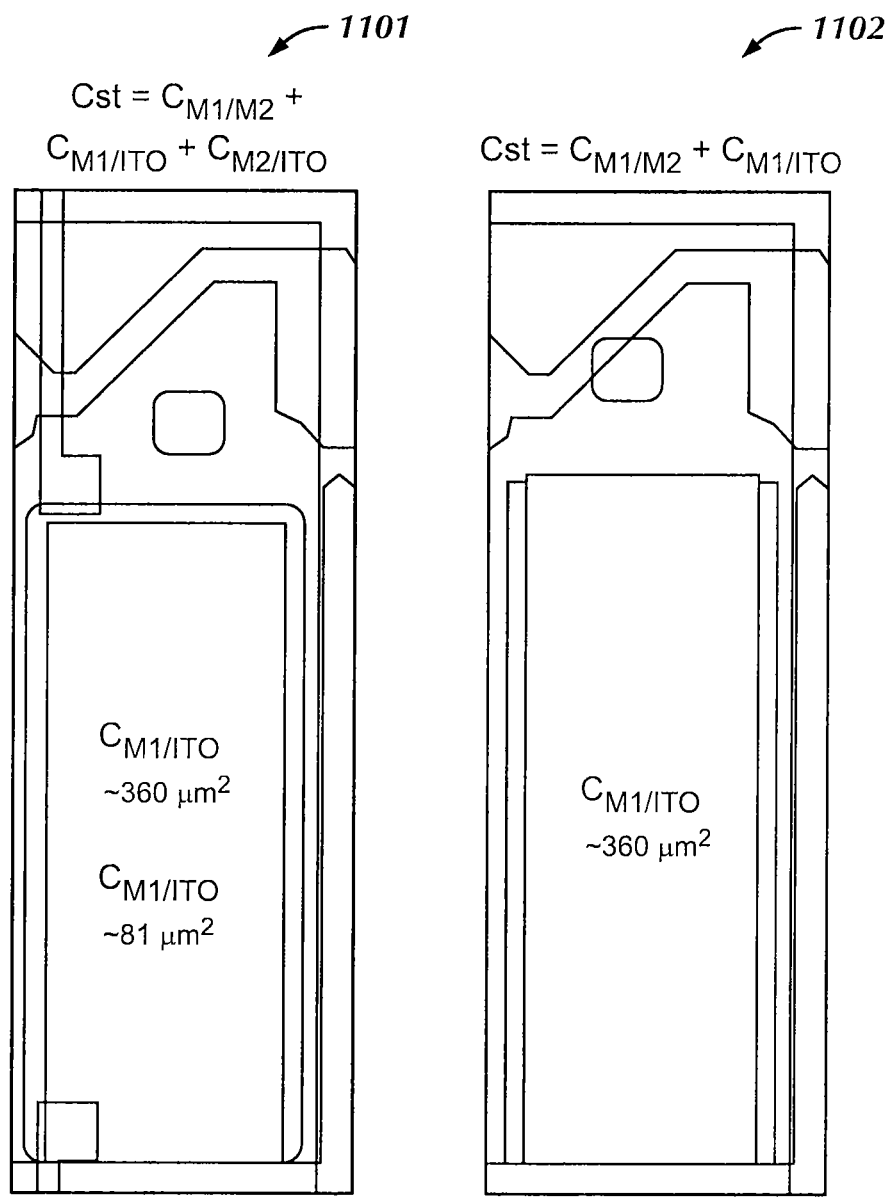

FIGS. 21 and 22 show a comparative analysis of the storage capacitance of pixels 1101 and 1102. The total storage capacitance (Cstore) of pixel 1102 is:

$$C\text{store} = C_{M1/M2} + C_{M1/ITO} \quad (1)$$

where: $C_{M1/M2}$ is the capacitance of the overlapping M1 and M2 layers, such as upper electrode 1457a and lower electrode 1157b of pixel 1102, and $C_{M1/ITO}$ is the capacitance between overlapping areas of the first metal layer and the transparent conductor layer.

For example, FIG. 21 shows the overlapping areas of the first and second metal layers that result in the capacitance $C_{M1/M2}$. As shown in FIG. 21, $C_{M1/M2}$ of pixel 1102 results from an overlap of approximately 360 square micrometers of the first and second metallic layers. Referring now to FIG. 22, the highlighted portions of pixel 1102 show the overlapping regions of the first metallic layer and the transparent conductor layer that result in $C_{M1/ITO}$. As shown in FIG. 22, the total overlap is approximately 360 square micrometers.

In contrast, the total capacitance of pixel 1101 is:

$$C\text{store} = C_{M1/M2} + C_{M1/ITO} + C_{M2/ITO} \quad (2)$$

where: $C_{M1/M2}$ and $C_{M1/ITO}$ are defined as above, and $C_{M2/ITO}$ is the capacitance resulting from the overlap of the second metallic layer and the transparent conductor layer.

The additional term in the storage capacitance equation for pixel 1101, $C_{M2/ITO}$, results from the additional areas of the second metallic layer in pixel 1101 that overlap with the transparent conductor layer. FIGS. 21 and 22 show the areas of overlapping metal in pixel 1101 that result in the terms of equation 2. FIG. 21 shows an overlapping region of the first and second metallic layers in pixel 1101 that equals approximately 503 square micrometers. FIG. 22 shows overlapping regions of the first metallic layer and the transparent conductor layer in pixel 1101 that equals approximately 360 square micrometers. FIG. 22 also shows an overlapping region of the second metallic layer and the transparent conductor layer that equals approximately 81 square micrometers. Thus, it is apparent from FIGS. 21 and 22 that, while the area of overlap of the first and second metallic layers of pixel 1101 is less than the corresponding area of pixel 1102, pixel 1101 has an extra area overlap that pixel 1102 does not. In particular, the overlap of the second metallic layer and the transparent conductor layer in pixel 1101 contributes an additional 81 square micrometers, which in turn contributes an additional amount of capacitance to the storage capacitance of pixel 1101.

Figure 23:
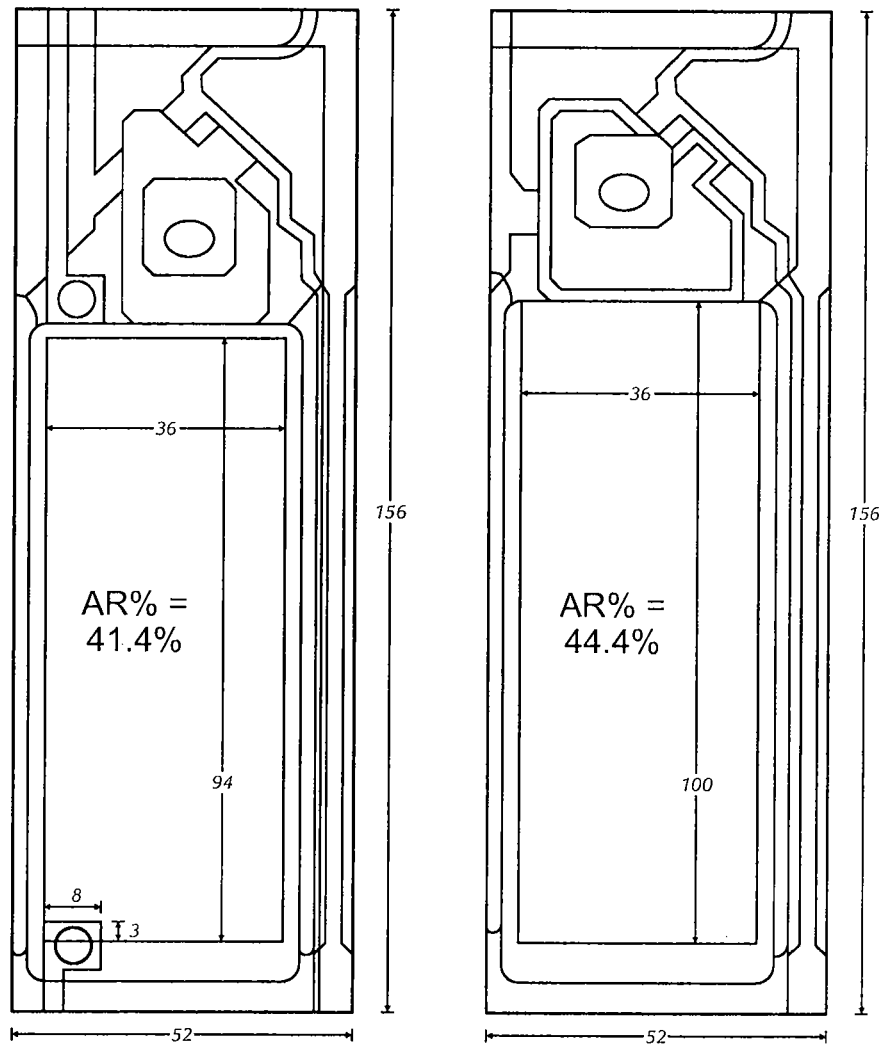
FIG. 23 illustrates aperture ratio estimations for pixels in the example ECB LCD display using a-Si according to embodiments of the invention.

FIG. 23 illustrates aperture ratio estimations for pixels 1101 and 1102. Pixel 1101 has an aperture ratio of 41.4%. Pixel 1102 has an aperture ratio of 44.4%.

Figure 24:
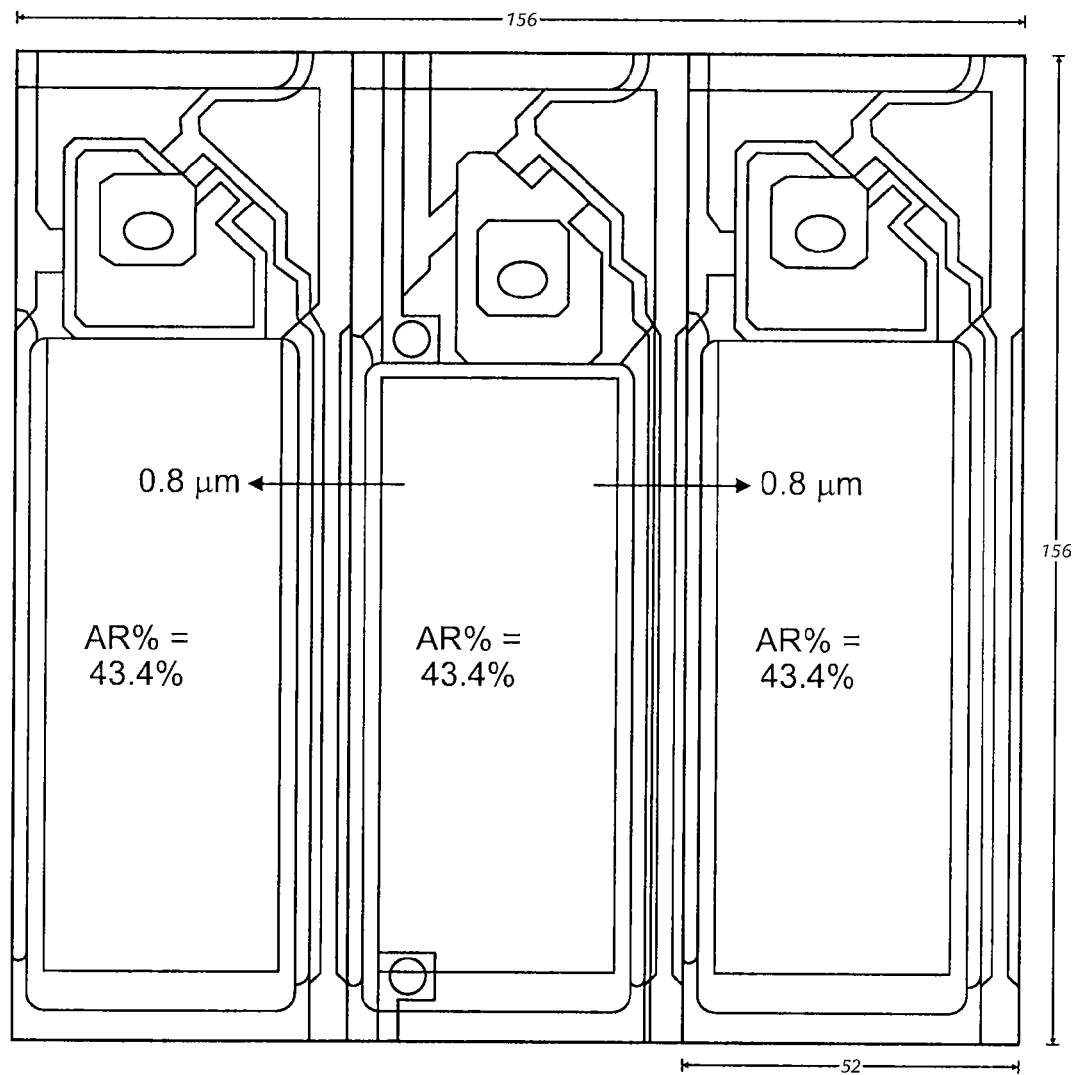
FIG. 24 illustrates an example modification in the example ECB LCD display using a-Si according to embodiments of the invention.

FIG. 24 illustrates an example modification according to embodiments of the invention. As a result of the modification, the aperture ratios of the different pixels in a system may be made more similar, which may improve the appearance of the display. Similar to pixel 1102, pixels 2401 and 2405 do not include connection portions in the y-direction. Pixel 2403, on the other hand, does include a connection portion in the y-direction, similar to pixel 1101.

FIGS. 25-34 are directed to an example IPS LCD display using low temperature polycrystalline silicon (LTPS). An example process of manufacturing an IPS LCD display using LTPS according to embodiments of the invention will now be described with reference to FIGS. 25-31. The figures show various stages of processing of two pixels, a pixel 2501 and a pixel 2502, during the manufacture of the IPS LCD display using LTPS. The resulting pixels 2501 and 2502 form electrical circuits equivalent to pixels 101 and 102, respectively, of FIG. 1. Because the stages of processing shown in FIGS. 25-30 are the same for pixel 2501 and pixel 2502, only one pixel is shown in each of these figures. However, it is understood that the stages of processing show in FIGS. 25-30 apply to both pixel 2501 and pixel 2502.

Figures 25, 26:
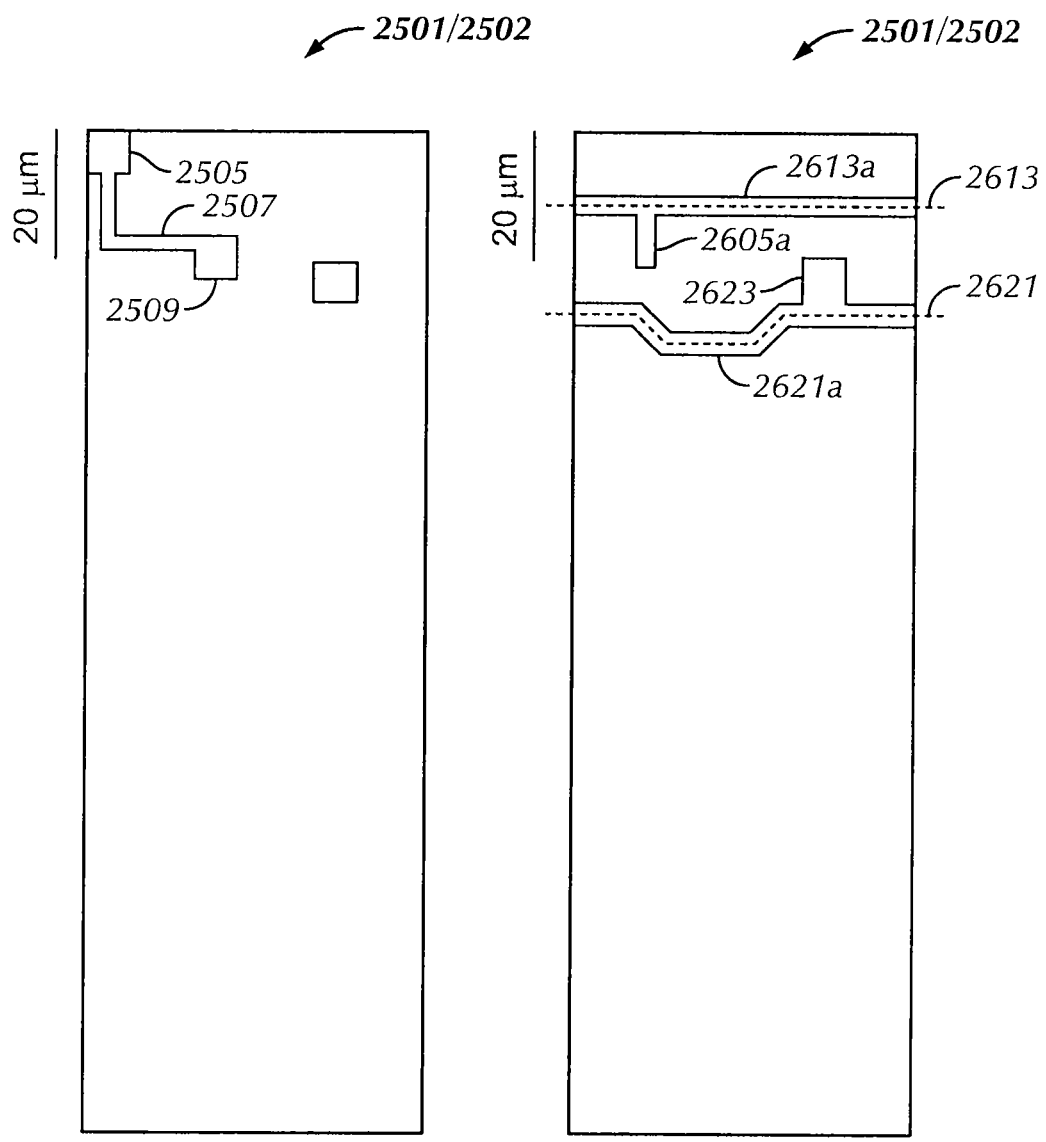
FIG. 25 illustrates the patterning of a layer of poly-Si of pixels in an example in-plane switching (IPS) LCD display using low temperature polycrystalline silicon (LTPS) according to embodiments of the invention.
FIG. 26 illustrates the patterning of a first metal layer (M1) of pixels in the example IPS LCD display using LTPS according to embodiments of the invention.

FIG. 25 shows the patterning of a layer of poly-Si of pixels 2501 and 2502. Semiconductor portions 2505, 2507, and 2509 form the active region of a TFT, and serve as source, gate, and drain, respectively.

FIG. 26 shows a subsequent patterning step in the process of manufacturing pixels 2501 and 2502, in which a first metal layer (M1) of pixels 2501 and 2502 is formed. As shown in FIG. 26, the M1 layer for the pixels 2501/2502 includes a gate 2605a, a portion 2613a of a gate line 2613 (shown as dotted lines), and a portion 2621a of xVcom 2621. Portion 2621a includes a connection point 2623. Gate line 2613 and xVcom 2621 run through pixels that are adjacent in the x-direction.

Figure 27:
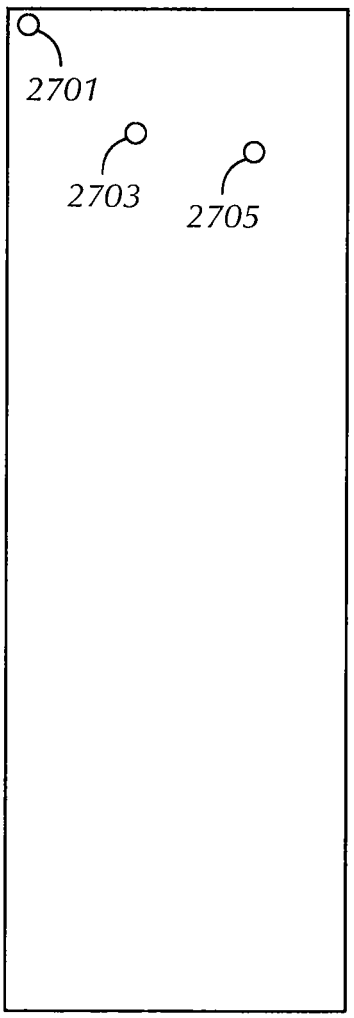
FIG. 27 illustrates vias formed in pixels in the example IPS LCD display using LTPS according to embodiments of the invention.

FIG. 27 shows vias 2701, 2703, and 2705 formed in pixels 2501/2502 for connections to portion 2505, portion 2509, and connection point 2623, respectively.

Figure 28:
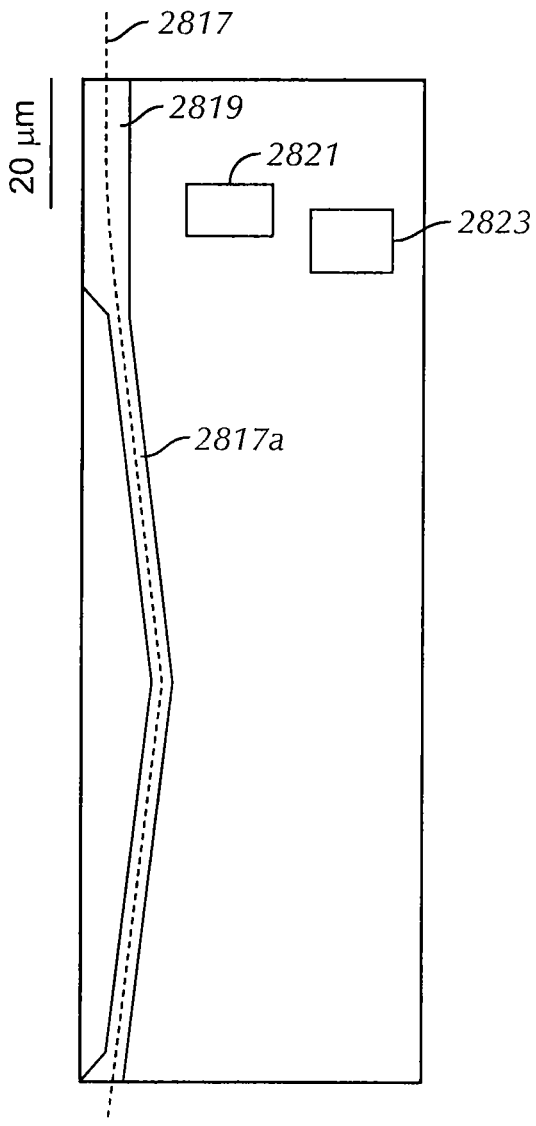
FIG. 28 illustrates the patterning of a second metal layer (M2) of pixels in the example IPS LCD display using LTPS according to embodiments of the invention.

FIG. 28 shows patterning of a second metal layer (M2) of pixels 2501/2502. As shown in FIG. 28, the M2 layer of the pixels forms a portion 2817a of a color data line 2817 (shown as a dotted line in FIG. 28), which could carry red, green, or blue color data, for example. Portion 2817a includes a connection 2819 that connects to portion 2505 through via 2701. The M2 layer also forms a connection 2821 with portion 2509 through via 2703, and forms a connection 2823 to connection point 2623 through via 2705.

FIG. 29 shows a first layer of transparent conductive material, such as ITO, formed on pixels 2501/2502. The first transparent conductor layer includes a pixel electrode 2901. FIG. 29 also shows a portion 2905 of a pixel electrode of a pixel adjacent in the x-direction, and a portion 2907 of a pixel electrode of a pixel adjacent in the y-direction. FIG. 29 also shows a connection 2903, which forms a connection between a common ITO layer described below and xVcom 2621 through connection point 2623 and a connection 3001 shown in FIG. 30.

Figure 31:
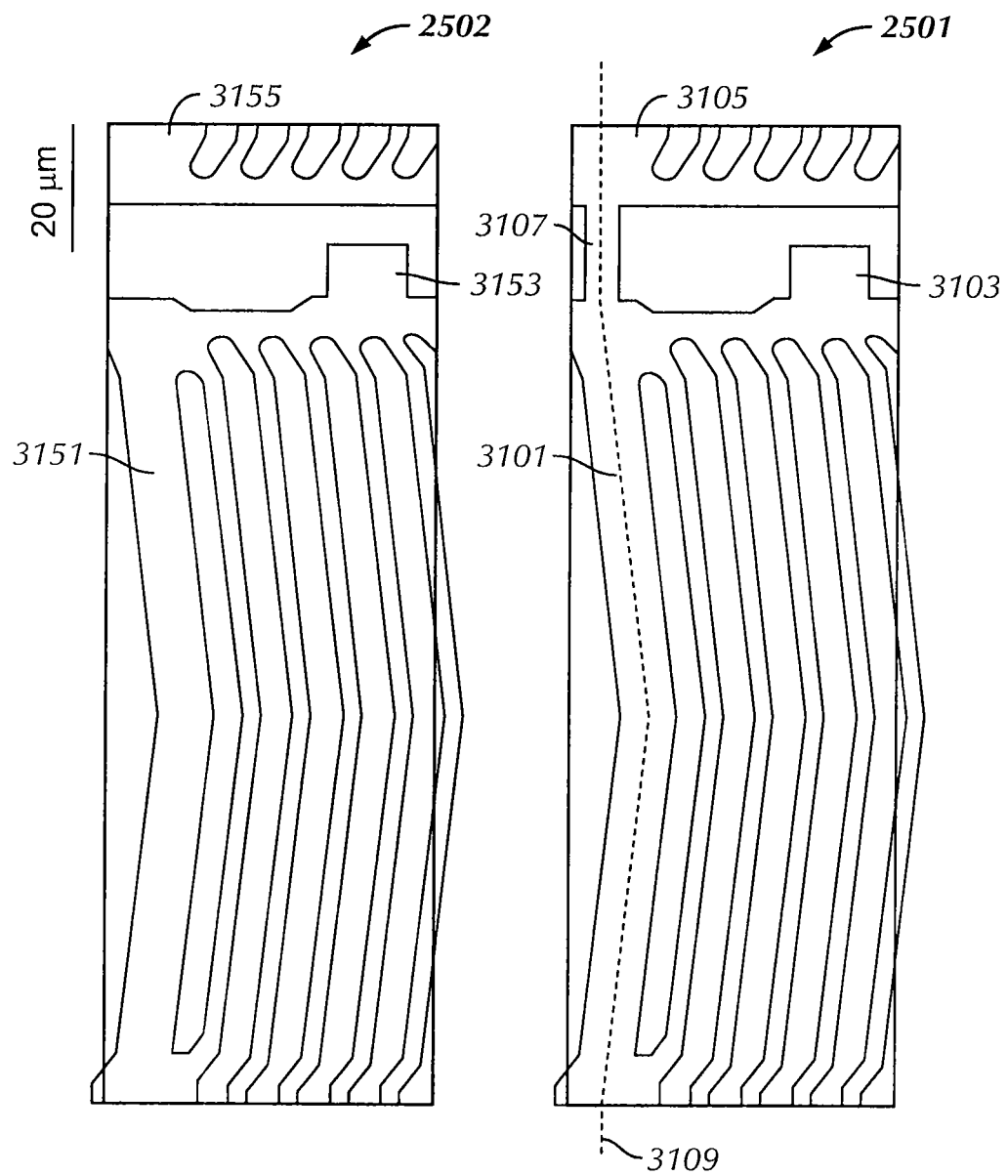
FIG. 31 illustrates a second layer of transparent conductor, such as ITO, formed on pixel in the example IPS LCD display using LTPS according to embodiments of the invention.

FIG. 31 shows a second layer of transparent conductor, such as ITO, formed on pixel 2501 and pixel 2502. The second layer on pixel 2502 forms a common electrode 3151, which includes a connection point 3153 that connects to xVcom 2621 through connections 3001 and 2903, and connection point 2623. FIG. 31 also shows a portion 3155 of a common electrode of a pixel adjacent in the y-direction. Like pixel 2502, pixel 2501 includes a common electrode 3101 formed of the second layer of transparent conductor. Likewise, common electrode 3101 includes a connection point 3103 that connects to xVcom 2621 through connections 3001 and 2903, and connection point 2623. However, pixel 2501 also includes a connection 3107 between common electrode 3101 and a common electrode 3105 of a pixel adjacent in the y-direction. In this way, the common electrodes of pixels can be connected in the y-direction to form a yVcom line 3109. Because common electrode 3101 is connected to xVcom 2621 and xVcom 2621 is connected to common electrodes of other pixels in the x-direction, the common electrodes of a region of pixels can be connected together to form a touch sensing element. Similar to the previous example embodiment, breaks in xVcom lines and yVcom lines can create separate regions of linked-together common electrodes that can be formed as an array of touch sensors.

Figure 32:
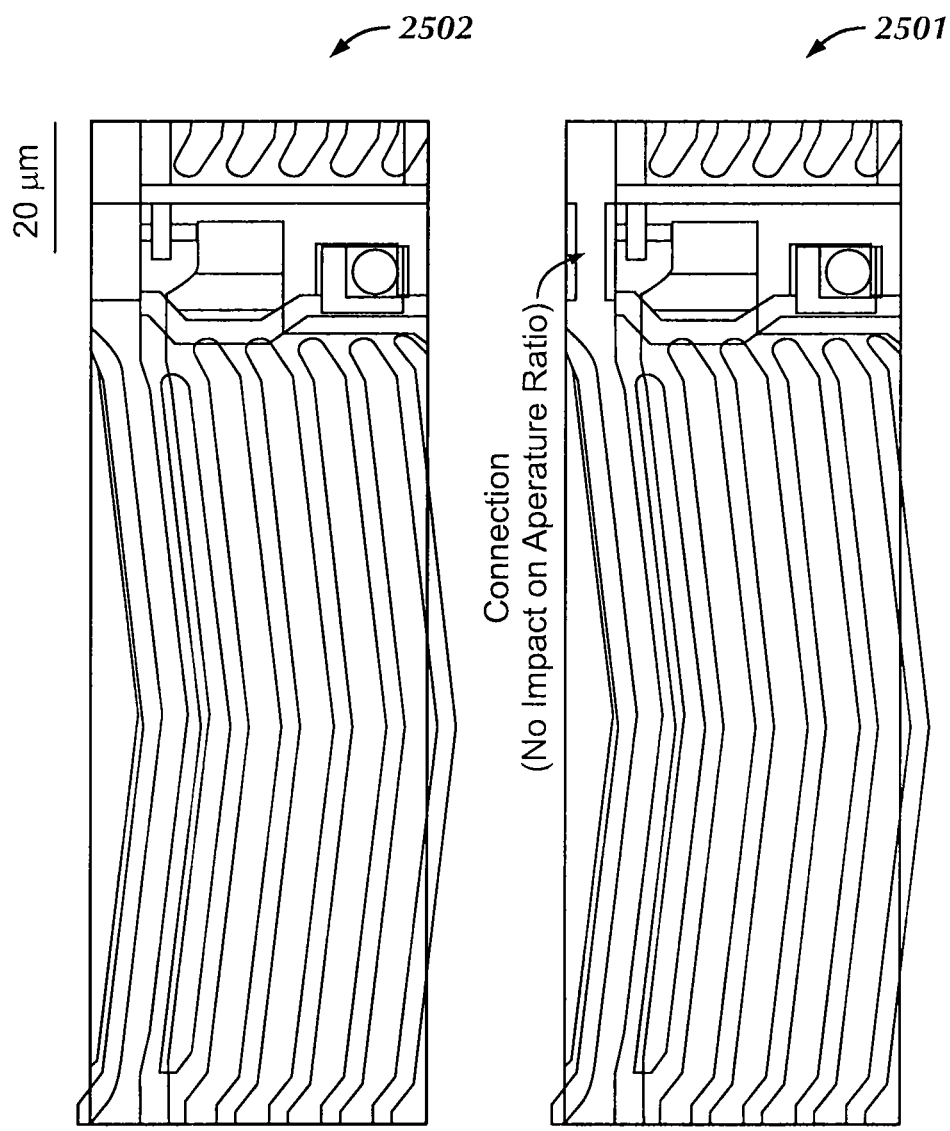
FIG. 32 illustrates a plan view of completed pixels in the example IPS LCD display using LTPS according to embodiments of the invention.

FIG. 32 shows a plan view of completed pixels 2501 and 2502. FIG. 33 illustrates a side view of pixel 2501 taken along the lines shown in the top view shown in the figure.

Figure 34:
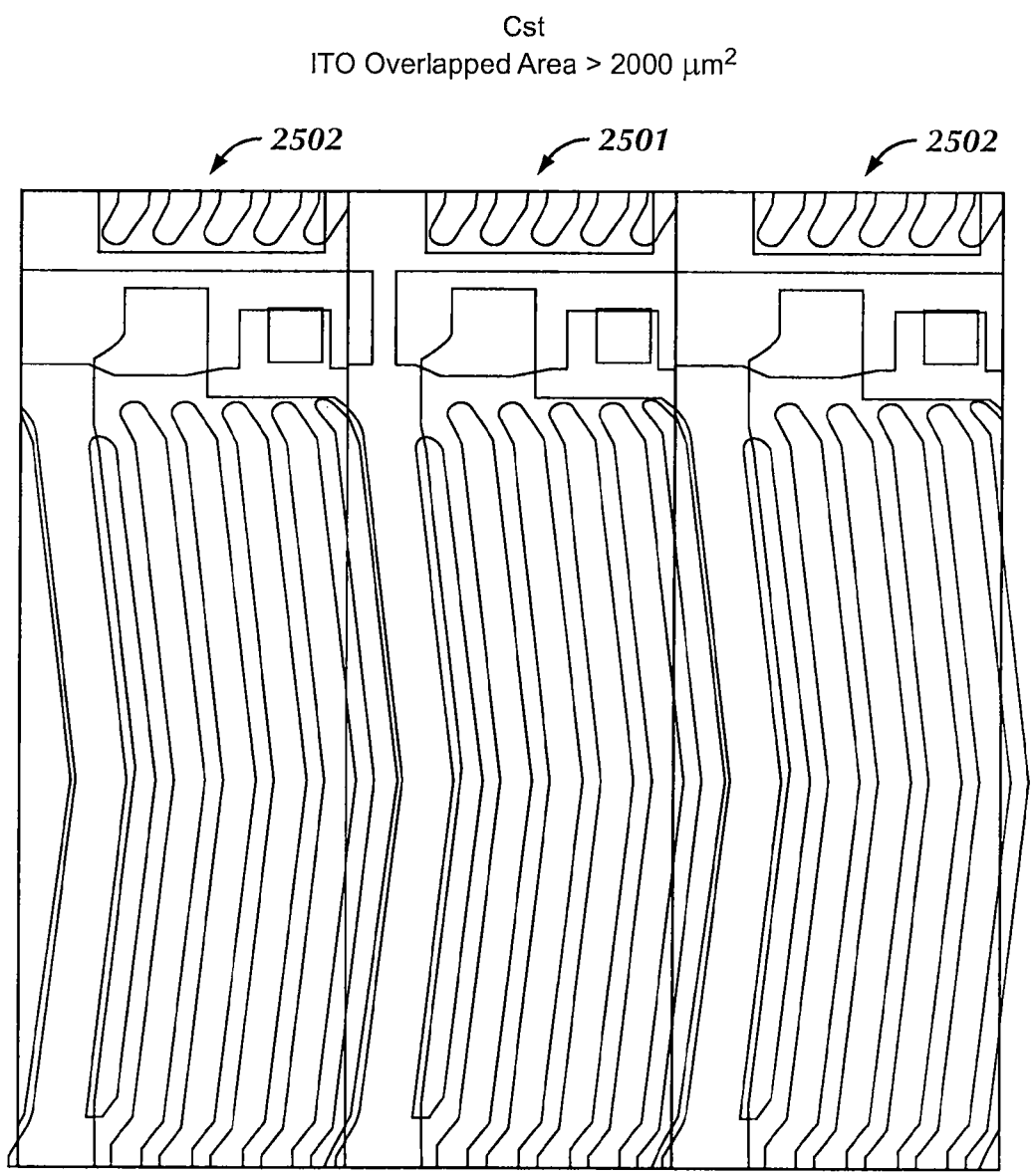
FIG. 34 illustrates the storage capacitances of two pixels in the example IPS LCD display using LTPS according to embodiments of the invention.

FIG. 34 illustrates the storage capacitance of a pixel 2501 and a pixel 2502.

FIGS. 35-43 are directed to another example IPS LCD display using LTPS. In the present example, a yVcom line is formed in an M2 layer (in comparison to the previous example IPS LCD display, in which a yVcom line is formed in a common ITO layer). An example process of manufacturing an IPS LCD display using LTPS with an M2 layer yVcom line according to embodiments of the invention will now be described with reference to FIGS. 35-41. The figures show various stages of processing of two pixels, a pixel 3501 and a pixel 3502, during the manufacture of the example IPS LCD display. The resulting pixels 3501 and 3502 form electrical circuits equivalent to pixels 101 and 102, respectively, of FIG. 1.

Figure 35:
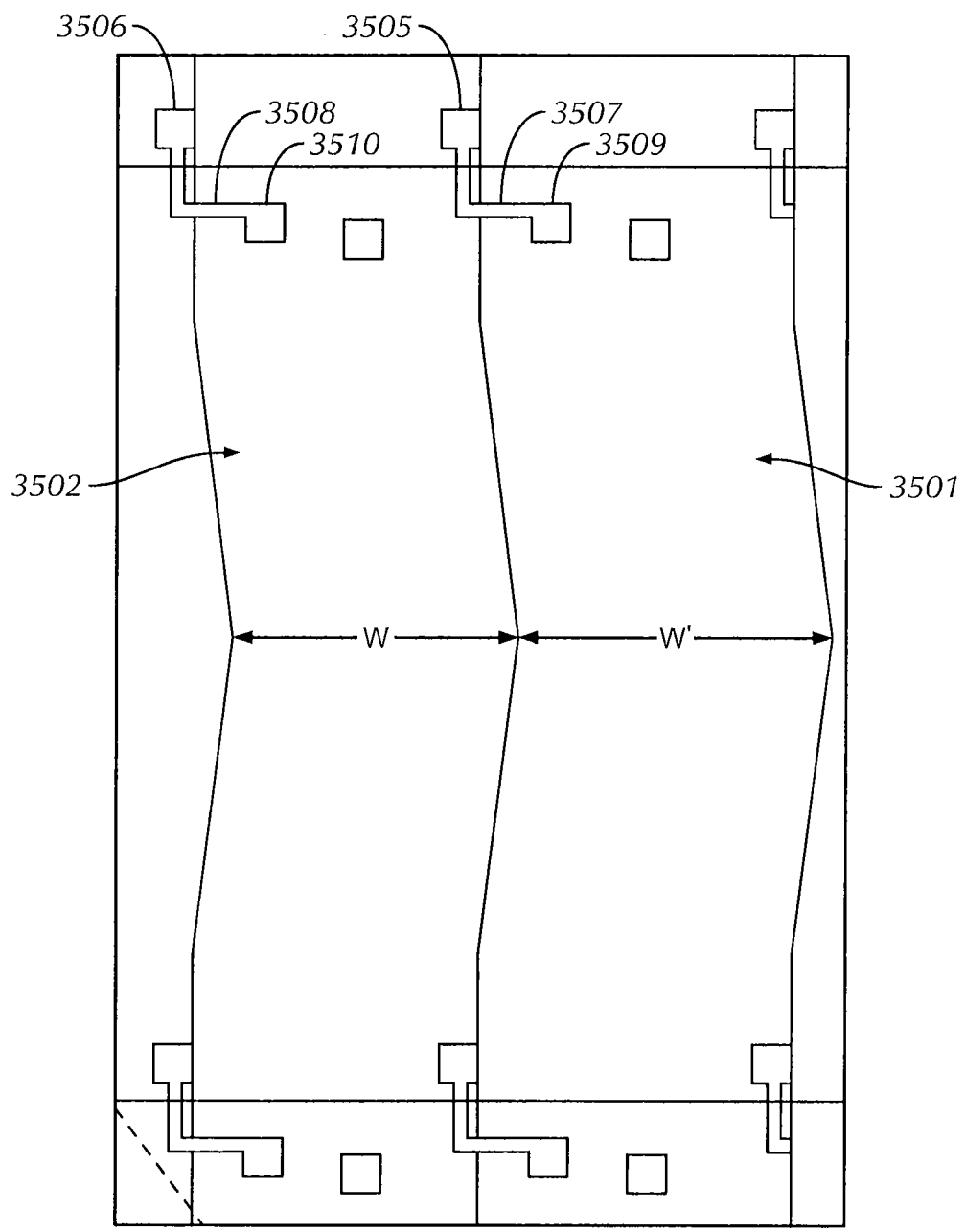
FIG. 35 illustrates the patterning of a layer of poly-Si of pixels in an example IPS LCD display using LTPS in which a yVcom line is formed in an M2 layer according to embodiments of the invention.

FIG. 35 shows the patterning of a layer of poly-Si of pixels 3501 and 3502. Semiconductor portions 3505, 3507, and 3509 form the active region of a TFT of pixel 3501, and serve as source, gate, and drain, respectively. Likewise, semiconductor portions 3506, 3508, and 3510 are the source, gate, and drain, respectively, of pixel 3502. FIG. 35 also shows that pixel 3501 has the width W' (in the x-direction) that is slightly greater than the width W of pixel 3502.

Figure 36:
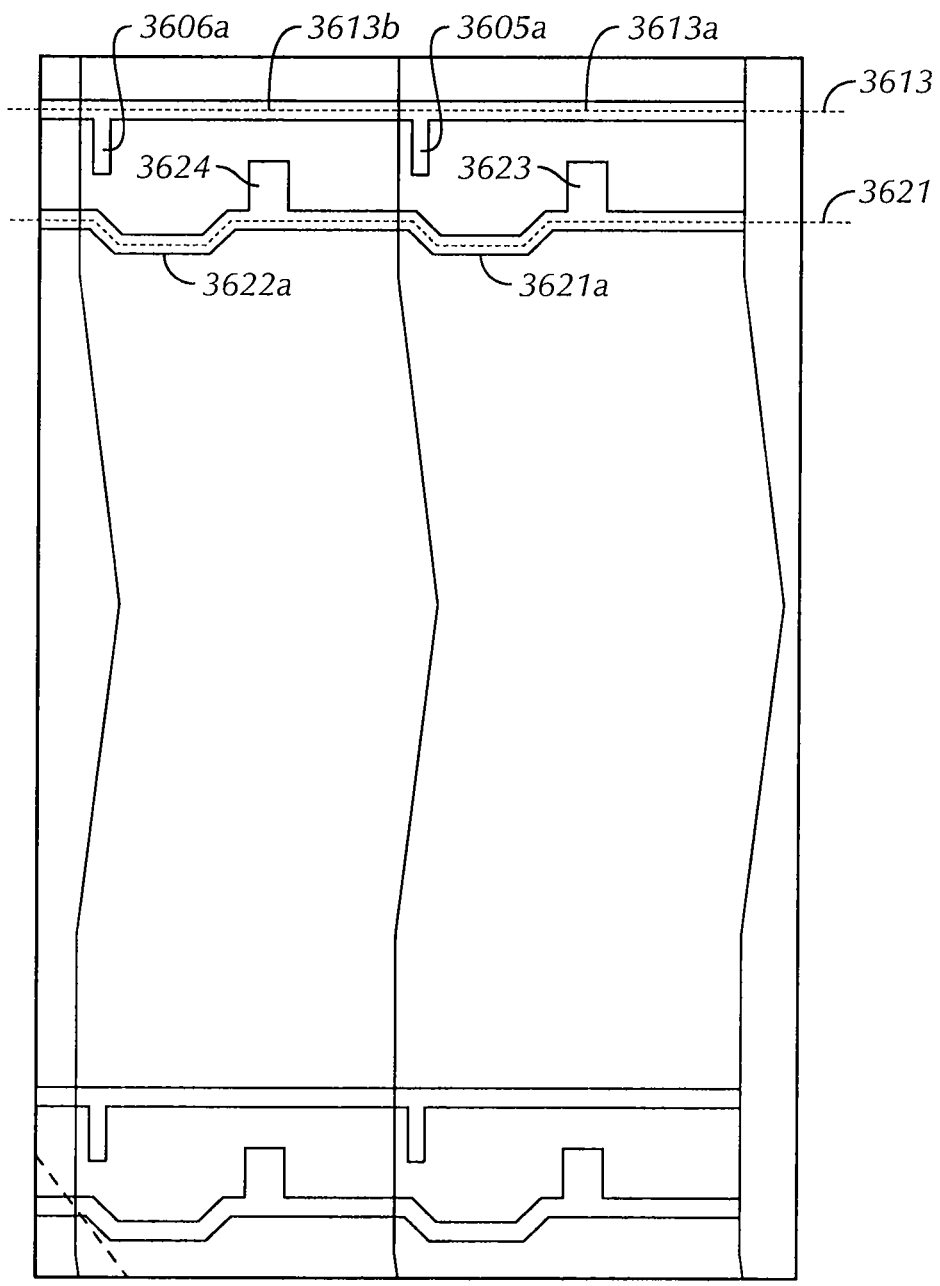
FIG. 36 illustrates the patterning of a first metal layer (M1) of pixels in the example IPS LCD display using LTPS in which a yVcom line is formed in an M2 layer according to embodiments of the invention.

FIG. 36 shows a subsequent patterning step in the process of manufacturing pixels 3501 and 3502, in which a first metal layer (M1) of pixels 3501 and 3502 is formed. As shown in FIG. 36, the M1 layers of pixels 3501 and 3502 include gates 3605a and 3606a, portions 3613a and 3613b of a gate line 3613 (shown as dotted lines), and portions 3621a and 3621b of xVcom 3621. Portions 3621a and 3622a include connections points 3623 and 3624, respectively. Gate line 3613 and xVcom 3621 run through pixels that are adjacent in the x-direction.

Figure 37:
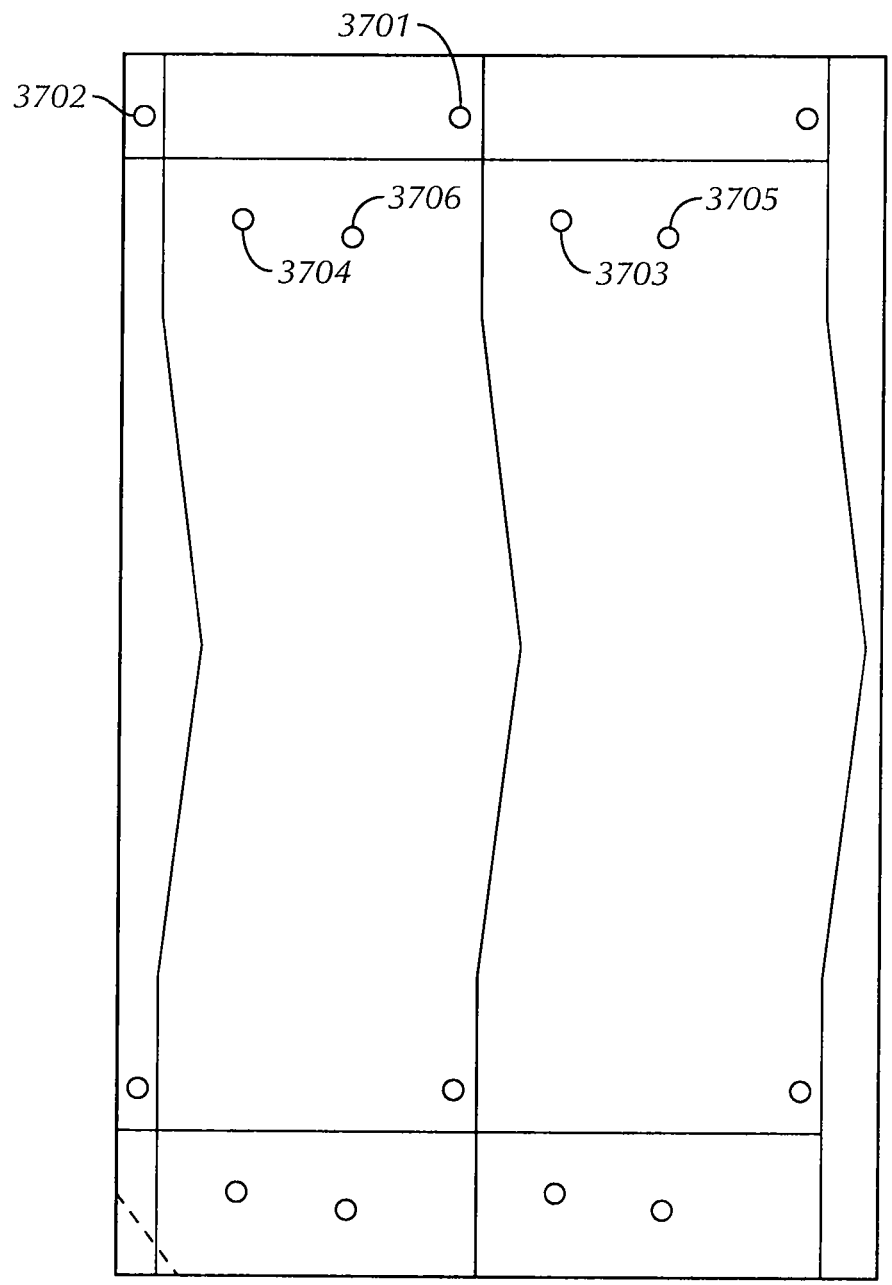
FIG. 37 illustrates vias formed in pixels in the example IPS LCD display using LTPS in which a yVcom line is formed in an M2 layer according to embodiments of the invention.

FIG. 37 shows vias 3701, 3703, and 3705 formed in pixels 3501 for connections to portion 3505, portion 3509, and connection point 3623, respectively. Vias 3702, 3704, and 3706 formed in pixels 3502 for connections to portion 3506, portion 3510, and connection point 3624, respectively.

Figure 38:
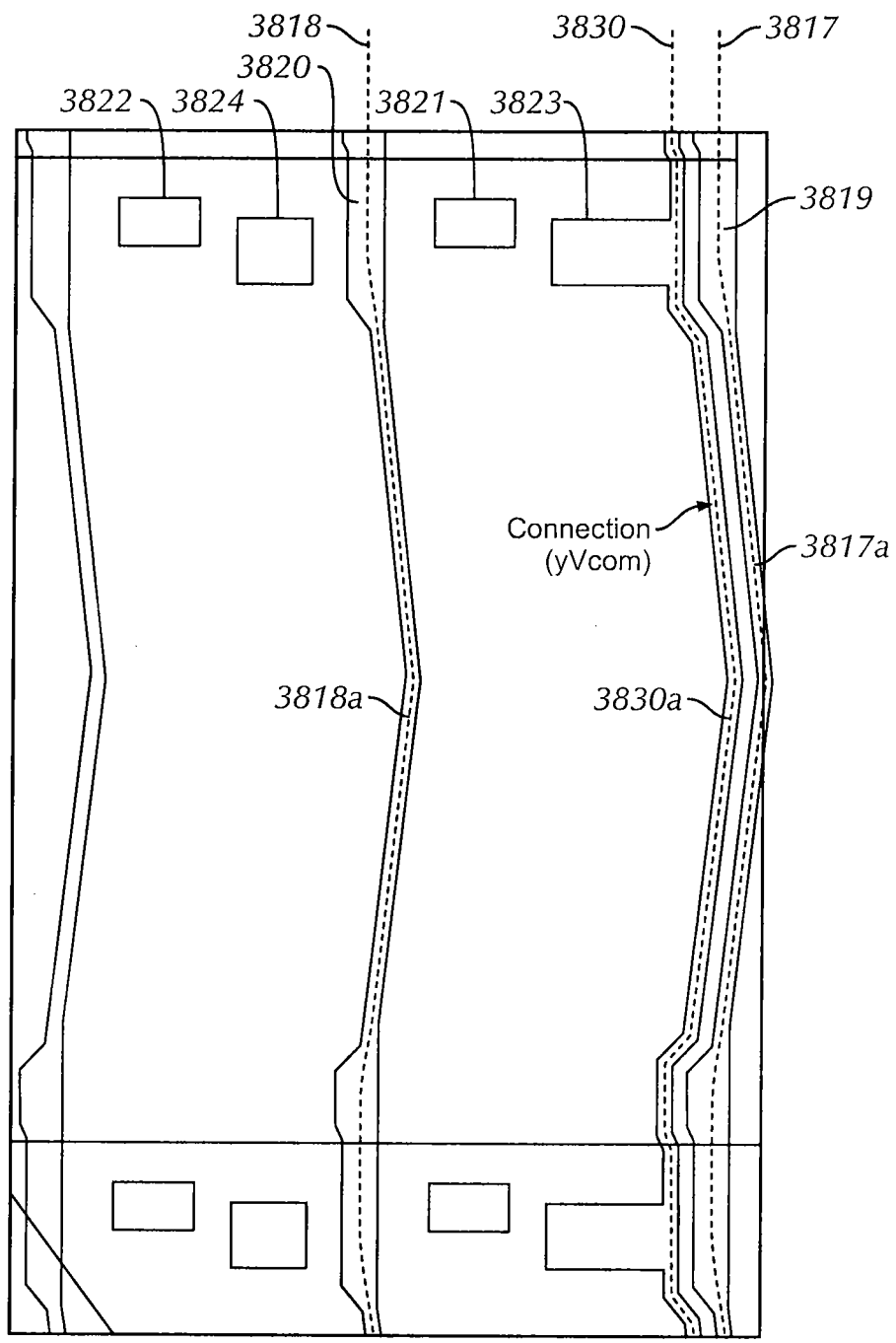
FIG. 38 illustrates patterning of a second metal layer (M2) of pixels in the example IPS LCD display using LTPS in which a yVcom line is formed in an M2 layer according to embodiments of the invention.

FIG. 38 shows patterning of a second metal layer (M2) of pixels 3501 and 3502. For pixel 3501, the M2 layer forms a portion 3817a of a color data line 3817 (shown as a dotted line in FIG. 38), which could carry red, green, or blue color data, for example. Portion 3817a includes a connection 3819 that connects to portion 3505 through via 3701. Pixel 3501 also includes a portion 3830a of a yVcom 3830 (shown as a dotted line), which includes a connection 3823 to connection point 3623 through via 3705. Thus, yVcom 3830 is connected to xVcom 3621. Pixel 3501 also includes a connection 3821 with portion 3509 through via 3703.

Because yVcom 3830 is connected to xVcom 3621 and xVcom 3621 is connected to common electrodes of other pixels in the x-direction, the common electrodes of a region of pixels can be connected together to form a touch sensing element. Similar to the previous example embodiment, breaks in xVcom lines and yVcom lines can create separate regions of linked-together common electrodes that can be formed as an array of touch sensors.

For pixel 3502, the M2 layer forms a portion 3818a of a color data line 3818 (shown as a dotted line in FIG. 38), which could carry red, green, or blue color data, for example. Portion 3818a includes a connection 3820 that connects to portion 3506 through via 3702. Pixel 3501 also includes a connection 3824 to connection point 3624 through via 3706, and a connection 3822 with portion 3510 through via 3704.

Figure 39:
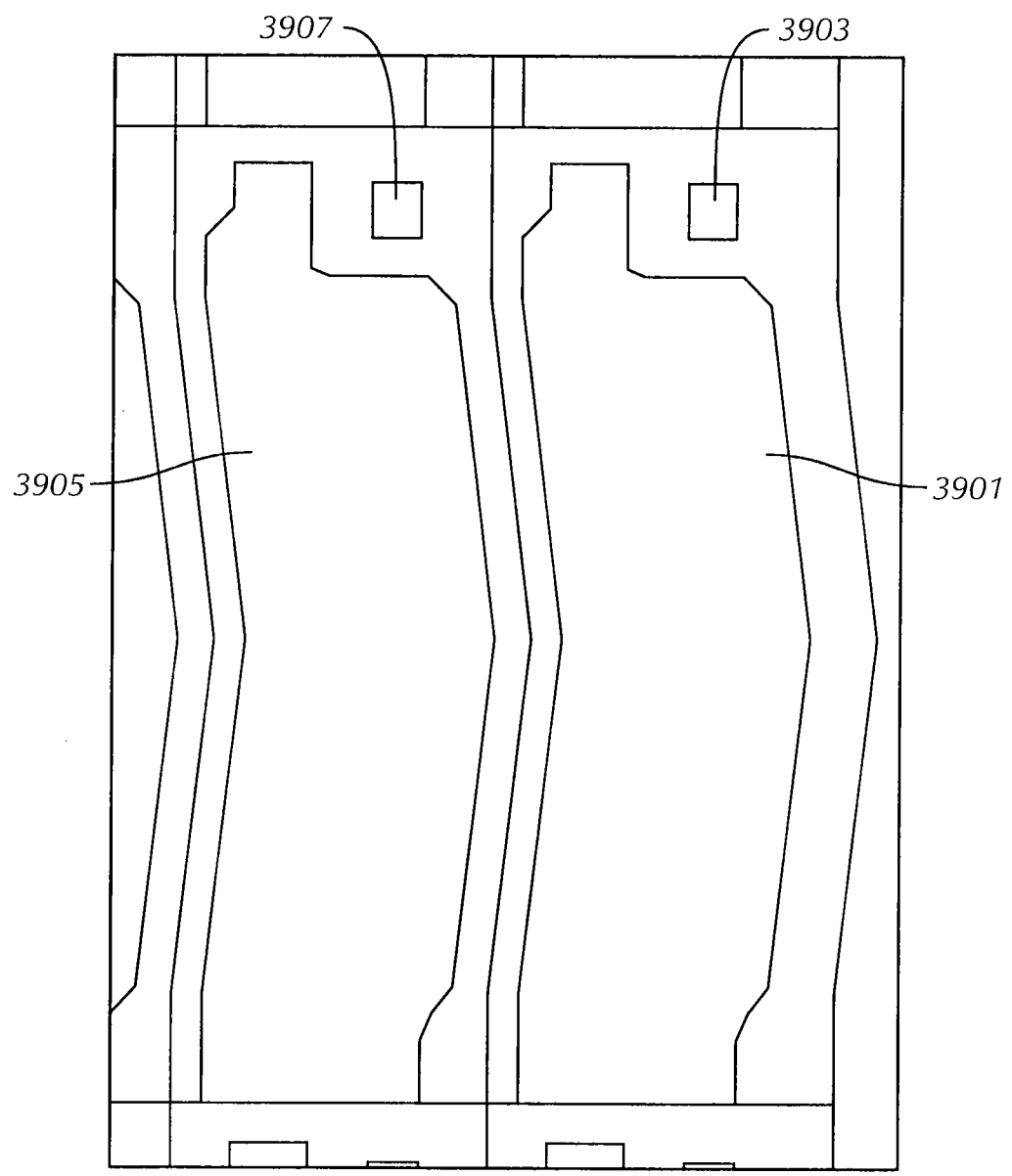
FIG. 39 illustrates a first layer of transparent conductive material, such as ITO, formed on pixels in the example IPS LCD display using LTPS in which a yVcom line is formed in an M2 layer according to embodiments of the invention.
Figure 40:
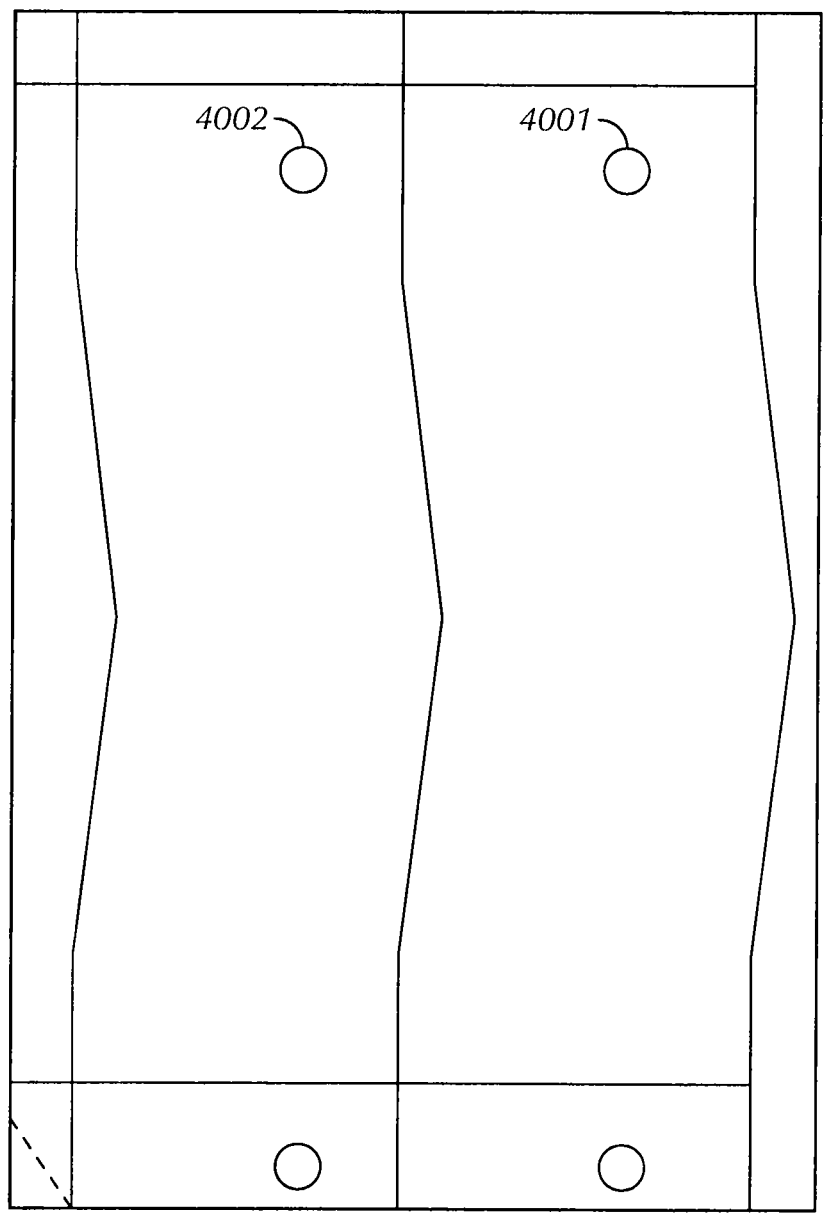
FIG. 40 illustrates connections in the example IPS LCD display using LTPS in which a yVcom line is formed in an M2 layer according to embodiments of the invention.

FIG. 39 shows a first layer of transparent conductive material, such as ITO, formed on pixels 3501 and 3502. The first transparent conductor layer includes pixel electrodes 3901 and 3905. FIG. 39 also shows connections 3903 and 3907, which form connections between a common ITO layer described below and xVcom 3621 through connection points 3623 and 3624 and connections 4001 and 4002, respectively, shown in FIG. 40.

Figure 41:
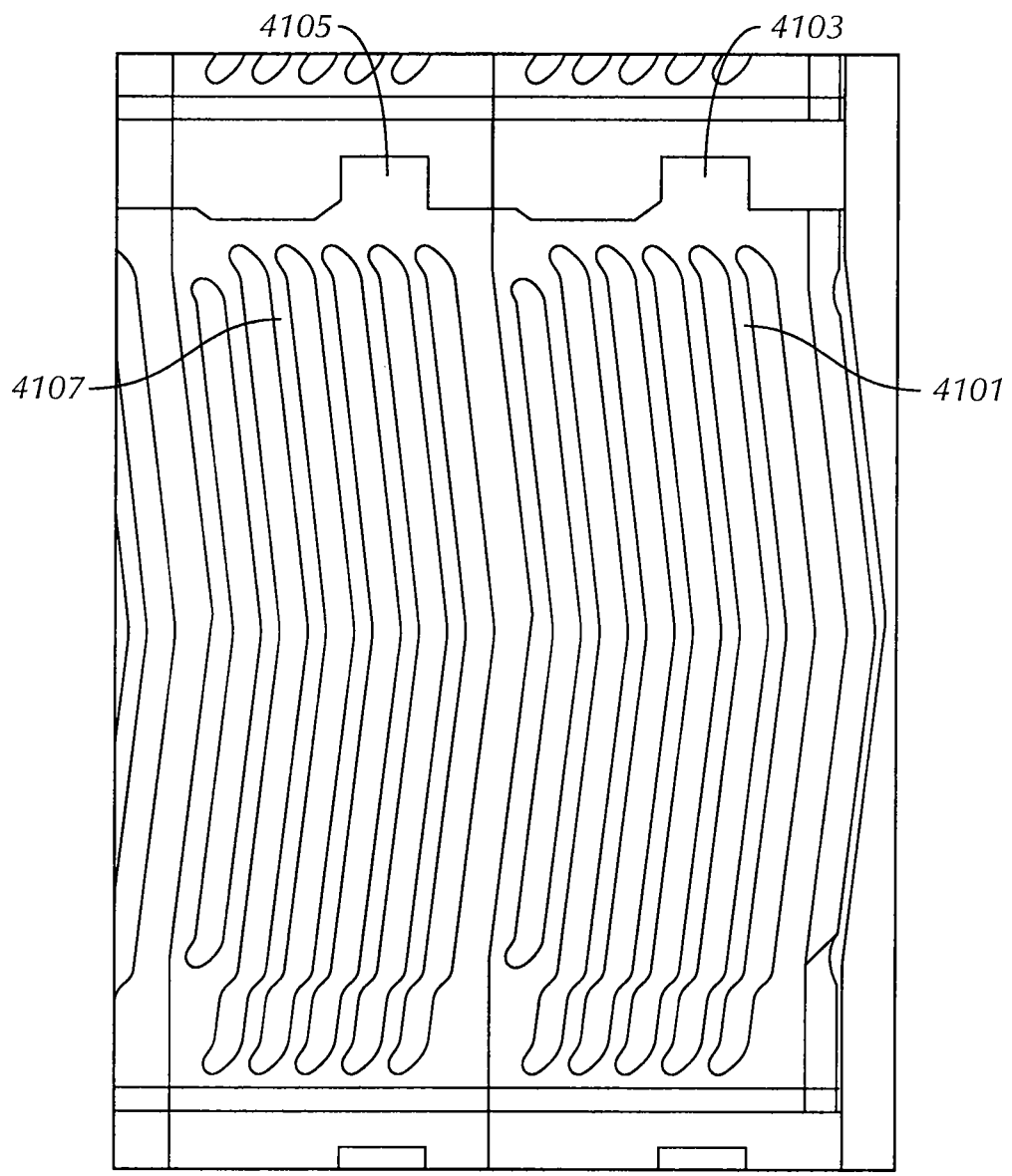
FIG. 41 illustrates a second layer of transparent conductor, such as ITO, formed on pixels in the example IPS LCD display using LTPS in which a yVcom line is formed in an M2 layer according to embodiments of the invention.

FIG. 41 shows a second layer of transparent conductor, such as ITO, formed on pixel 3501 and pixel 3502. The second layer on pixel 3502 forms a common electrode 4107, which includes a connection point 4105 that connects to xVcom 3621 through connections 4002 and 3907, and connection point 3624. Like pixel 3502, pixel 3501 includes a common electrode 4101 formed of the second layer of transparent conductor. Likewise, common electrode 4101 includes a connection point 4103 that connects to xVcom 3621 through connections 4001 and 3903, and connection point 3623.

Figure 42:
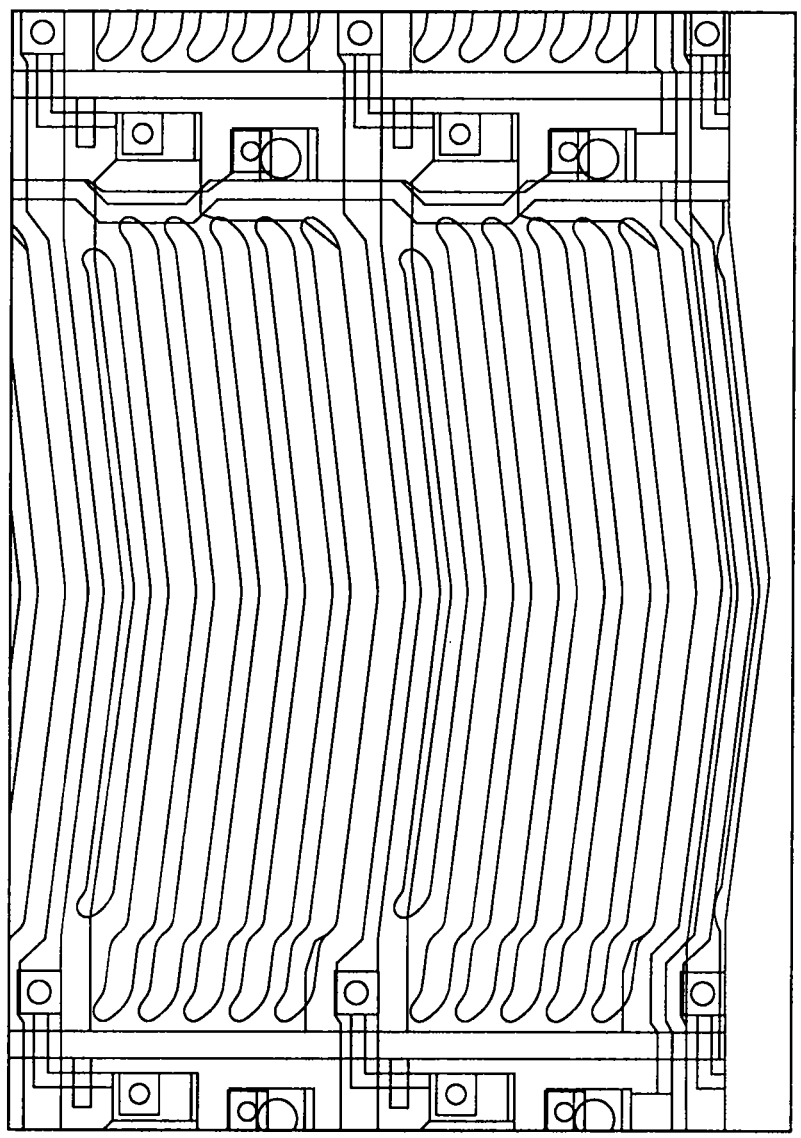
FIG. 42 illustrates a plan view of completed pixels in the example IPS LCD display using LTPS in which a yVcom line is formed in an M2 layer according to embodiments of the invention.

FIG. 42 shows a plan view of completed pixels 3501 and 3502. FIG. 43 illustrates a side view of pixel 3501 taken along the lines shown in the top view shown in the figure.

FIGS. 44-55 are directed to an example ECB LCD display using LTPS. Like the ECB LCD display using amorphous silicon (a-Si) (shown in FIGS. 11-24), the process of manufacturing the ECB LCD display using LTPS includes construction of vias and additional M2 lines to form yVcom lines that connect the storage capacitors of pixels in the y-direction.

Figure 48:
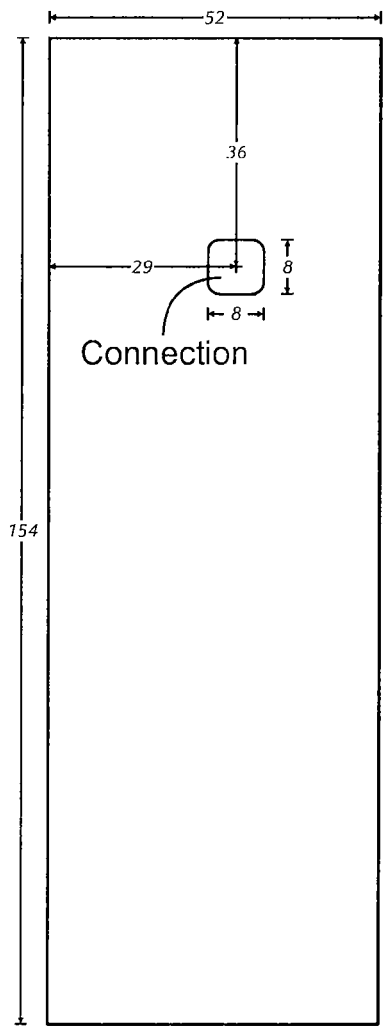
FIG. 48 illustrates a connection layer in the example ECB LCD display using LTPS according to embodiments of the invention.
Figure 49:
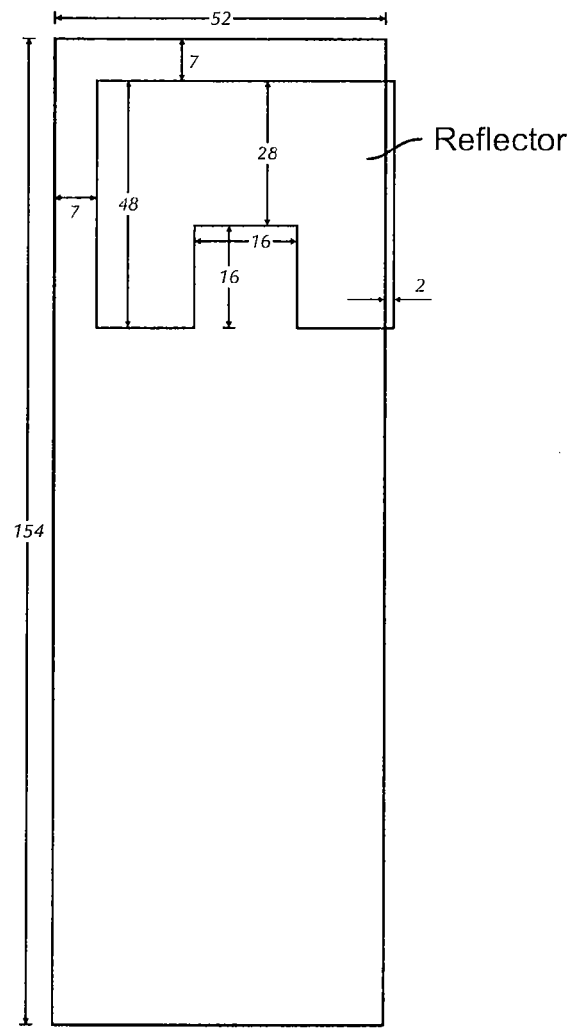
FIG. 49 illustrates a reflector layer in the example ECB LCD display using LTPS according to embodiments of the invention.
Figure 50:
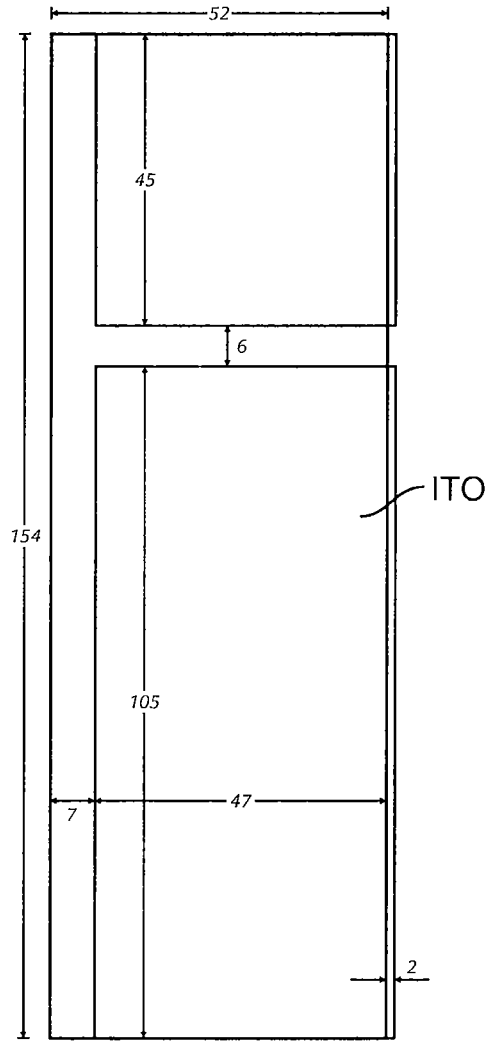
FIG. 50 illustrates an ITO layer in the example ECB LCD display using LTPS according to embodiments of the invention.
Figure 51:
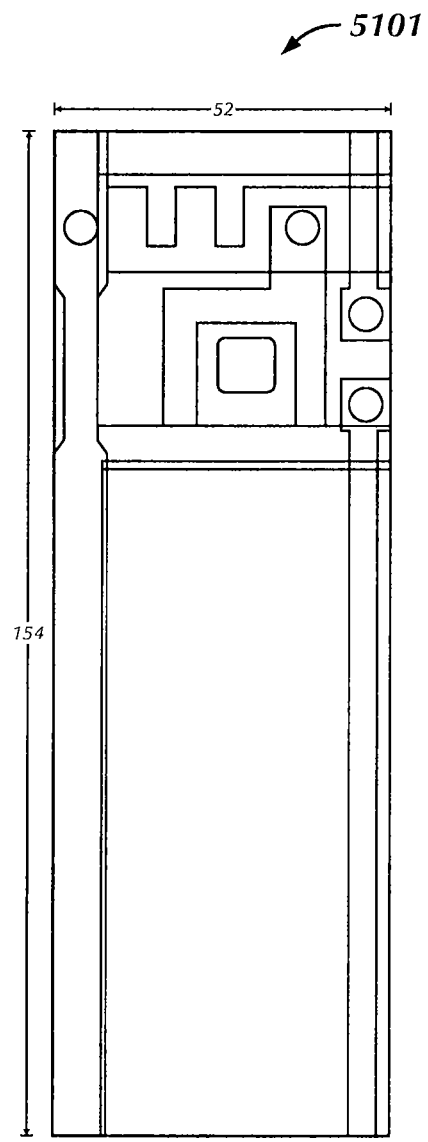
FIG. 51 illustrates a completed pixel in the example ECB LCD display using LTPS according to embodiments of the invention.
Figure 52:
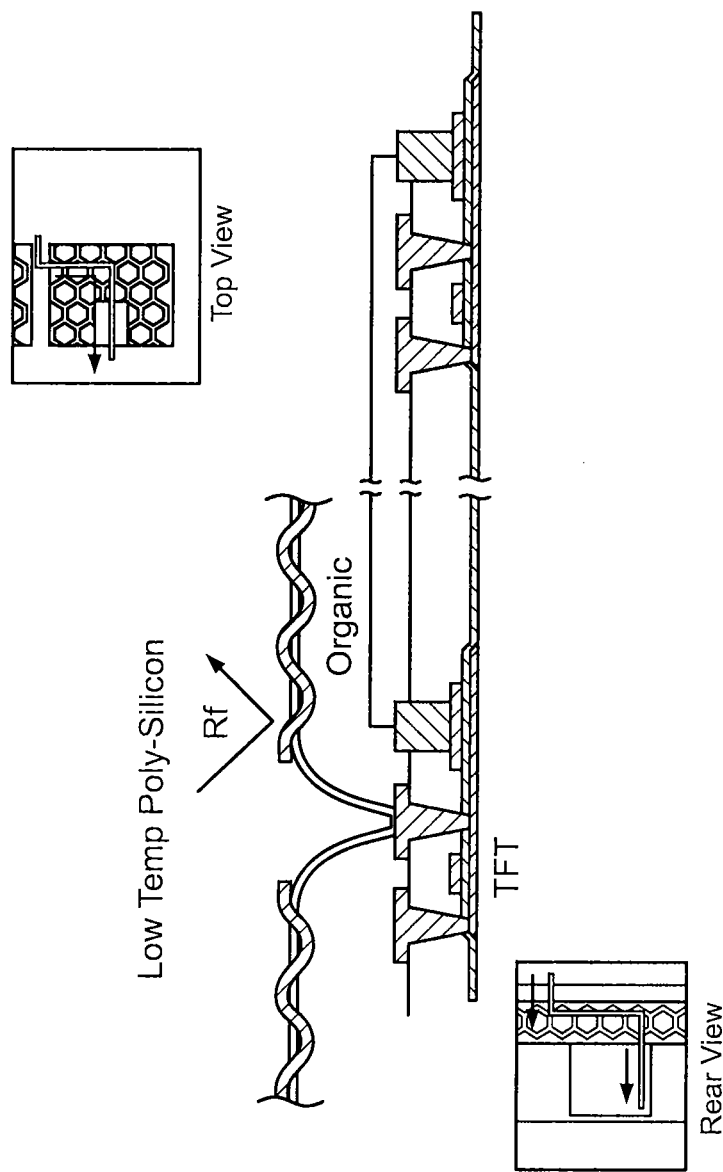
FIG. 52 illustrates a side view of a pixel in the example ECB LCD display using LTPS according to embodiments of the invention.
Figure 53:
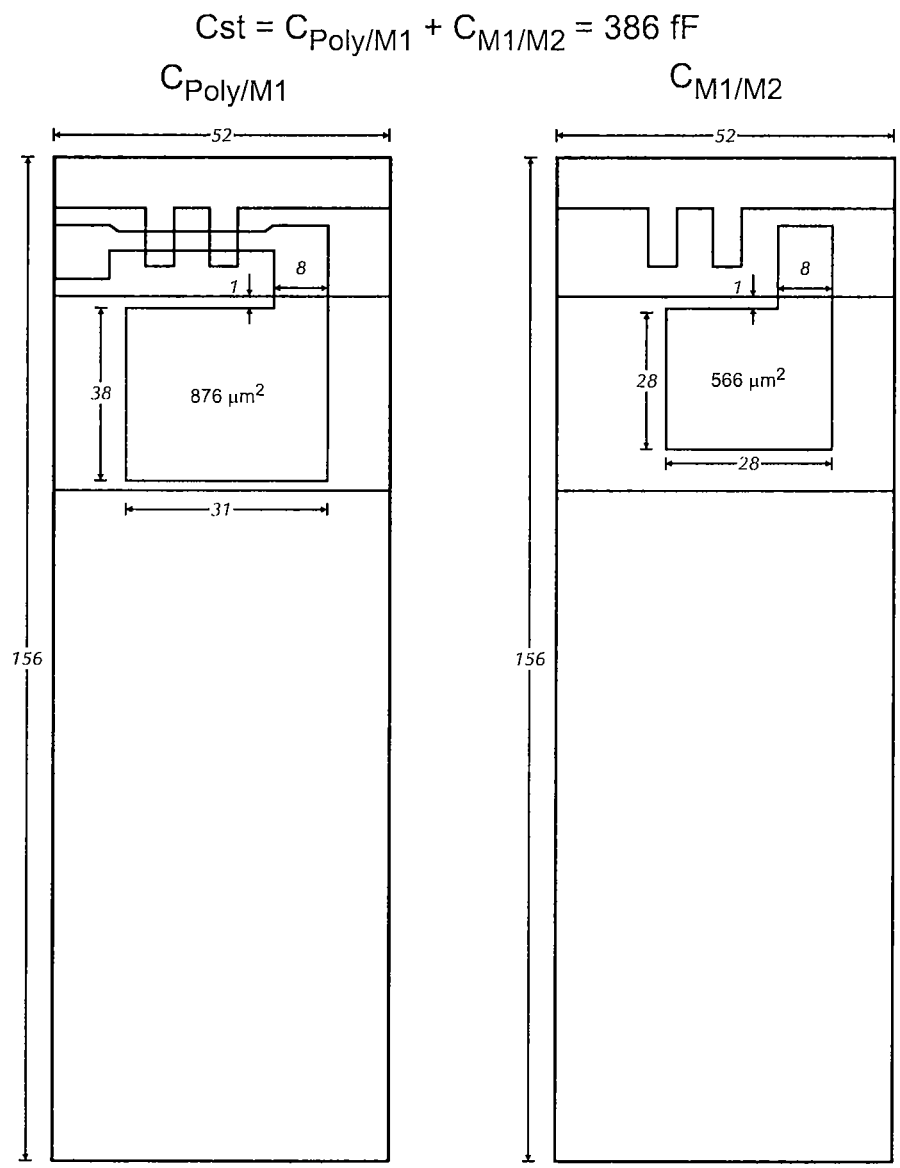
FIG. 53 illustrates a calculation of the storage capacitance of a pixel in the example ECB LCD display using LTPS according to embodiments of the invention.
Figure 54:
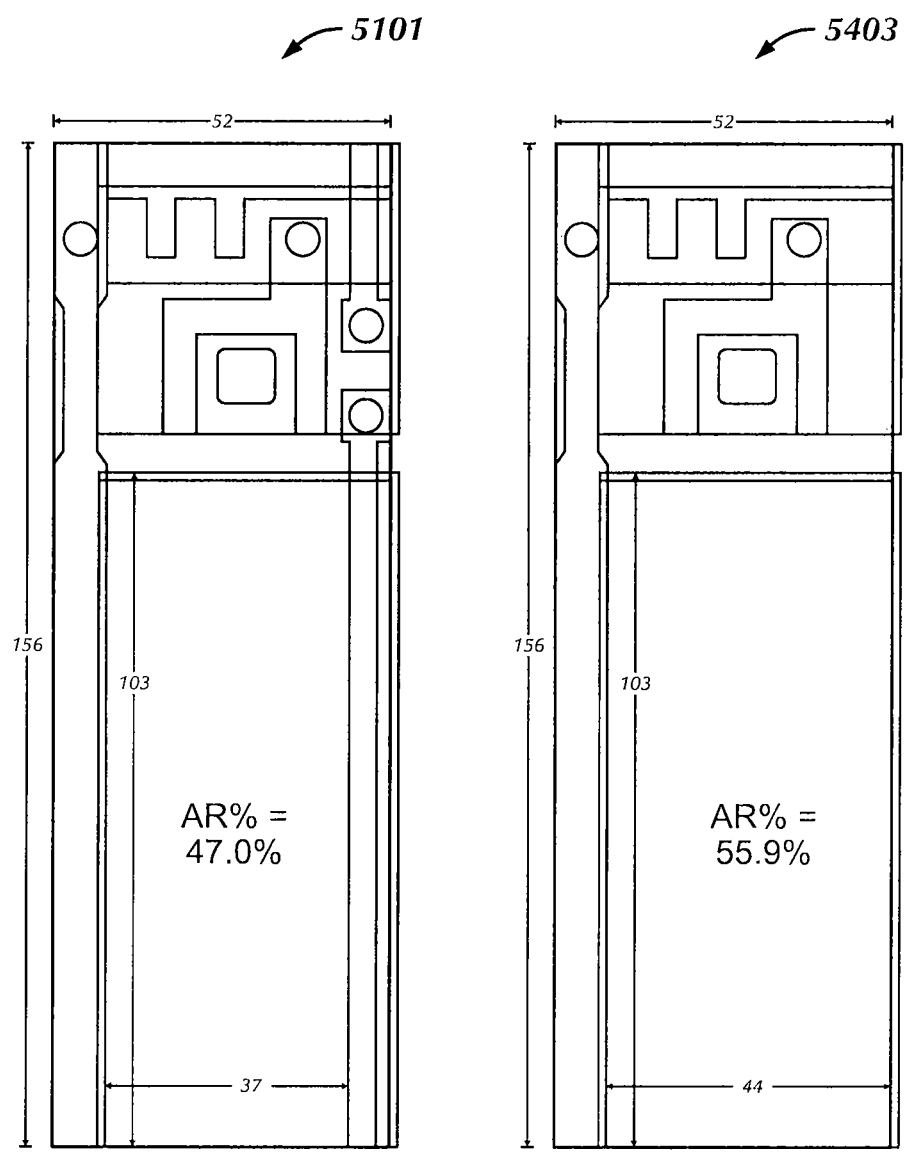
FIG. 54 illustrates an aperture ratio estimation of pixels in the example ECB LCD display using LTPS according to embodiments of the invention.
Figure 55:
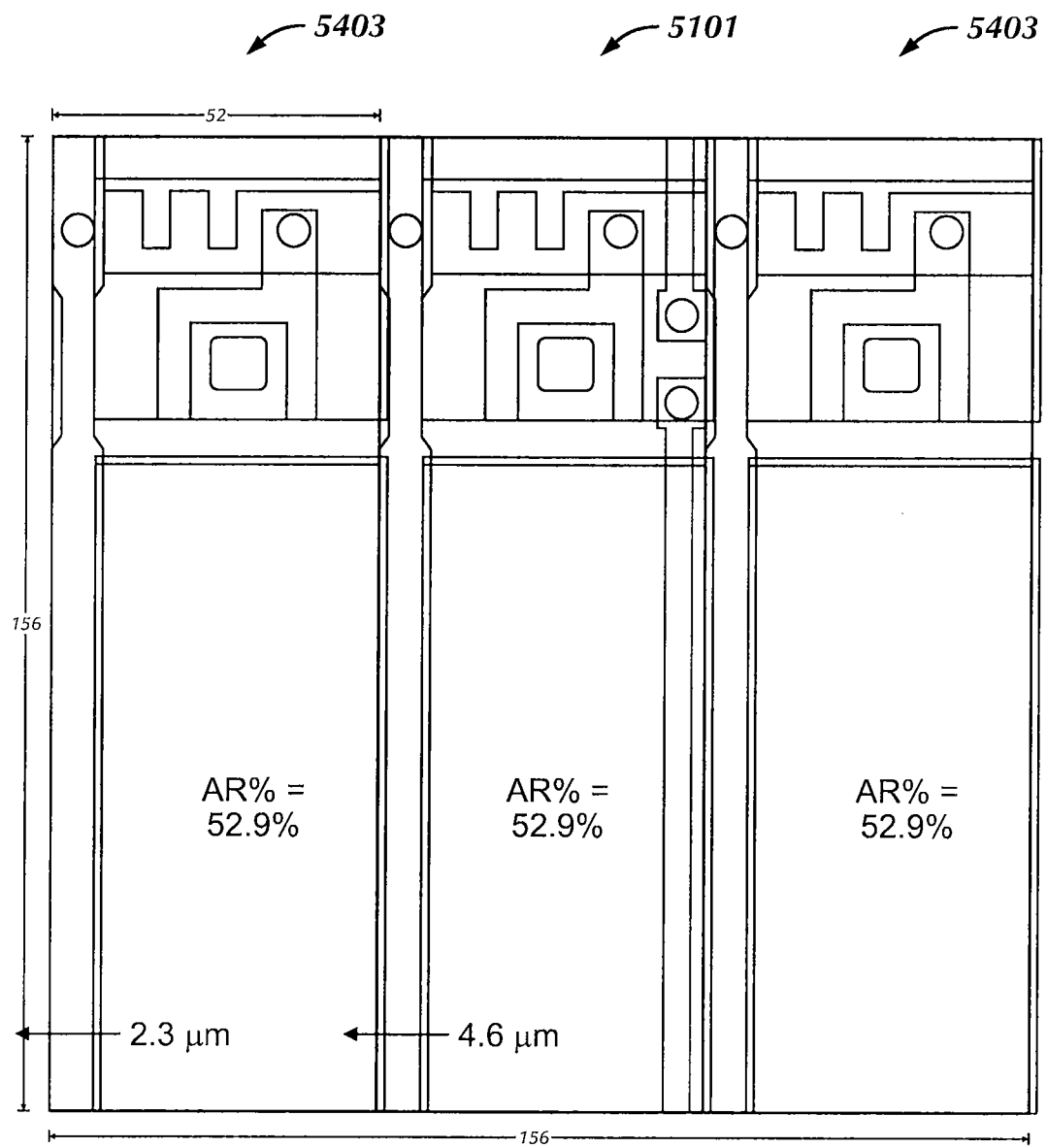
FIG. 55 illustrates an example modification in the example ECB LCD display using LTPS according to embodiments of the invention.

An example process of manufacturing an ECB LCD display using LTPS according to embodiments of the invention will now be described with reference to FIGS. 44-50. FIG. 44 shows a semiconductor layer of poly-Si. FIG. 45 shows a first layer of metal (M1). FIG. 46 shows connections including 4601 and 4602. FIG. 47 shows a second metal layer (M2). Connections 4601 and 4602 connect the M1 and M2 layers to form a yVcom line as shown in the figures. FIGS. 48-50 show a connection layer, a reflector layer, and an ITO layer, respectively. FIG. 51 shows a completed pixel including a yVcom portion that allows connection in the y-direction. FIG. 52 shows a side view of pixel 5101 along the line shown in the top view shown in FIG. 52. FIG. 53 shows a calculation of the storage capacitance of pixel 5101. FIG. 54 shows an aperture ratio estimation of pixel 5101 and a pixel 5403 that does not include a yVcom line. FIG. 55 shows that some metal, such portions of the M1, M2, and/or ITO layers can be shifted to help equalize the aperture ratios of the pixels.

Figure 56:
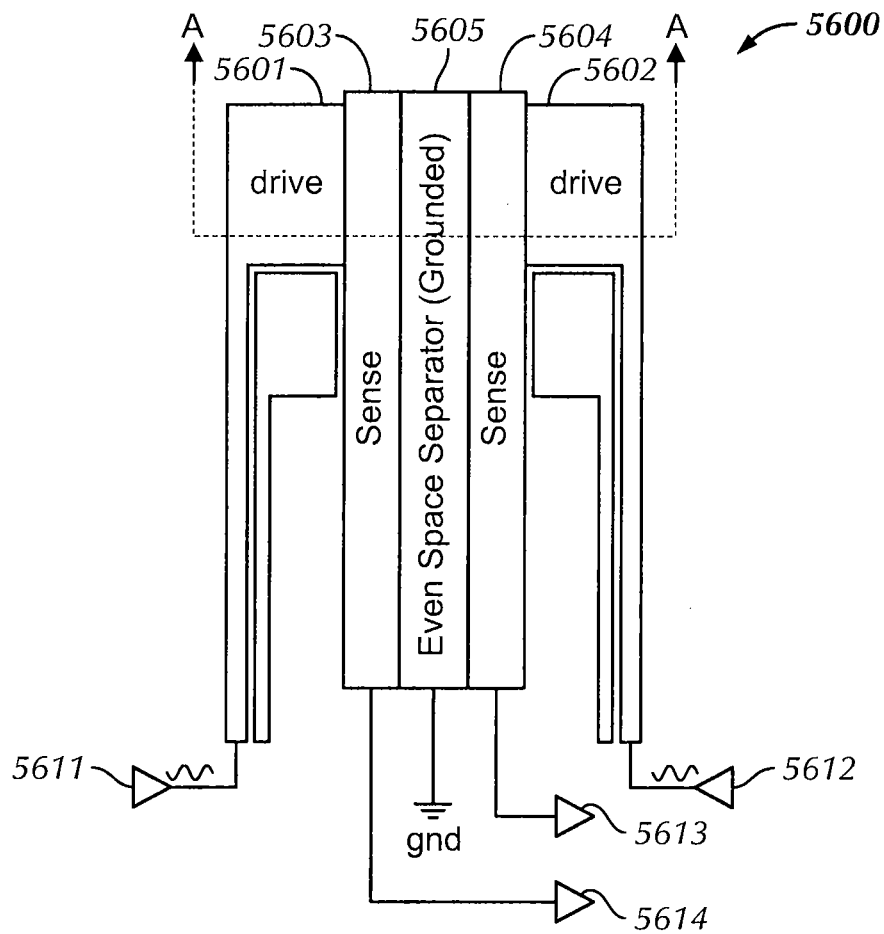
FIG. 56 illustrates a portion of a touch screen that includes an example grounded separator region according to embodiments of the invention.

FIG. 56 illustrates a portion of an example touch screen 5600 that includes a grounded separator region according to embodiments of the invention. Similar to some embodiments described above, touch screen 5600 includes regions for driving (5601 and 5602) and regions for sensing (5603 and 5604). The drive regions are connected to drive lines 5611 and 5612, and the sense regions are connected to sense lines 5613 and 5614. Touch screen also includes a grounded separator region 5605, which is a region of pixels having linked-together storage capacitors, as described above, that is grounded. Grounded separator region 5605 can help to electrically isolate touch pixel areas and may improve the detection of touch by touch screen 5600. Grounded separator regions can be, for example, evenly spaced throughout a touch screen.

Figure 57:
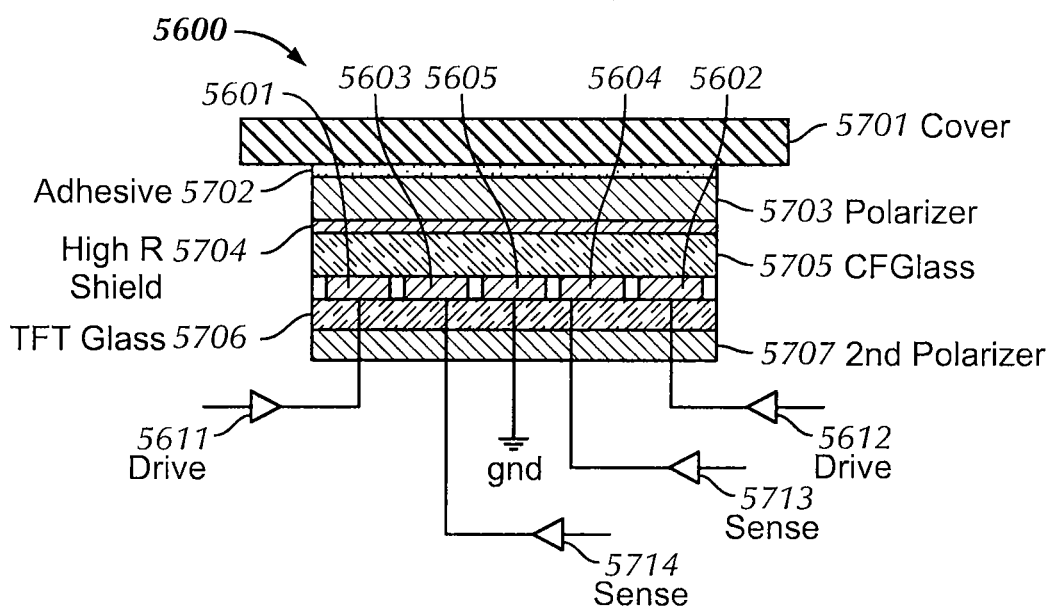
FIG. 57 is a side view of the example touch screen of FIG. 56, which illustrates an example high R shield according to embodiments of the invention.

FIG. 57 is a side view along the line A-A in FIG. 56, showing the portion of touch screen 5600, including a cover 5701, an adhesive 5702, a polarizer 5703, a high resistance (R) shield 5704, a color filter glass 5705, drive regions 5601 and 5602, sense regions 5603 and 5604, grounded separator region 5605, a TFT glass 5706, and a second polarizer 5707. A high resistance shield, such as high R shield 5704, may be used in touch screens using IPS LCD pixels, for example. A high R shield may help block low frequency/DC voltages near the display from disturbing the operation of the display. At the same time, a high R shield can allow high-frequency signals, such as those typically used for capacitive touch sensing, to penetrate the shield. Therefore, a high R shield may help shield the display while still allowing the display to sense touch events. High R shields may be made of, for example, a very high resistance organic material, carbon nanotubes, etc. and may have a resistance in the range of 100 Mega-ohms per square to 10 Giga-ohms per square.

Figure 58:
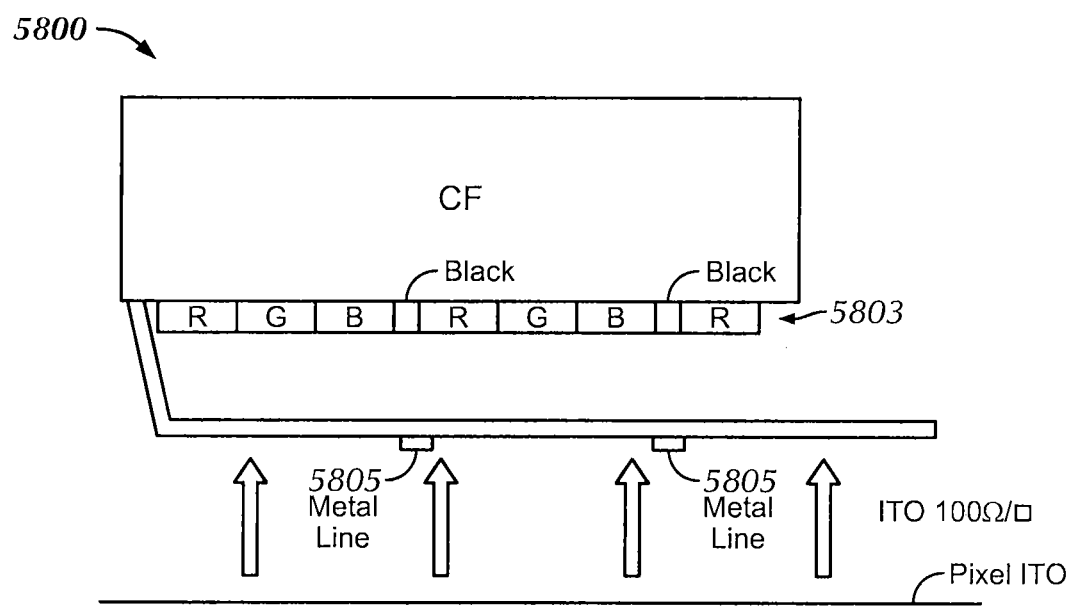
FIG. 58 illustrates a side view of a portion of an example touch screen including black mask lines of a black mask and metal lines under the black mask lines according to embodiments of the invention.
Figure 59:
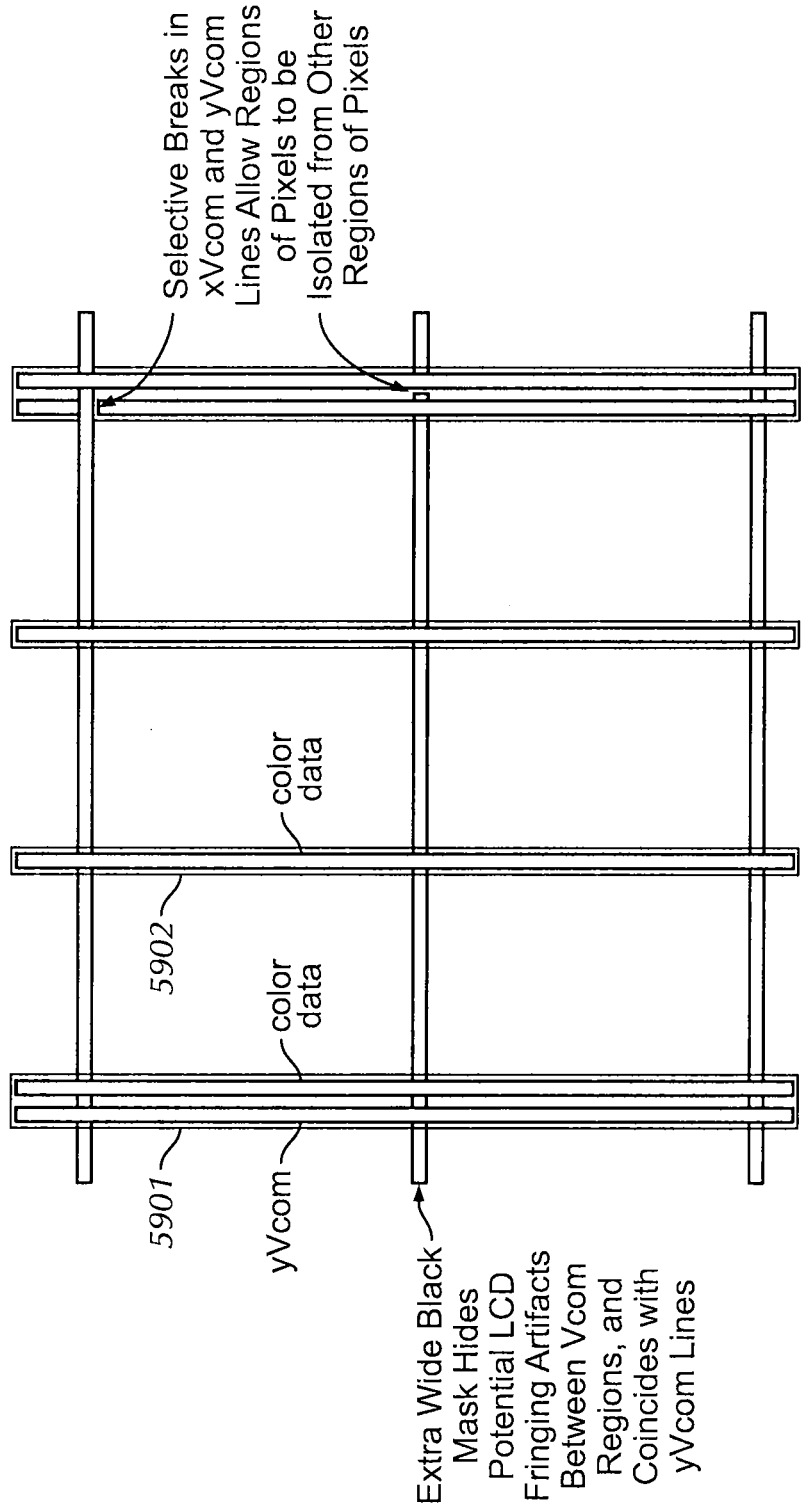
FIG. 59 illustrates an example black mask layout according to embodiments of the invention.

FIG. 58 shows a side view of a portion of an example touch screen 5800 according to embodiments of the invention. Touch screen 5800 includes a color filter glass 5801, a pixel layer 5803 (including red (R), green (G), and blue (B) pixels, and black mask lines of a black mask, such as shown in FIG. 59). Touch screen 5800 also includes metal lines 5805 under the black mask lines. Metal lines 5805 can provide low-resistance paths, for example, between a region of pixels and bus lines in the border of a touch screen. For example, in conventional LCD non-IPS displays, the common electrode, which is typically on the CF glass, is one sheet of ITO. Therefore, the resistance of this common electrode is very low. For example, a conventional LCD may have a common electrode of ITO that has a resistance of approximately 100 ohms per square. However, in some embodiments above the common electrode is "broken up" into regions that are connected to a shared common line through relatively thin pathways. The connection between a region of pixels and a shared common electrode line can have a relatively high resistance, particularly if the region is further away from the boarder of the touch screen, in which the shared common line may reside. Metal lines 5805 may help lower the resistance of the path to such a region. Placing metal lines 5805 under the black mask can reduce the metal lines' impact on pixel aperture ratio, for example.

FIG. 59 shows an example black mask layout according to embodiments of the invention. Black mask 5901 shields a yVcom line and a color data line. Mask 5901 can help to reduce potential LCD artifacts between different regions. Mask 5902 shields a color data line. Mask 5901, which covers two lines, is wider than mask 5902.

As discussed in the above embodiments, at least some pixels include xVcom and/or yVcom lines. These lines are generally used to connect the capacitors of various display pixels to form larger touch regions used for touch sensing (see, e.g., regions 207 and 205 of FIG. 2A and 257 and 255 of FIG. 2B).

In the embodiments discussed above, the xVcom and yVcom lines are placed in the same layers as the gate and data lines. More specifically, xVcom lines are placed at the same layer as gate lines (see, e.g., FIG. 11, elements 1121a and 1121b), and yVcom lines span two layers the layer of the gate lines and the layer of the data lines (see, e.g., FIG. 11, element 1123a and FIG. 12, elements 1423a and 1423b).

The xVcom and yVcom lines can be made out of a non-transparent conductor (such as non-transparent metal) in order to provide for lower resistance. However, in the above discussed embodiments, the xVcom and yVcom lines can reduce the aperture of the display. While the above discussed embodiments attempt to minimize aperture reductions, some reductions as compared to a standard non-touch enabled display may still be necessary to accommodate the xVcom and yVcom lines.

Alternative embodiments discussed herein provide that xVcom and yVcom lines can be accommodated without any reductions of the aperture or, alternatively, with minimal reductions. This can be achieved by placing the xVcom and yVcom lines on a different layer than the gate and data lines, and ensuring that the xVcom and yVcom lines overlap respective gate and data lines. Thus, the xVcom and yVcom lines can be positioned above or below respective gate and data lines and will not cause any reductions in aperture that have not already been caused by the gate and data lines. Thus, the addition of the touch functionality, or, in other words, the addition of the xVcom and yVcom lines, need not cause any reductions in aperture.

Thus, in general, embodiments of the invention can feature common lines used for touch sensing that are positioned at a different layer than various opaque display elements that are used for the display functionality, and arranged so that the display elements substantially overlap the common lines. The common lines can be attached to respective storage electrodes that are parts of storage capacitors used for various display pixels. Thus, the storage electrodes attached to the common lines can serve a dual function—they can be used both for the display and the touch sensing functionalities.

Figure 60:
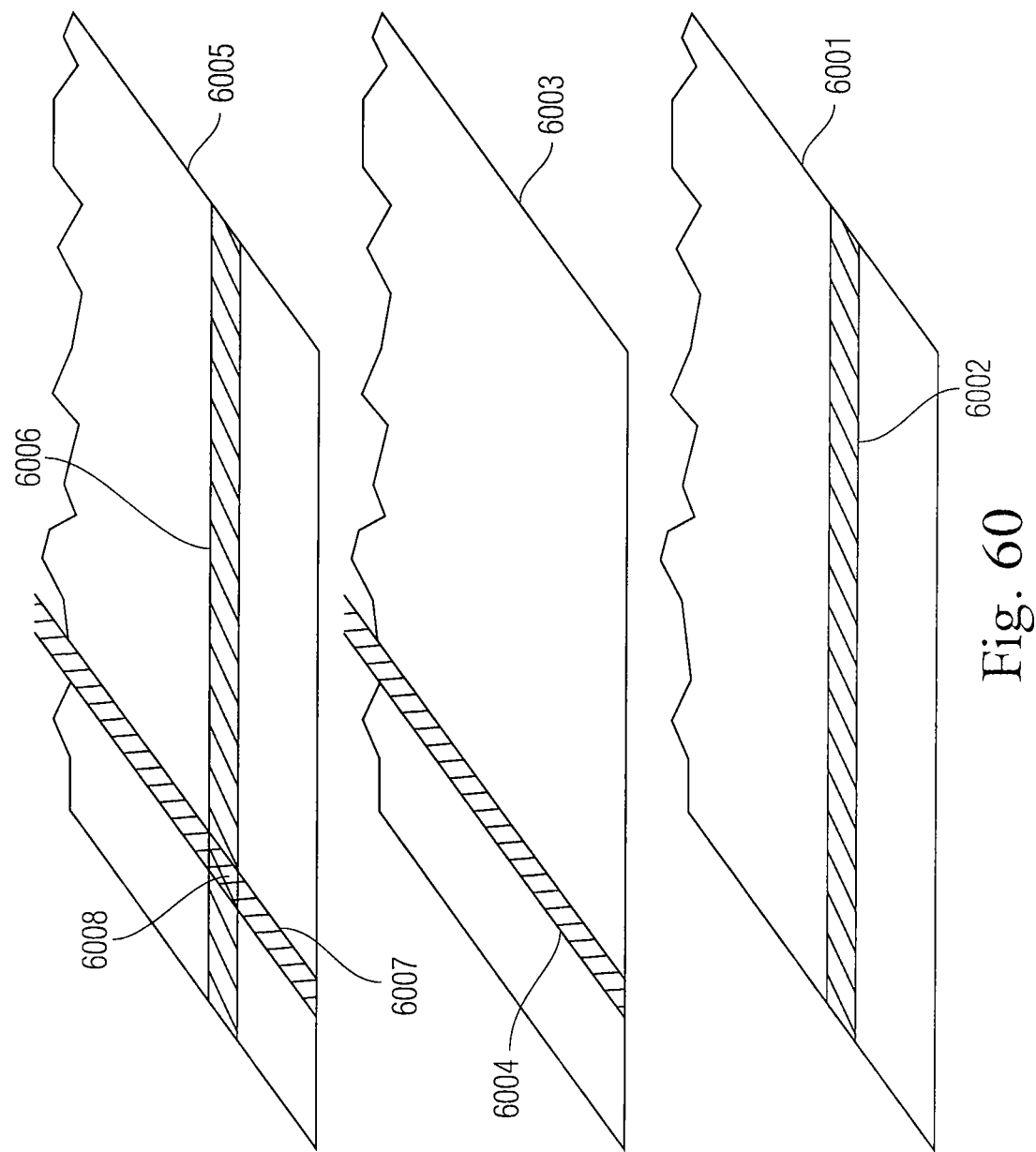
FIG. 60 illustrates an exemplary layout of conductive lines in a touch sensing display according to embodiments of the invention.

An example of one such embodiment is shown in FIG. 60. FIG. 60 shows three exemplary layers of a display. First layer 6001 includes gate line 6002. The second layer 6003 includes data line 6004. The first and second layers can be, for example the M1 and M2 layers. A third layer 6005 includes an xVcom line 6006 that is positioned to overlap gate line 6002 and a yVcom line 6007 that is positioned to overlap the data line 6004. The xVcom and yVcom lines can be placed at the same layer and connect in region 6008. Layers 6001, 6003 and 6005 need not be adjacent, but may be separated from each other by dielectric or other layers. Thus, the xVcom and yVcom lines need not connect to the gate and data lines they overlap.

The xVcom and yVcom lines need not be above the gate and data lines. They can alternatively be underneath the gate and data lines or positioned at a layer between the gate and data lines. The xVcom and yVcom lines can be connected to pixel storage capacitors (or electrodes thereof). This can be achieved through vias, by positioning these lines at the same layer and adjacent to an electrode of the storage capacitor or by placing the xVcom and yVcom lines directly above or below an electrode of the storage capacitor. Furthermore, the xVcom and yVcom lines can be positioned on different layers and may connect to each other through vias.

Thus, by providing xVcom and yVcom lines that overlap respective gate and data lines, embodiments of the invention can ensure that the addition of the xVcom and yVcom lines (or common lines) does not reduce the aperture of the display.

Some embodiments of the present invention may not require exact overlap between respective xVcom and yVcom lines and gate or data lines. For example, a xVcom or yVcom line can be narrower than, wider than, or slightly displaced from a respective gate or data line. Furthermore, a common line need not only overlap a gate or data line, but may overlap any other nontransparent element required for the display functionality (such as, e.g., a pixel transistor) in order to ensure its addition does not cause a substantial reduction in aperture. For some embodiments, it is sufficient that the common line substantially overlaps another non-transparent element(s) in the display to ensure that the addition of the common line does not cause significant decrease of aperture. For example, the overlap can be such that only 70% of the common line is directly above or below a respective other non-transparent line or element.

It should be noted that in this disclosure, the term overlap refers to the ability of an opaque element (such as a gate line, data line, or another element) to "cover" the common lines. Thus, a substantial overlap may indicate that certain significant percentage of the common lines is covered (such as, e.g., 70%) by other opaque elements, and a complete overlap (which includes a substantial overlap) takes place when the entire common lines are covered. For the term overlap, as defined herein, it need not be significant whether the common lines are positioned over the other opaque element(s) or under them. Furthermore, only the ability of other elements to cover the common lines may be considered significant. If the common lines fail to cover large portions of other elements, this need not be considered relevant for determining overlap.

Figure 61A:
FIGS. 61A and B illustrate two exemplary FFS TFT LCD configurations.
Figure 61B:
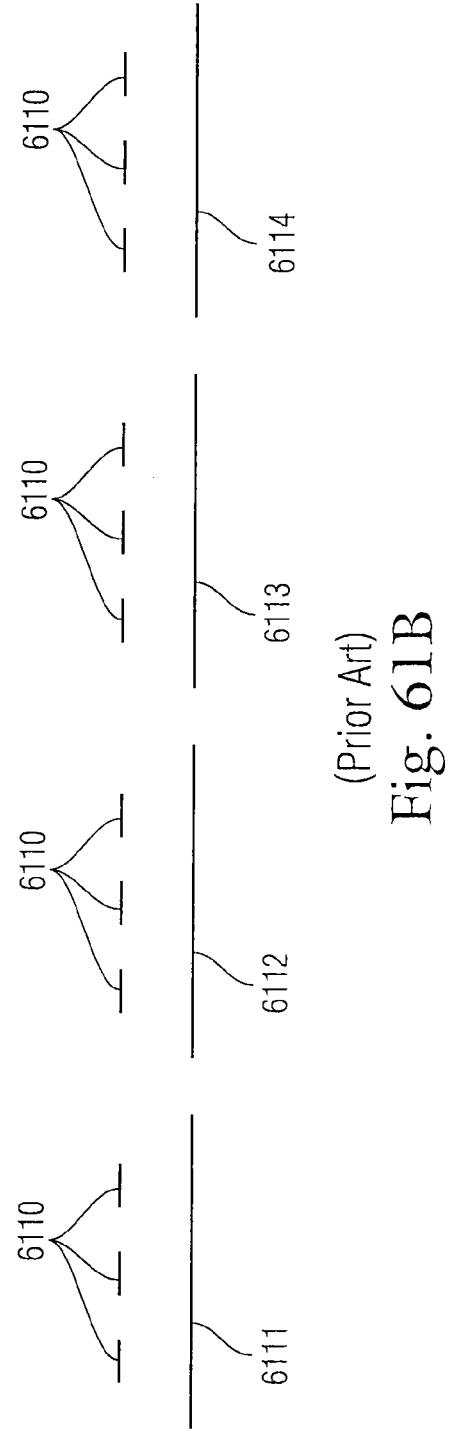

As noted above, some embodiments of the invention relate to FFS TFT displays. As known in the art, FFS TFT displays can be provided in two possible configurations as relating to the relative placement of their common and pixel electrodes. These are referred to as the "common on top" configuration in which the common electrode is placed on top of the pixel electrode and the"pixel on top" configuration in which the pixel electrode is placed on top of the common electrode. FIGS. 61A and 61B show these configurations in more detail. FIG. 61A shows a pixel electrode on top configuration and FIG. 61B shows a common electrode on top configuration. It should be noted that to improve clarity, FIGS. 61A and 61B do not show other known elements of the display such as gate and data lines, transistors, etc.

In FIG. 61A, the common electrode is electrode 6100. Multiple pixel electrodes 6101-6104 can be positioned above it. Each pixel electrode can include two or more "fingers" or extensions. Thus, for example, fingers 6105, 6106 and 6107 can be part of pixel electrode 6102. The fingers of a single pixel electrode can be interconnected to form a single electrode (this connection is not shown in the cross section of FIG. 61A). When a pixel electrode is at a different voltage than the common electrode 6100, electrical fields appear between the pixel electrode and the common electrode. Some of these extend above the pixel electrode (see, e.g., fields 6108 of electrode 6101) and can control liquid crystals above the pixel electrode in order to change the visible state of a pixel associated with the pixel electrode. The voltage of each pixel electrode can be individually changed to control the color (or brightness) of a particular pixel, while the single common electrode 6100 can be maintained at a single voltage for all pixels (although some displays can use a plurality of different common electrodes for different rows).

FIG. 61B shows a common electrode on top configuration. In this case, pixel electrodes 6111, 6112, 6113 and 6114 can be positioned along the bottom of the display. As shown, the pixel electrodes need not be separated into fingers. The common electrode 6110 can be positioned over the pixel electrodes and form sets of fingers over each pixel electrode. All the fingers of the common electrode can be connected, thus forming a single common electrode 6110. The three fingers 6110 above pixel electrode 6111 can be connected to fingers 6110 above pixel electrodes 6112, 6113 and 6114. Again this connection is not shown in the cross section of FIG. 61B. However, as noted above, some embodiments may feature different common electrodes on different lines. Thus, the common electrode on the top embodiment is not a single solid plate but can be cut into stripes in order to allow for the forming of fingers.

In FFS TFT embodiments, the common lines (i.e., xVcom and yVcom, or generally VCOM) can be made adjacent to the common electrode in order to ensure that they are conductively connected. FIGS. 62A-D show some exemplary connections.

Figure 62B:
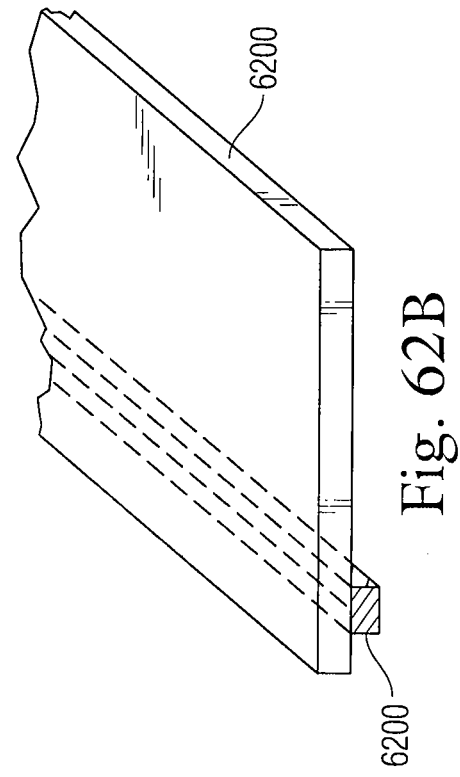
FIGS. 62A-D illustrate several exemplary ways to connect common lines to a common electrode according to embodiments of the invention.
Figure 62D:
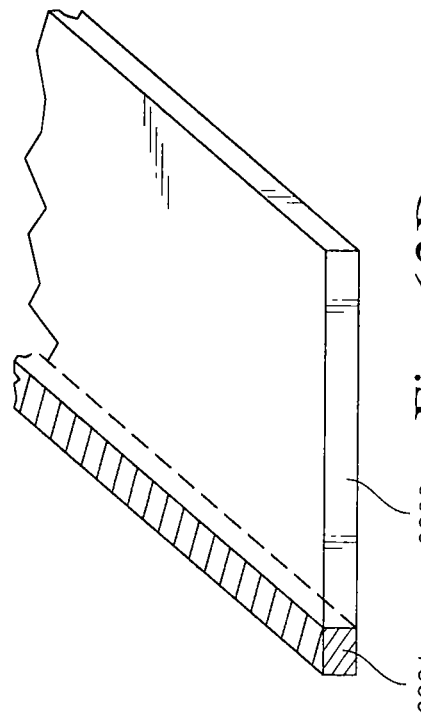
Figure 62A:
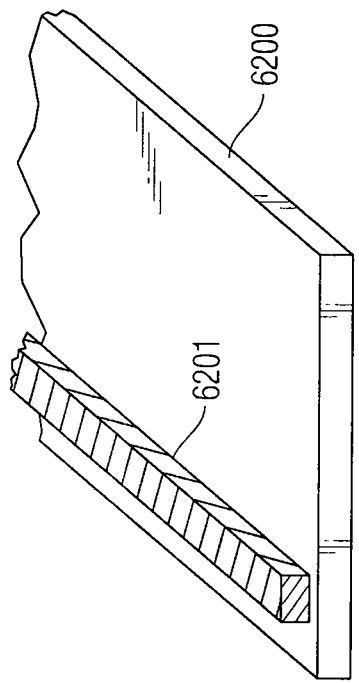
Figure 62C:
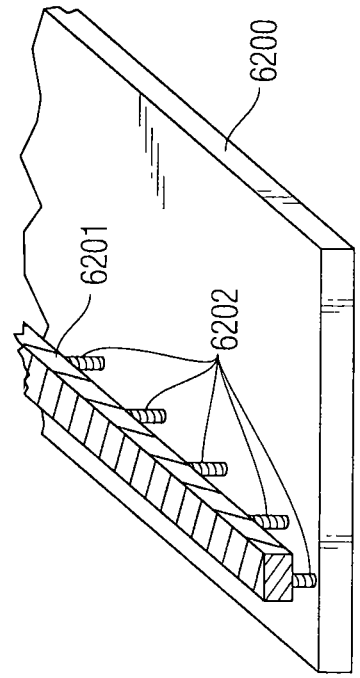

In FIG. 62A the common line 6201 is immediately above the common electrode 6200. In FIG. 62B, the common line 6201 is immediately below the common electrode 6200. In FIG. 62C, the common line 6201 is above the common electrode 6200, but not immediately above it. Instead, there may be some space between the common electrode and the common bus line. This space may be occupied by another layer, such as a dielectric. Connections 6202 can be used to connect the common electrode to the common line instead. In FIG. 62D, the common line is placed at the same layer as the common electrode.

It should be noted that the configurations shown in FIGS. 62A-62D are not the only configurations for embodiments of this invention. For example, the common line can be placed below the common electrode but not immediately below it and may utilize connections to connect to the common electrode. Also, FIGS. 62A-D show a solid common electrode, which would indicate a common electrode on the bottom configuration. Those of skill in the art would recognize the connections of FIGS. 62A-D can be easily applied to a common electrode on top configuration. The connections of FIGS. 62A-D can also be used to connect common lines to storage electrodes in non-FFS embodiments. In the interest of clarity, FIGS. 62A-62D do not show all components of the display.

Figure 63:
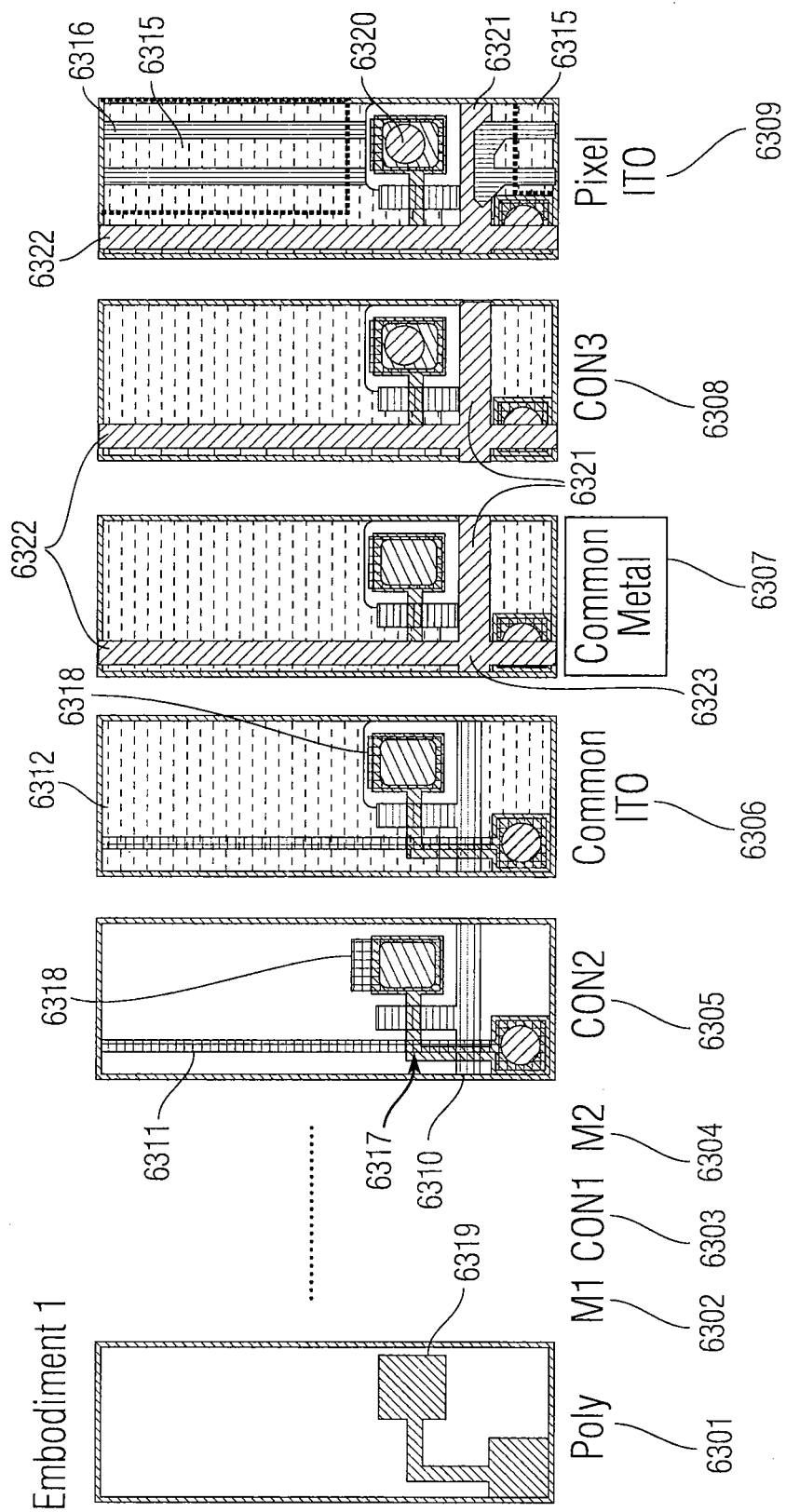
FIG. 63 illustrates an exemplary common electrode on bottom FFS TFT LCD according to embodiments of the invention.

FIG. 63 is a diagram showing FFS TFT LCD embodiments of the present invention in various stages of manufacturing. Diagrams 6301-6309 represent different stages of the manufacturing of a substrate assembly that result from placing different elements on a substrate (which may be, e.g., a glass substrate). More specifically, stages 6301-6309 are progressive stages of manufacturing of a display pixel on a substrate in which various features are sequentially placed on the substrate and thus added to the substrate assembly. Thus, every stage can include all the elements of its predecessor stage.

Elements formed when manufacturing the substrate assembly are considered to be formed on the substrate and part of the substrate assembly even if they are not formed directly on the substrate but are formed on top of other elements that are formed on the substrate. There are, however, other layers that are part of the display but are not formed on the substrate or on another element that is formed on the substrate. These are instead separately produced and later combined with the substrate. These layers can include filters, polarizers, liquid crystals, other substrates, etc. They may not considered to be part of the substrate assembly.

At stage 6301, poly-silicon 6319 is placed on the substrate. Stages 6302-6304 are not shown, but they are conventional. In stage 6302 a first metal layer is placed. This can form, for example, gate line 6310. In stage 6303, a first dielectric/connection layer is placed. In stage 6304, a second metal layer is placed. The second metal layer can form, for example, data line 6311. In stage 6305, a second dielectric/connection layer is placed. At this point a transistor 6317 is formed. The transistor has a source connected to the data line 6311, a gate connected to the gate line 6310 and a drain 6318 that will be connected to the pixel electrode (see below).

In stage 6306, a common ITO layer is placed. The common ITO layer can form common electrode 6312. In FIG. 63, the common electrode 6312 is placed (e.g., deposited or otherwise fabricated) in the common electrode at the bottom configuration.

In stage 6307 another metal feature can be placed. This is referred to the common metal stage and can involve placing the common (VCOM) lines 6321 and 6322. More specifically, 6321 can be the xVcom line and 6322 can be the yVcom line. The xVcom line 6321 can be placed directly above the gate line 6310 and the yVcom line 6322 can be placed directly above the data line 6311 in order to ensure that placement of the common lines does not decrease the aperture of the cell. As noted above, in some embodiments, the common lines need not line up with the gate and data lines exactly. For example, the common lines may be slightly thicker or slightly displaced from the respective gate or data line and thus may cause a slight decrease in aperture.

The common lines can be placed at the same layer and can thus be conductively connected at their junctures (such as juncture 6323). Furthermore, the common lines 6321 and 6322 can be placed on the same layer as the common electrode 6312 and can share sides with it (see, e.g., FIG. 62D). It should be noted that the common lines can be insulated from the gate and data lines 6310 and 6311 by, for example, the dielectric applied at stage 6305. At stage 6309, the pixel electrode 6315 is placed. Since this embodiment is of the pixel electrode on top type, the pixel electrode is placed above the common electrode and has a comb like shape (see, e.g., FIG. 61A). As with the common electrode, the pixel electrode can be formed from ITO. The pixel electrode 6315 can be connected to the drain 6318 of transistor 6317 by way of connection 6320.

It can be seen that the aperture ratio 6316 is not significantly decreased from what it would have been had the common lines 6321 and 6322 been absent. In other words, the placement of common lines does not overlap any areas that could have otherwise been used for the display functionality. To the contrary, the common lines overlap areas that are already opaque due to other needed elements (e.g., gate line 6310 and data line 6311).

Figure 64:
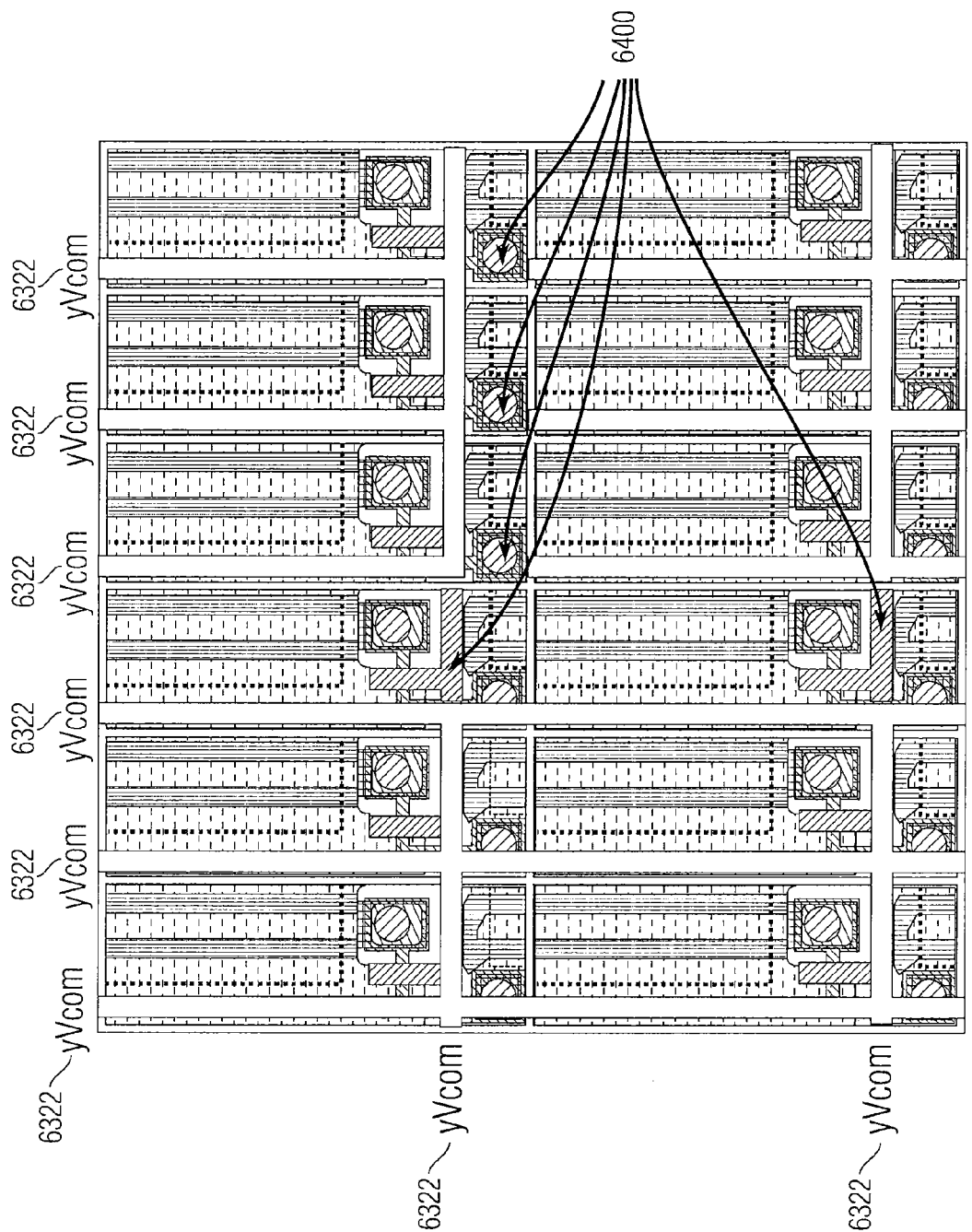
FIG. 64 illustrates another view of an exemplary common electrode on bottom FFS TFT LCD according to embodiments of the invention.

FIG. 64 shows a larger portion of the LCD of FIG. 63. There, multiple pixels can be seen. The multiple pixels can be connected through multiple xVcom lines 6321 and yVcom lines 6322. FIG. 64 also shows breaks 6400 of the xVcom and yVcom lines. These breaks can be used to separate/define different touch regions (see, e.g., FIGS. 2A and 2B and related discussion above). The breaks in the xVcom and yVcom lines can be accompanied by corresponding breaks in the underlying common electrode in order to ensure that the different touch regions are not electrically connected through the common electrode. Thus each common electrode can form its own touch region.

Figure 65:
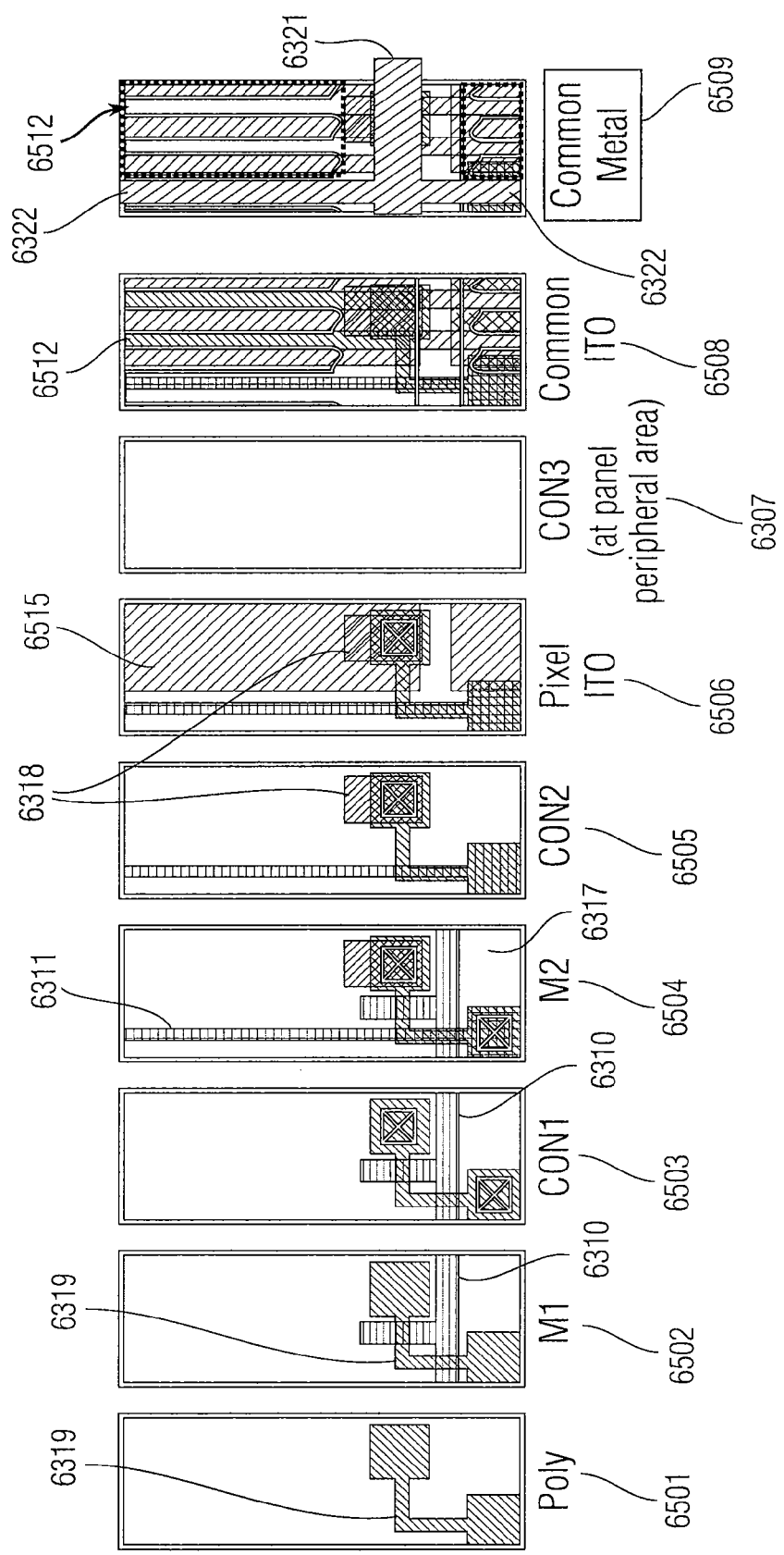
FIG. 65 illustrates an exemplary common electrode on top FFS TFT LCD according to embodiments of the invention.

FIG. 65 is a diagram of various manufacturing stages of an exemplary display according to one embodiment of the invention. In contrast to FIG. 63, FIG. 65 shows a common electrode on top configuration. Stages 6501-6505 are similar to stages 6301-6305, respectively. As with the embodiment of FIG. 63, a transistor 6317 is formed at stage 6504. The transistor can be the same as transistor 6317 of FIG. 63. At stage 6506, the pixel electrode 6515 is initially deposited. The pixel electrode is connected to the drain 6318 of transistor 6317. Stage 6507 is a connection and dielectric layer. At stage 6508, the common electrode 6512 is placed. In this embodiment, the common electrode is above the pixel electrode. Thus, the common electrode can be comb-like, as shown (see also FIG. 61B).

At stage 6509, the common lines 6321 and 6322 are placed. The common lines may be placed at the same layer as the common electrode 6512 and may share a side with it to provide an electrical connection (see, e.g., FIG. 62D). Similarly to the embodiment of FIG. 63 the yVcom line 6322 overlaps data line 6311. However, in this example, the xVcom line 6321 does not overlap gate line 6310. This is not required—the xVcom line 6321 can overlap the gate line 6310 in other common electrode on top embodiments. However, in this embodiment, the xVcom line 6321 is positioned a little forward in relation to the gate line 6310. Nevertheless, the xVcom line does not substantially (or at all) reduce the aperture of the device, because it is placed directly above other opaque features of the device, such as the drain 6318 of transistor 6317 and the poly-silicon 6319. Again, the xVcom and yVcom lines can be positioned on the same layer and can be conductively connected at their intersections.

Other embodiments may feature configurations different from those shown in FIGS. 63 and 65. For example, the common lines 6321 and 6322 can be positioned below the gate and data lines.

Figure 66:
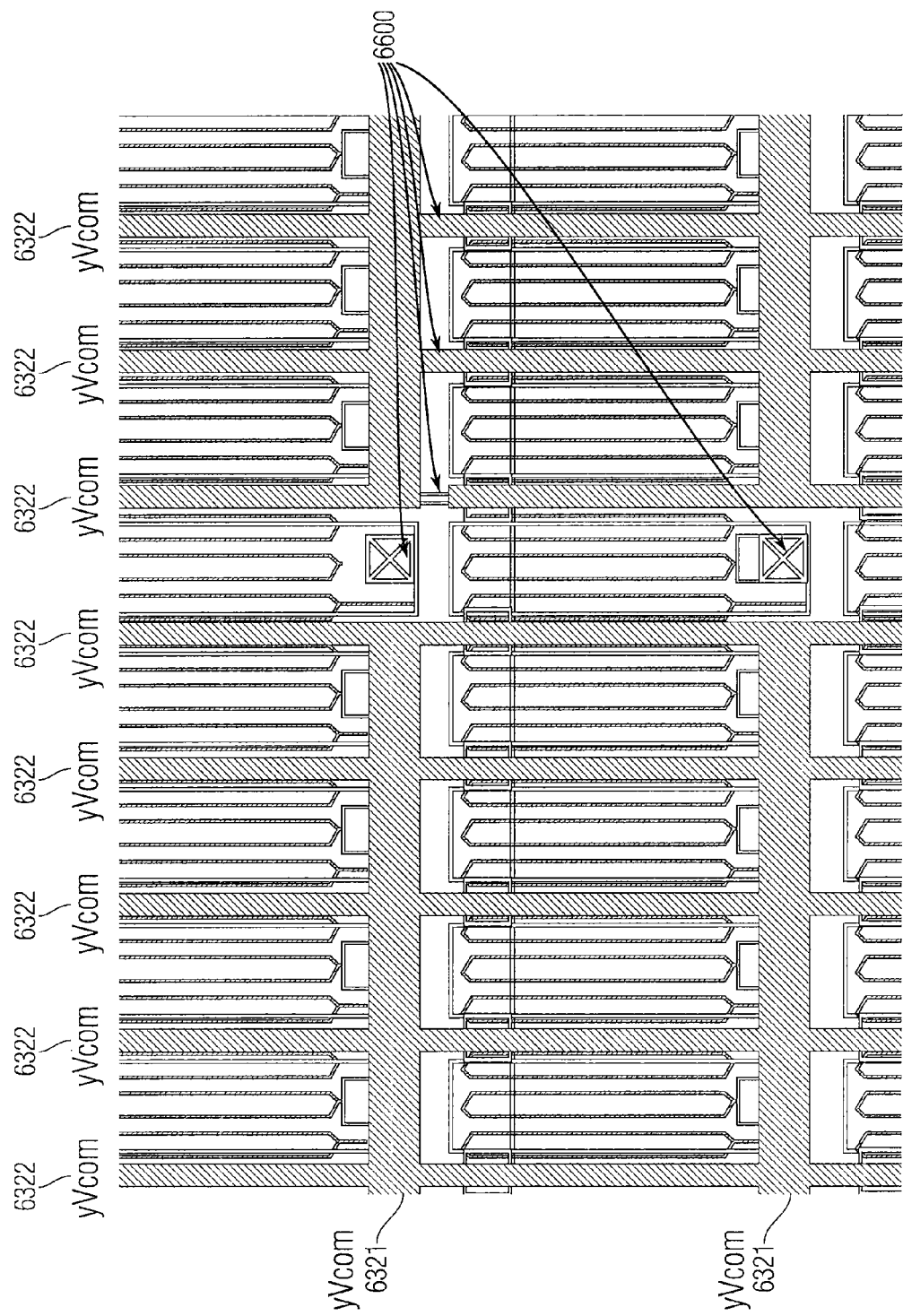
FIG. 66 illustrates another view of an exemplary common electrode on top FFS TFT LCD according to embodiments of the invention.

FIG. 66 shows a larger portion of the LCD of FIG. 65. Similarly to FIG. 64, FIG. 66 shows various breaks in the xVcom and yVcom lines 6321 and 6322 which are used to form different touch regions (see, e.g., FIGS. 2A and 2B and accompanying discussion). Again the breaks of the xVcom and yVcom lines can be accompanied by corresponding breaks in the common electrode to ensure insulation between neighboring touch regions.

The embodiments of FIGS. 61-66 refer to FFS TFT LCDs. However, the teachings discussed therein can be used for other types of LCDs. Thus, other types of LCDs can feature xVcom and yVcom lines that overlap existing opaque elements of the display that are already used to perform display functionality (such as, e.g., gate and data lines) in order to ensure that the xVcom and yVcom lines do not cause any reductions to the aperture ratio. Non-FFS embodiments need not include a common electrode. However, they can include pixel storage capacitors. Thus, in these embodiments the xVcom and/or yVcom lines can be attached to an electrode of the pixel storage capacitor of each pixel. In some embodiments, the xVcom and yVcom lines can be positioned at the same TFT substrate assembly as the transistors and gate and data lines of each electrode. In other embodiments, the xVcom and yVcom lines can be positioned in a color filter layer above the TFT layer, as discussed above (see, e.g., FIG. 2B). In the latter embodiments, the xVcom and yVcom lines can nevertheless be lined up to overlap respective gate and data lines of the TFT layer.

Figure 67:
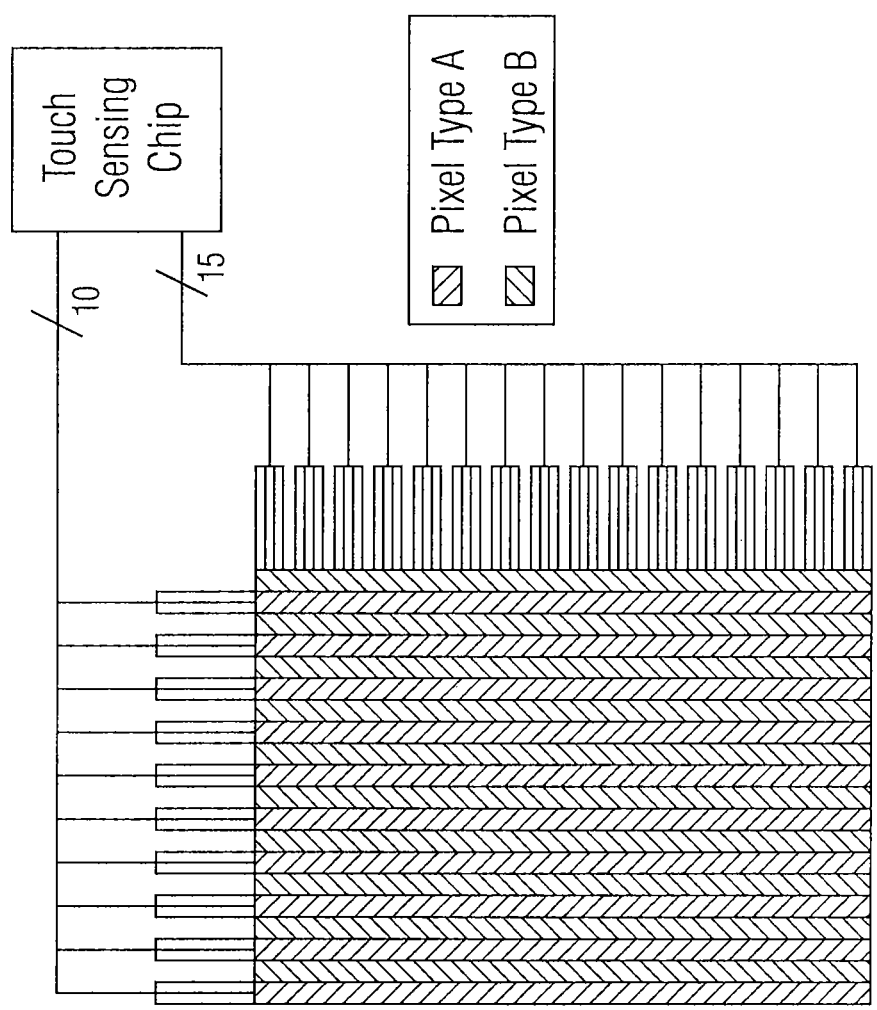
FIG. 67 illustrates an example IPS-based touch-sensing display in which the pixel regions serve multiple functions.

FIG. 67 shows an example IPS-based touch-sensing display in which the pixel regions serve multiple functions. For example, a pixel region can operate as a drive region at one time and operate as a sensing region at another time. FIG. 67 shows two types of pixel regions, pixel region type A and pixel region type B. During a first time period the A type pixel regions, i.e., touch columns, can be driven with a stimulus waveform while the capacitance at each of the B type pixel regions, i.e., touch rows, can be sensed. During a next time period, the B type pixel regions, i.e., touch rows, can be driven with a stimulus waveform while the capacitance at each of the A type pixel regions, i.e., touch columns, can be sensed. This process can then repeat. The two touch-sense periods can be about 2 ms. The stimulus waveform can take a variety of forms. In some embodiments it may be a sine wave of about 5V peak-to-peak with zero DC offset. Other time periods and waveforms may also be used.

Figure 68:
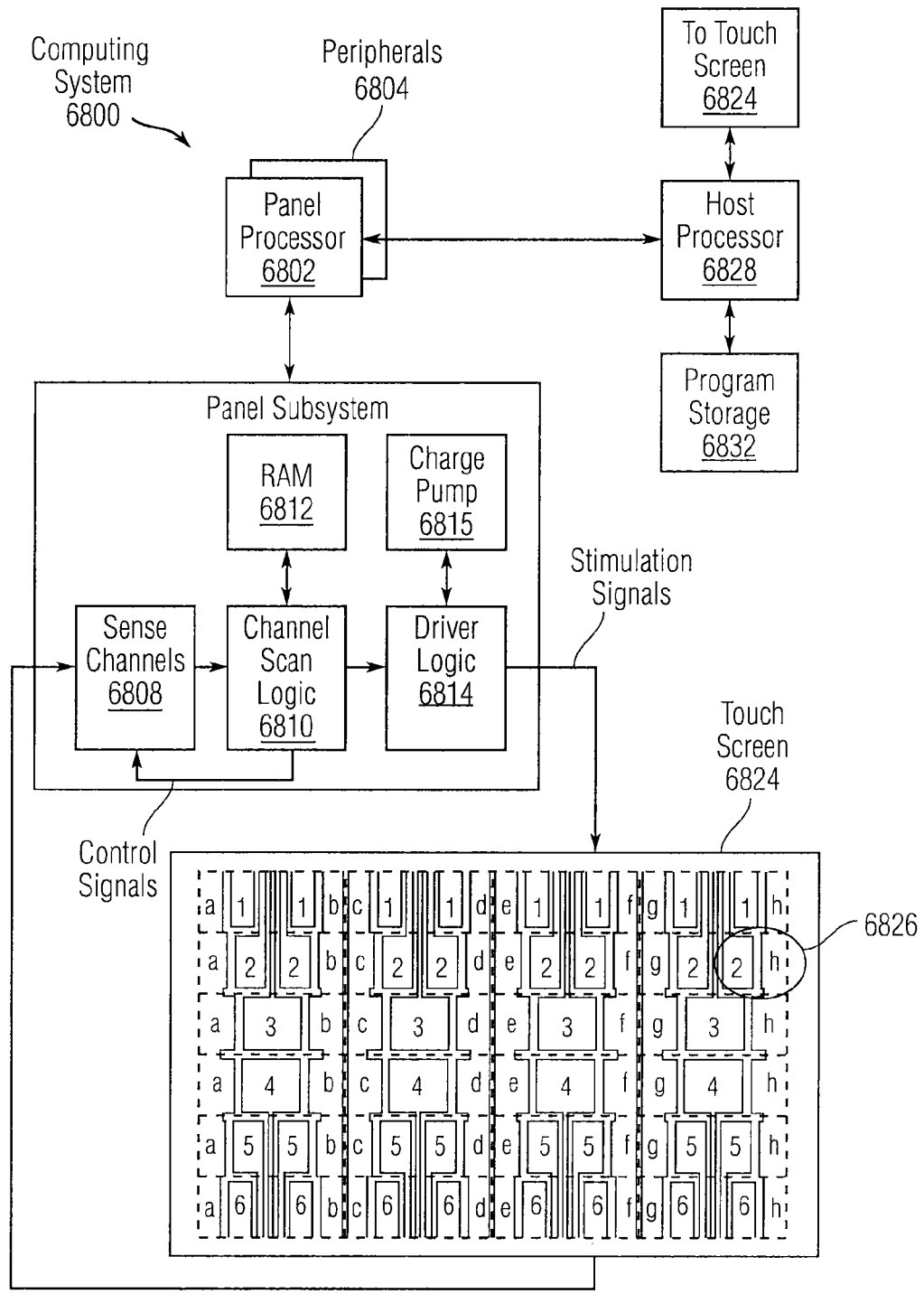
FIG. 68 illustrates an example computing system that can include one or more of the example embodiments of the invention.

FIG. 68 illustrates an example computing system 6800 that can include one or more of the embodiments of the invention described above. Computing system 6800 can include one or more panel processors 6802 and peripherals 6804, and panel subsystem 6806. Peripherals 6804 can include, but are not limited to, random access memory (RAM) or other types of memory or storage, watchdog timers and the like. Panel subsystem 6806 can include, but is not limited to, one or more sense channels 6808, channel scan logic 6810 and driver logic 6814. Channel scan logic 6810 can access RAM 6812, autonomously read data from the sense channels and provide control for the sense channels. In addition, channel scan logic 6810 can control driver logic 6814 to generate stimulation signals 6816 at various frequencies and phases that can be selectively applied to drive lines of touch screen 6824. In some embodiments, panel subsystem 6806, panel processor 6802 and peripherals 6804 can be integrated into a single application specific integrated circuit (ASIC).

Touch screen 6824 can be a combination of a display and touch screen as discussed above. Touch screen 6824 can include a capacitive sensing medium having a plurality of drive regions and a plurality of sense regions according to embodiments of the invention. Each intersection of drive and sense regions can represent a capacitive sensing node and can be viewed as touch picture element (touch pixel) 6826, which can be particularly useful when touch screen 6824 is viewed as capturing an "image" of touch. (In other words, after panel subsystem 6806 has determined whether a touch event has been detected at each touch sensor in the touch screen, the pattern of touch sensors in the multi-touch panel at which a touch event occurred can be viewed as an "image" of touch (e.g. a pattern of fingers touching the panel).) Each sense region of touch screen 6824 can drive sense channel 6808 (also referred to herein as an event detection and demodulation circuit) in panel subsystem 6806.

Computing system 6800 can also include host processor 6828 for receiving outputs from panel processor 6802 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 6828 can also perform additional functions that may not be related to panel processing, and can be connected to program storage 6832. The processor can also be connected to the touch screen/display combination 6824 in order to control the display functionality. This connection can be distinct and in addition to the connection between the host processor 6828 and the touch screen display combination 6824 through the panel processor 6802, said latter connection being used to control the touch functionality of the touch screen display combination 6824.

Note that one or more of the functions described above can be performed by firmware stored in memory (e.g. one of the peripherals 6804 in FIG. 68) and executed by panel processor 6802, or stored in program storage 6832 and executed by host processor 6828. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 69A:
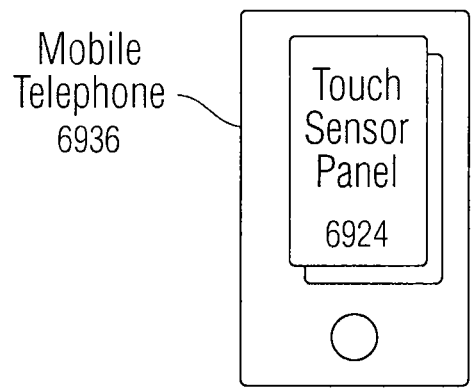
FIG. 69A illustrates an example mobile telephone that can include a touch screen including pixels with dual-function capacitive elements according to embodiments of the invention.

FIG. 69A illustrates an example mobile telephone 6936 that can include a touch screen 6924, the touch screen including pixels with dual-function capacitive elements according to embodiments of the invention.

Figure 69B:
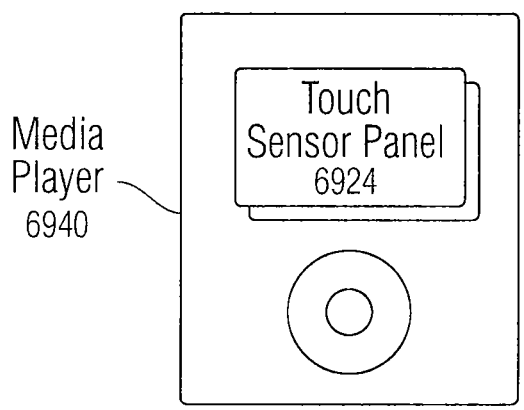
FIG. 69B illustrates an example digital media player that can include a touch screen including pixels with dual-function capacitive elements according to embodiments of the invention.

FIG. 69B illustrates an example digital media player 6940 that can include touch screen 6924, the touch screen including pixels with dual-function capacitive elements according to embodiments of the invention.

Figure 69C:
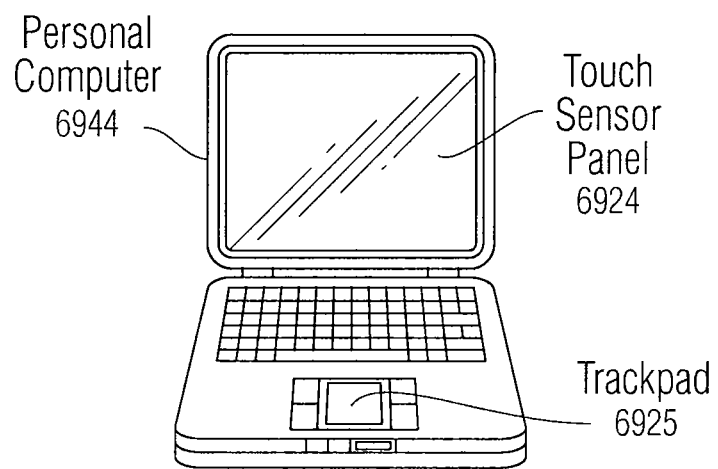
FIG. 69C illustrates an example personal computer that can include a touch screen including pixels with dual-function capacitive elements according to embodiments of the invention.

FIG. 69C illustrates an example personal computer 6944 that can include a trackpad 6925 that is a touch screen, including pixels with dual-function capacitive elements. Alternatively or in addition, the personal computer 6944 can include a touch screen 6924 that is used as the main display of the personal computer. The touch screen 6924 can also include pixels with dual function capacitive elements according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch screen having a touch sensor panel and a display device, the touch screen configured to perform both a display and a touch sensing functionality comprising:
   a plurality of pixels, each pixel including a storage capacitor comprising a first electrode and a second electrode;
   one or more opaque display elements used to perform the display functionality of the touch screen; and
   a plurality of common lines made from a non-transparent conductor, connected to the first electrode of one or more of the plurality of pixels and positioned at a different layer in the touch screen than the opaque display elements such that the opaque display elements and the common lines substantially overlap one another ;
   wherein the opaque display elements contribute to an aperture ratio of the display device and the plurality of common lines substantially maintain the aperture ratio of the display device; and
   wherein the first electrodes connected to the common lines are used for both the display and touch sensing functionalities of the touch screen.

2. The touch screen of claim 1, wherein the common lines are connected to touch circuitry and are used to carry touch sensing signals.

3. The touch screen of claim 1, wherein the common lines include a first plurality of parallel common lines and a second plurality of parallel common lines, the first and second pluralities being positioned perpendicular to one another at the same layer to form a lattice structure.

4. The touch screen of claim 3, wherein the opaque display elements include a plurality of parallel gate lines and a plurality of parallel data lines, the gate and data lines being positioned perpendicular to each other to form a lattice structure, wherein:
   the first plurality of common lines are substantially overlapped by the gate lines; and
   the second plurality of common lines are substantially overlapped by the data lines.

5. The touch screen of claim 1, wherein the opaque display elements include at least one of display gate and data lines.

6. The touch screen of claim 1, wherein the opaque display elements include pixel transistors.

7. The touch screen of claim 1, wherein the plurality of common lines are configured to connect the pixels in a plurality of sets of pixels, each set of pixels having all first electrodes connected to each other by the common lines, and wherein the common lines are interrupted at the boundaries between different adjacent sets of pixels.

8. The touch screen of claim 7, wherein each set of pixels comprises a touch region, and wherein selected pairs of touch regions form touch pixels capable of indicating a touch event thereon by changes in a capacitance between said pair of touch regions.

9. The touch screen of claim 7, wherein each set of pixels covers a contiguous region of the touch screen.

10. A mobile media player including the touch screen of claim 1.

11. A mobile telephone including the touch screen of claim 1.

12. A personal computer including the touch screen of claim 1.

13. A digital media player including a touch screen having a touch sensor panel and a display device, the touch screen configured to perform both a display and a touch sensing functionality, comprising:
   a plurality of pixels, each pixel including a storage capacitor comprising a first electrode and a second electrode;
   one or more opaque display elements used to perform the display functionality of the touch screen; and
   a plurality of common lines made from a non-transparent conductor, connected to the first electrode of one or more of the plurality of pixels and positioned at a different layer in the touch screen than the opaque display elements such that the opaque display elements and the common lines substantially overlap one anotherthe common lines;
   wherein the opaque display elements contribute to an aperture ratio of the display device and the plurality of common lines substantially maintain the aperture ratio of the display device; and
   wherein the first electrodes connected to the common lines are used for both the display and touch sensing functionalities of the touch screen.

14. A mobile telephone including a touch screen having a touch sensor panel and a display device, the touch screen configured to perform both a display and a touch sensing functionality, comprising:
   a plurality of pixels, each pixel including a storage capacitor comprising a first electrode and a second electrode;
   one or more opaque display elements used to perform the display functionality of the touch screen; and
   a plurality of common lines made from a non-transparent conductor, connected to the first electrode of one or more of the plurality of pixels and positioned at a different layer in the touch screen than the opaque display elements such that the opaque display elements and the common lines substantially overlap one another;

wherein the opaque display elements contribute to an aperture ratio of the display device and the plurality of common lines substantially maintain the aperture ratio of the display device; and wherein the first electrodes connected to the common lines are used for both the display and touch sensing functionalities of the touch screen.

15. A touch screen having a touch sensor panel and a display device, the touch screen configured to perform both a display and a touch sensing functionality, comprising:

a plurality of pixels including a plurality of sets of pixels, each set of pixels comprising two or more pixels;

a plurality of common electrodes, each common electrode serving as a storage capacitor electrode for a respective set of pixels;

one or more opaque display elements used to perform the display functionality of the touch screen; and a plurality of common lines made from a non-transparent conductor, connected to the plurality of common electrodes and positioned at a different layer in the touch screen than the opaque display elements such that the opaque display elements and the common lines substantially overlap one another;

wherein the opaque display elements contribute to an aperture ratio of the display device and the plurality of common lines substantially maintain the aperture ratio of the display device; and wherein the common electrodes are used for both the display and touch sensing functionalities of the touch screen.

16. The touch screen of claim 15, wherein the common lines are positioned at the same or adjacent layer to the plurality of common electrodes.

17. The touch screen of claim 15, wherein each common electrode is connected to a respective set of plurality of common lines from the plurality of common lines, and wherein the common lines are interrupted at the boundaries between different adjacent common electrodes.

18. The touch screen of claim 17, wherein the common lines include breaks at the borders of the common electrodes.

19. The touch screen of claim 17, wherein each common electrode comprises a touch region and selected pairs of touch regions form touch pixels capable of indicating a touch event thereon by changes in a capacitance between said pair of touch regions.

20. The touch screen of claim 15, wherein the touch screen comprises an FFS TFT LCD.

21. A method for manufacturing a touch screen having a touch sensor panel and a display device, the touch screen configured to perform both a display and a touch sensing functionality comprising:

forming a plurality of pixels, each pixel including a storage capacitor comprising a first electrode and a second electrode;

forming one or more opaque display elements used to perform the display functionality of the touch screen;

forming a plurality of common lines from a non-transparent conductor, the common lines being positioned at a different layer in the touch screen than the opaque display elements such that the opaque display elements and the common lines substantially overlap one another; and connecting respective ones of the plurality of common lines to one or more of the first electrodes of the plurality of pixels;

wherein the opaque display elements contribute to an aperture ratio of the display device and the plurality of common lines substantially maintain the aperture ratio of the display device; and wherein the first electrodes connected to the common lines are used for both the display and touch sensing functionalities of the touch screen.

22. The method of claim 21, wherein the common lines are connected to touch circuitry and are used to carry touch sensing signals.

23. The method of claim 21, wherein the forming of the common lines comprises:

forming a first plurality of parallel common lines; and
forming a second plurality of parallel common lines,
the first and second pluralities being positioned perpendicular to one another at the same layer to form a lattice structure.

24. The method of claim 23, wherein the forming of the opaque display elements comprises:

forming a plurality of parallel gate lines;
forming a plurality of parallel data lines; and
positioning the gate and data lines perpendicular to each other to form a lattice structure, wherein
the first pluralitry of common lines are respectively substantially overlapped by respective gate lines, and
the second plurality of common lines are respectively substantially overlapped by respective data lines.

25. The method of claim 21, wherein forming the opaque display elements comprises forming display gate and data lines.

26. The method of claim 21, wherein the forming of the opaque display elements comprises forming of pixel transistors.

27. The method of claim 21, wherein the plurality of common lines are configured to connect the pixels in a plurality of sets of pixels, each set of pixels having all first electrodes connected to each other by the common lines and wherein the common lines are interrupted at the boundaries between different adjacent sets of pixels.

28. The method of claim 27, wherein each sets of pixels comprises a touch region, and selected pairs of touch regions form touch pixels capable of indicating a touch event thereon by changes in a capacitance between said pair of touch regions.

29. The method of claim 27, wherein each set of pixels covers a contiguous region of the touch screen.

30. A method for manufacturing a touch screen having a touch sensor panel and a display device, the touch screen configured to perform both a display and a touch sensing functionality including:

forming a plurality of pixels including a plurality of sets of pixels, each set of pixels comprising two or more pixels;

forming a plurality of common electrodes, each common electrode serving as a storage capacitor electrode for a respective set of pixels;

forming one or more opaque display elements used to perform the display functionality of the touch screen;

forming a plurality of common lines from a non-transparent conductor and positioned at a different layer in the touch screen than the opaque display elements such that the opaque display elements and the common lines substantially overlap one another; and connecting the plurality of common lines to the plurality of common electrodes, wherein the opaque display elements contribute to an aperture ratio of the display device and the plurality of common lines substantially maintain the aperture ratio of the display device; and wherein the common electrodes are used for both the display and touch sensing functionalities of the touch screen.

31. The method of claim 30, wherein forming the common lines comprises positioning the common lines at the same or adjacent layer to the plurality of common electrodes.

32. The method of claim 30, wherein each common electrode is connected to a set of plurality of common lines from the plurality of common lines and wherein the common lines are interrupted at the boundaries between different adjacent common electrodes.

33. The method of claim 32, wherein forming the common lines includes ensuring there are breaks of the common lines at the borders of the common electrodes.

34. The touch screen of claim 32, wherein each common electrode comprises a touch region, and selected pairs of touch regions form touch pixels capable of indicating a touch event thereon by changes in a capacitance between said pair of touch regions.

35. The method of claim 30, wherein the touch screen comprises an FFS TFT LCD.

36. A personal computer including a touch screen having a touch sensor panel and a display device, the touch screen configured to perform both a display and a touch sensing functionality, comprising:

a plurality of pixels, each pixel including a storage capacitor comprising a first electrode and a second electrode;

one or more opaque display elements used to perform the display functionality of the touch screen; and a plurality of common lines made from a non-transparent conductor, connected to the first electrode of one or more of the plurality of pixels and positioned at a different layer in the touch screen than the opaque display elements such that the opaque display elements and ther common lines substantially overlap one another;

wherein the opaque display elements contribute to an aperture ratio of the display device and the plurality of common lines substantially maintain the aperture ratio of the display device; and wherein the first electrodes connected to the common lines are used for both the display and touch sensing functionalities of the touch screen.

\* \* \* \* \*

UNITED STATES PATENT AND TRADEMARK OFFICE
CERTIFICATE OF CORRECTION

| | | |
|---|---|---|
| PATENT NO. | : 8,749,496 B2 | Page 1 of 1 |
| APPLICATION NO. | : 12/315869 | |
| DATED | : June 10, 2014 | |
| INVENTOR(S) | : Shih Chang Chang et al. | |

It is certified that error appears in the above-identified patent and that said Letters Patent is hereby corrected as shown below:

In the Claims:

At column 30, claim number 13, line number 48, delete "common lines substantially overlap one anotherthe" and insert -- common lines substantially overlap one another; --.

At column 30, claim number 13, line number 49, delete "common lines;".

Signed and Sealed this
Twenty-third Day of December, 2014

Michelle K. Lee
*Deputy Director of the United States Patent and Trademark Office*